(12) United States Patent
Monroe et al.

(10) Patent No.: US 12,379,569 B2
(45) Date of Patent: Aug. 5, 2025

(54) LENS ALIGNMENT SYSTEM AND METHOD

(71) Applicants: James Alan Monroe, Syracuse, NY (US); David Scott Content, Spring, TX (US); Jeremy Sean McAllister, Saint Louis, MO (US); Jay Russell Zgarba, Sugar Land, TX (US)

(72) Inventors: James Alan Monroe, Syracuse, NY (US); David Scott Content, Spring, TX (US); Jeremy Sean McAllister, Saint Louis, MO (US); Jay Russell Zgarba, Sugar Land, TX (US)

( * ) Notice: Subject to any disclaimer, the term of this patent is extended or adjusted under 35 U.S.C. 154(b) by 159 days.

(21) Appl. No.: 18/144,214

(22) Filed: May 7, 2023

(65) Prior Publication Data

US 2023/0273394 A1    Aug. 31, 2023

Related U.S. Application Data

(63) Continuation-in-part of application No. 18/135,872, filed on Apr. 18, 2023, and a continuation of
(Continued)

(51) Int. Cl.
*G02B 7/02* (2021.01)
*C21D 8/10* (2006.01)
(Continued)

(52) U.S. Cl.
CPC .............. *G02B 7/028* (2013.01); *C21D 8/105* (2013.01); *C22C 14/00* (2013.01); *C22F 1/10* (2013.01);
(Continued)

(58) Field of Classification Search
None
See application file for complete search history.

(56) References Cited

U.S. PATENT DOCUMENTS

| | | | |
|---|---|---|---|
| 4,703,181 A | * | 10/1987 | Swann ..................... H01J 37/20 250/442.11 |
| 11,125,966 B2 | * | 9/2021 | Monroe .................. C22F 1/183 |

(Continued)

FOREIGN PATENT DOCUMENTS

| | | | |
|---|---|---|---|
| CN | 115537598 A | * | 12/2022 |
| JP | 06337337 A | * | 12/1994 |

OTHER PUBLICATIONS

English translation of CN 115537598 (originally published Dec. 30, 2022), obtained from PE2E search.*

(Continued)

*Primary Examiner* — George Wyszomierski
(74) *Attorney, Agent, or Firm* — Kevin Mark Klughart

(57) ABSTRACT

A lens alignment system and method is disclosed. The disclosed system/method integrates one or more lens retaining members/tubes (LRM/LRT) and focal length spacers (FLS) each comprising a metallic material product (MMP) specifically manufactured to have a thermal expansion coefficient (TEC) in a predetermined range via selection of the individual MMP materials and an associated MMP manufacturing process providing for controlled TEC. This controlled LRM/LRT TEC enables a plurality of optical lenses (POL) fixed along a common optical axis (COA) by the LRM/LRT to maintain precise interspatial alignment characteristics that ensure consistent and/or controlled series focal length (SFL) within the POL to generate a thermally neutral optical system (TNOS). Integration of the POL using this LRM/LRT/FLS lens alignment system reduces the overall TNOS implementation cost, reduces the overall TNOS mass, reduces TNOS parts component count, and increases the reliability of the overall optical system.

34 Claims, 56 Drawing Sheets

Related U.S. Application Data application No. 17/467,738, filed on Sep. 7, 2021, now Pat. No. 11,681,115, and a continuation-in-part of application No. 17/026,880, filed on Sep. 21, 2020, now Pat. No. 11,643,698, said application No. 17/467,738 is a continuation-in-part of application No. 15/217,594, filed on Jul. 22, 2016, now Pat. No. 10,822,670, which is a continuation-in-part of application No. 14/897,904, filed as application No. PCT/US2014/042105 on Jun. 12, 2014, now Pat. No. 10,557,182.

(60) Provisional application No. 62/490,877, filed on Apr. 27, 2017, provisional application No. 62/195,575, filed on Jul. 22, 2015, provisional application No. 61/835,289, filed on Jun. 14, 2013.

(51) Int. Cl.
| | | |
|---|---|---|
| *C22C 14/00* | (2006.01) | |
| *C22F 1/10* | (2006.01) | |
| *C22F 1/18* | (2006.01) | |
| *G02B 7/00* | (2021.01) | |
| *G02B 23/24* | (2006.01) | |
| *G02B 27/00* | (2006.01) | |
| *C22C 19/03* | (2006.01) | |
| *C22C 19/07* | (2006.01) | |

(52) U.S. Cl.
CPC .............. *C22F 1/183* (2013.01); *G02B 7/003* (2013.01); *G02B 23/2407* (2013.01); *G02B 27/0012* (2013.01); *C22C 19/03* (2013.01); *C22C 19/07* (2013.01)

(56) References Cited

U.S. PATENT DOCUMENTS

2011/0222148 A1* 9/2011 Oota ...................... G02B 23/16
359/399
2018/0085495 A1* 3/2018 Hagihara ............. A61B 1/0011

OTHER PUBLICATIONS

English translation of JP 06-337337 (originally published Dec. 6, 1994), obtained from PE2E search.*

* cited by examiner

0400

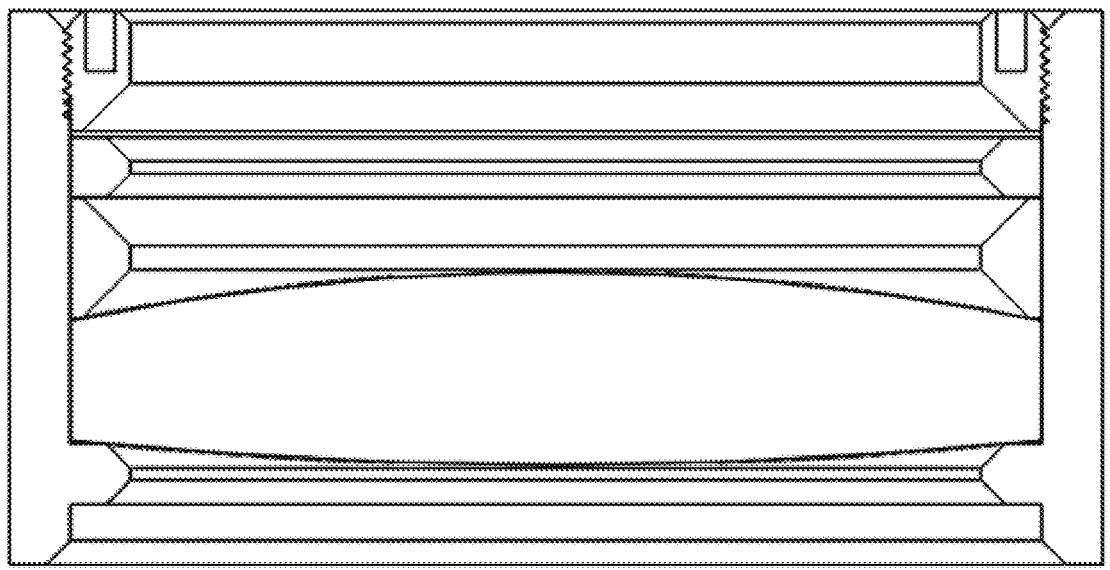
FIG. 44
4400

LENS ALIGNMENT SYSTEM AND METHOD

CROSS REFERENCE TO RELATED APPLICATIONS

Continuation Patent Application

This patent application is a continuation patent application (CPA) of and includes by reference parent United States Utility Patent Application for LENS ALIGNMENT SYSTEM AND METHOD by inventors James Alan Monroe, David Scott Content, Jeremy Sean McAllister, and Jay Russell Zgarba, filed with the USPTO on 2021 Sep. 7, with Ser. No. 17/467,738, EFS ID 43695412, confirmation number 6807, issued as U.S. Pat. No. 11,681,115 on Jun. 20, 2023.

This patent application is a Continuation-In-Part (CIP) patent application and incorporates by reference United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on 2023 Apr. 18, with Ser. No. 18/135,872, EFS ID 47859348, confirmation number 3009, issued as U.S. Pat. No. 12,378,621 on Aug. 5, 2025.

This patent application is a Continuation-In-Part (CIP) patent application and incorporates by reference United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on 2020 Sep. 21, with Ser. No. 17/026,880, EFS ID 40616003, confirmation number 1182, issued as U.S. patent Ser. No. 11/643,698 on 2023 May 9.

Divisional Patent Application

United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on 2020 Sep. 21, with Ser. No. 17/026,880, EFS ID 40616003, confirmation number 1182, issued as U.S. patent Ser. No. 11/643,698 on 2023 May 9 is a divisional patent application (DPA) and includes by reference United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, issued as U.S. patent Ser. No. 10/822,670 on 2020 Nov. 3.

United States Utility Patent Application for LENS ALIGNMENT SYSTEM AND METHOD by inventors James Alan Monroe, David Scott Content, Jeremy Sean McAllister, and Jay Russell Zgarba, filed with the USPTO on 2021 Sep. 7, with Ser. No. 17/467,738, EFS ID 43695412, confirmation number 6807, issued as U.S. Pat. No. XX,XXX,XXX on YYYY-MM-DD, is a divisional patent application of and includes by reference parent United States Utility Patent Application for LENS ALIGNMENT SYSTEM AND METHOD by inventors James Alan Monroe, David Scott Content, Jeremy Sean McAllister, and Jay Russell Zgarba, filed with the USPTO on 2018 Apr. 26, with Ser. No. 15/963,428, EFS ID 32454176, confirmation number 1064, issued as U.S. Pat. No. 11,125,966 on Sep. 21, 2021.

U.S. Patent Applications

United States Utility Patent Application for LENS ALIGNMENT SYSTEM AND METHOD by inventors James Alan Monroe, David Scott Content, Jeremy Sean McAllister, and Jay Russell Zgarba, filed with the USPTO on 2018 Apr. 26, with Ser. No. 15/963,428, EFS ID 32454176, confirmation number 1064, now U.S. Pat. No. 11,125,966 is a Continuation-In-Part (CIP) and incorporates by reference United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258.

United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, is a Continuation-In-Part (CIP) patent application of and incorporates by reference United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1.

This application claims benefit under 35 U.S.C. § 120 and incorporates by reference United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1.

PCT Patent Applications

United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1 is a national stage United States Utility Patent Application of and incorporates by reference PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2.

United States Utility Patent Application for SYSTEMS AND METHODS FOR TAILORING COEFFICIENTS OF THERMAL EXPANSION BETWEEN EXTREME POSI- TIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1 claims benefit under 35 U.S.C. § 120 and incorporates by reference PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2.

Provisional Patent Applications

PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2 claims benefit under 35 U.S.C. § 119 and incorporates by reference United States Provisional Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 14, 2013, with Ser. No. 61/835,289.

United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, claims benefit under 35 U.S.C. § 119 and incorporates by reference United States Provisional Patent Application for CONTROLLED THERMAL COEFFICIENT PRODUCT SYSTEM AND METHOD by inventor James A. Monroe, filed with the USPTO on Jul. 22, 2015, with Ser. No. 62/195,575, EFS ID 22993562, confirmation number 5403.

This application claims benefit under 35 U.S.C. § 119 and incorporates by reference United States Provisional Patent Application for LENS ALIGNMENT SYSTEM AND METHOD by inventors James Alan Monroe, David Scott Content, Jeremy Sean McAllister, and Jay Russell Zgarba, filed with the USPTO on Apr. 27, 2017, with EFSID 29050356, Ser. No. 62/490,877, confirmation number 8425.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Portions of this research were sponsored by U.S. National Science Foundation, Division of Materials Research, Metals and Metallic Nanostructures Program, Grant No. 0909170 and Division of Materials Research, Office of Specific Programs, International Materials Institute Program, Grant DMR 08-44082.

Portions of this research were supported by National Science Foundation, Division of Materials Research, Metals and Metallic Nanostructures Program, Grant No. 0909170, and additional support was received from the National Science Foundation under Grant No. DMR 08-44082, which supports the International Materials Institute for Multifunctional Materials for Energy Conversion (IIMEC) at Texas A & M University. The work has also benefited from the use of the Lujan Neutron Scattering Center at LANSCE, funded by the U.S. Department of Energy's Office of Basic Energy Sciences. Los Alamos National Laboratory is operated by Los Alamos National Security LLC under U.S. DOE Contract DE-AC52-06NA25396.

REFERENCE TO A MICROFICHE APPENDIX

Not Applicable

FIELD OF THE INVENTION

The present invention relate to the product of and systems and methods for generating optical systems that are thermally stabilized ("athermalized") over a wide temperature range. Without limitation, the present invention may be applied to situations where a plurality of optical lenses (POL) in an optical system must be constructed in a manner so as to maintain constant focal lengths along a common optical axis (COA).

PRIOR ART AND BACKGROUND OF THE INVENTION

Traditional optical systems consist of one or more lenses that are each mounted within lens retaining members (LRM). The LRM are typically aligned longitudinally along a common optical axis (COA) wherein the spacing between each lens in the string is determined by fixing each LRM to one or more focal length spacers (FLS) mechanically attached to two or more of the LRM. The LRM/FLS are typically constructed of metal, but in some circumstances may be non-metallic materials such as plastic.

As temperature varies, the LRM and/or FLS vary in size due to mechanical temperature coefficients associated with each material used in the LRM/FLS. Additionally, each lens may vary slightly in size due to mechanical temperature coefficients associated with the lens material(s). Variations in LRM sizing due to non-zero temperature coefficient can produce compressive forces on the attached lens and vary the optical characteristics of the lens. Variations in FLS sizing due to non-zero temperature coefficient directly impact the inter-lens spacing as temperature varies. Variations in temperature may also impact the ideal focal length of each lens.

The combination of these three factors has lead optical engineers to design elaborate LRM/FLS configurations in order to compensate for these focal length changes due to temperature variations. These optical designs often utilize a variety of plates, spacers, and other materials having combinations of temperature coefficients in order to achieve a thermally neutral focal length for the overall optical system. The resulting optical system is generally complex having a number of tight-tolerance LRM/FLS components, relatively massive, is expensive to manufacture, and prone to failure due to the number of components required for construction.

DEFICIENCIES IN THE PRIOR ART

Prior art lens alignment systems typically suffer from the following characteristic deficiencies:
  Prior lens alignment systems have a coefficient of thermal expansion (CTE) that cannot accurately be controlled.
  Prior lens alignment systems have a coefficient of thermal expansion (CTE) that cannot be controlled across one or more axes of expansion.
  Prior lens alignment systems have a coefficient of thermal expansion (CTE) that cannot be tailored to provide a customized expansion coefficient across one or more axes of expansion.
  Prior lens alignment systems cannot provide a zero coefficient of thermal expansion (CTE) over one or more axes of expansion.
To date the prior art has not fully addressed these deficiencies.

OBJECTIVES OF THE INVENTION

Accordingly, the objectives of the present invention are (among others) to circumvent the deficiencies in the prior art and affect the following objectives:
  (1) Provide for a lens alignment system/method for producing same that have a coefficient of thermal expansion (CTE) that can accurately be controlled
  (2) Provide for a lens alignment system/method for producing same in which the coefficient of thermal expansion (CTE) can be controlled across one or more axes of expansion.
  (3) Provide for a lens alignment system/method for producing same in which the coefficient of thermal expansion (CTE) can be tailored to provide a customized expansion coefficient across one or more axes of expansion.
  (4) Provide for a lens alignment system/method for producing same that can produce a zero coefficient of thermal expansion (CTE) across one or more axes of expansion.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention generally addresses the need for lens alignment systems having a known Coefficient of Thermal Expansion (CTE) in the following manner. The typical LRM/FLS components used in the optical system are fabricated from a material having a controlled thermal expansion coefficient, thus eliminating the need for multiple materials having differing rates of thermal expansion. By properly fabricating the LRM/FLS using these thermally neutral (or thermally controlled) materials, the focal length of the overall optical system is made constant and thermally invariant.

Details regarding the CTE-invariant metallic material product (MMP) is disclosed within United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, and other patents/patent applications incorporated herein.

Exemplary Embodiments

In a preferred exemplary embodiment, the LRM/FLS are created using a method of manufacturing a metallic material with a thermal expansion coefficient in a predetermined range, comprising: deforming a metallic material comprising a first phase and a first thermal expansion coefficient; transforming, in response to the deforming, at least some of the first phase into a second phase, wherein the second phase comprises martensite; and orienting the metallic material in at least one predetermined orientation, wherein the metallic material, subsequent to deformation, comprises a second thermal expansion coefficient, wherein the second thermal expansion coefficient is within a predetermined range, and wherein the thermal expansion is in at least one predetermined direction.

In an alternate preferred exemplary embodiment, the LRM/FLS are created using a method of manufacturing a metallic material with a thermal expansion coefficient in a predetermined range, comprising: deforming a metallic material by applying tension in a first direction, wherein the metallic material substantially comprises a first phase, and wherein applying the tension transforms at least some of the first phase into a second phase; and wherein, subsequent to deformation, the metallic material comprises a negative coefficient of thermal expansion within a predetermined range, wherein the negative thermal expansion is in at least the first direction.

In an alternate preferred exemplary embodiment, the LRM/FLS are created using a method of manufacturing a metallic material with a thermal expansion coefficient in a predetermined range comprising: deforming a metallic material, wherein the metallic material prior to deforming substantially comprises a first phase, and wherein deforming the metallic material transforms at least some of the first phase into a second phase using a compressive force in a first direction; wherein, subsequent to deformation, the metallic material comprises a negative coefficient of thermal expansion within a predetermined range; and wherein, subsequent to deformation, the negative thermal expansion of the metallic material is in at least a second direction, wherein the second direction is perpendicular to the first direction.

In an alternate preferred exemplary embodiment, the LRM/FLS are created using a method of manufacturing a metallic material with a thermal expansion coefficient in a predetermined range, comprising: deforming a metallic material comprising a first thermal expansion coefficient, wherein the metallic material comprises a martensitic phase, wherein the metallic material is oriented in at least one predetermined orientation in response to the deforming; wherein the metallic material, subsequent to deformation, comprises a second thermal expansion coefficient, wherein the second thermal expansion coefficient is within a predetermined range, and wherein the thermal expansion is in at least one predetermined direction.

Embodiment Summary

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

While preferred embodiments will be shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

BRIEF DESCRIPTION OF THE DRAWINGS

For a fuller understanding of the advantages provided by the invention, reference should be made to the following detailed description together with the accompanying drawings wherein.

Figure 16:
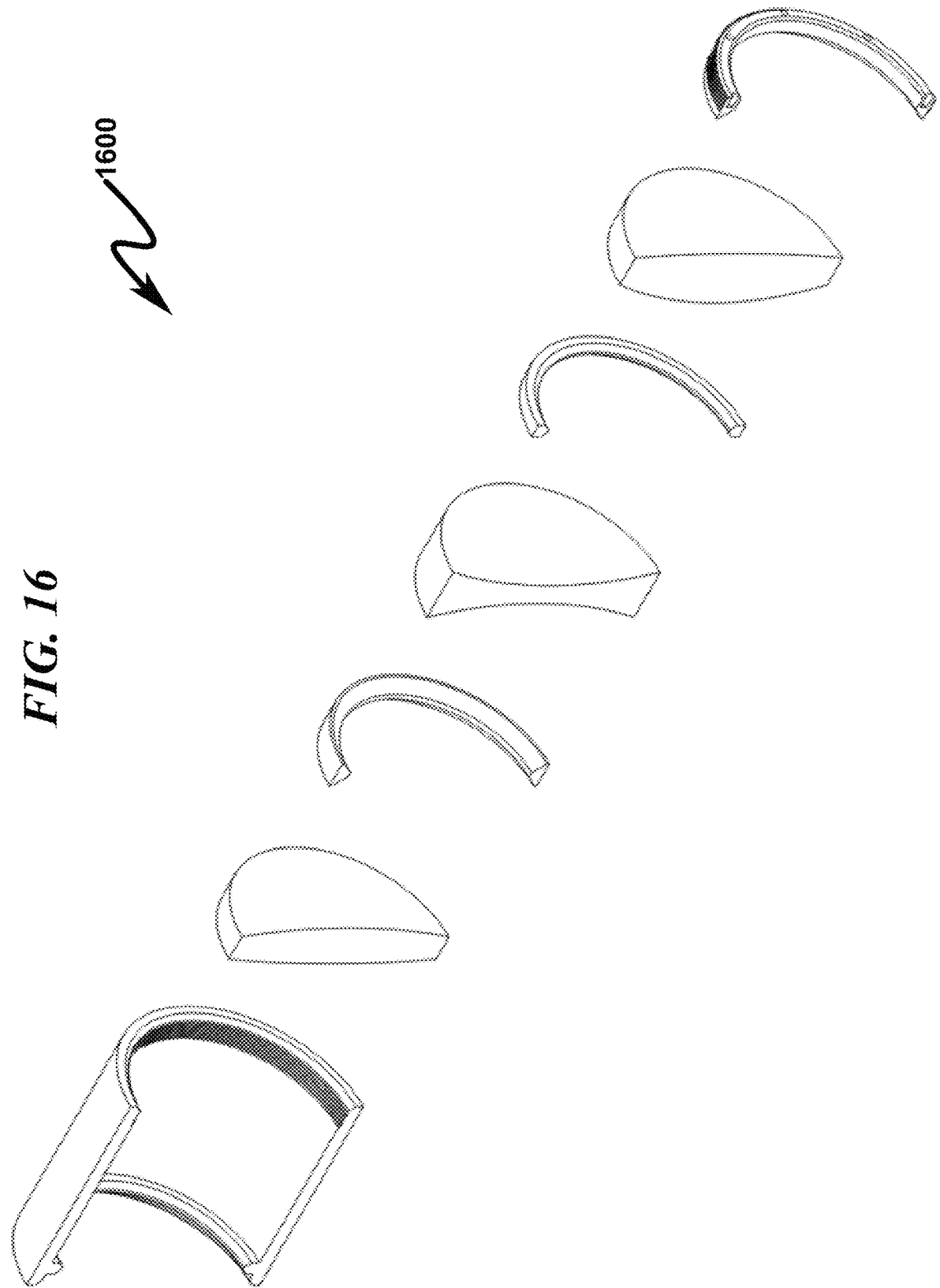
Figure 17:
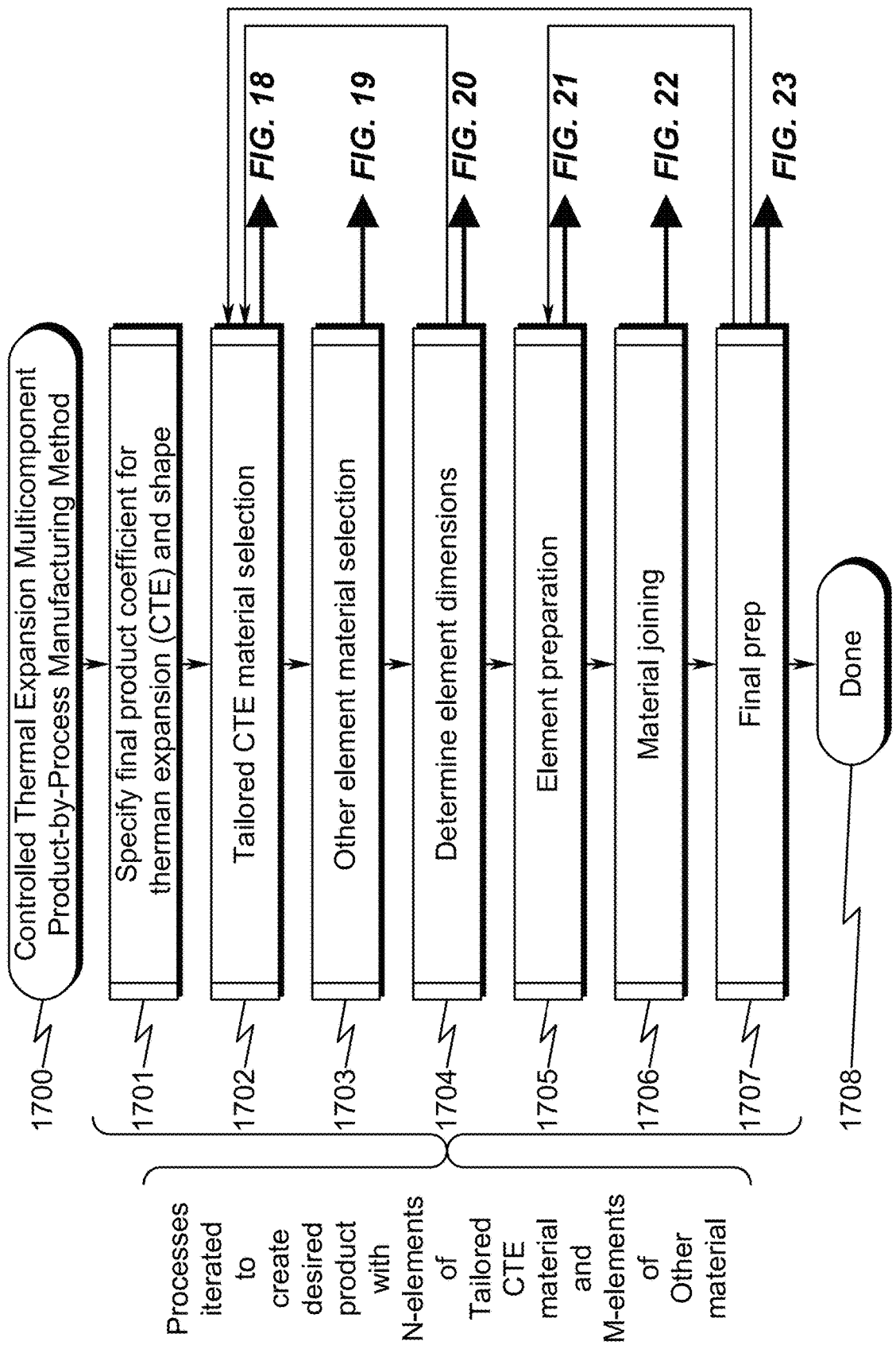
Figure 18:
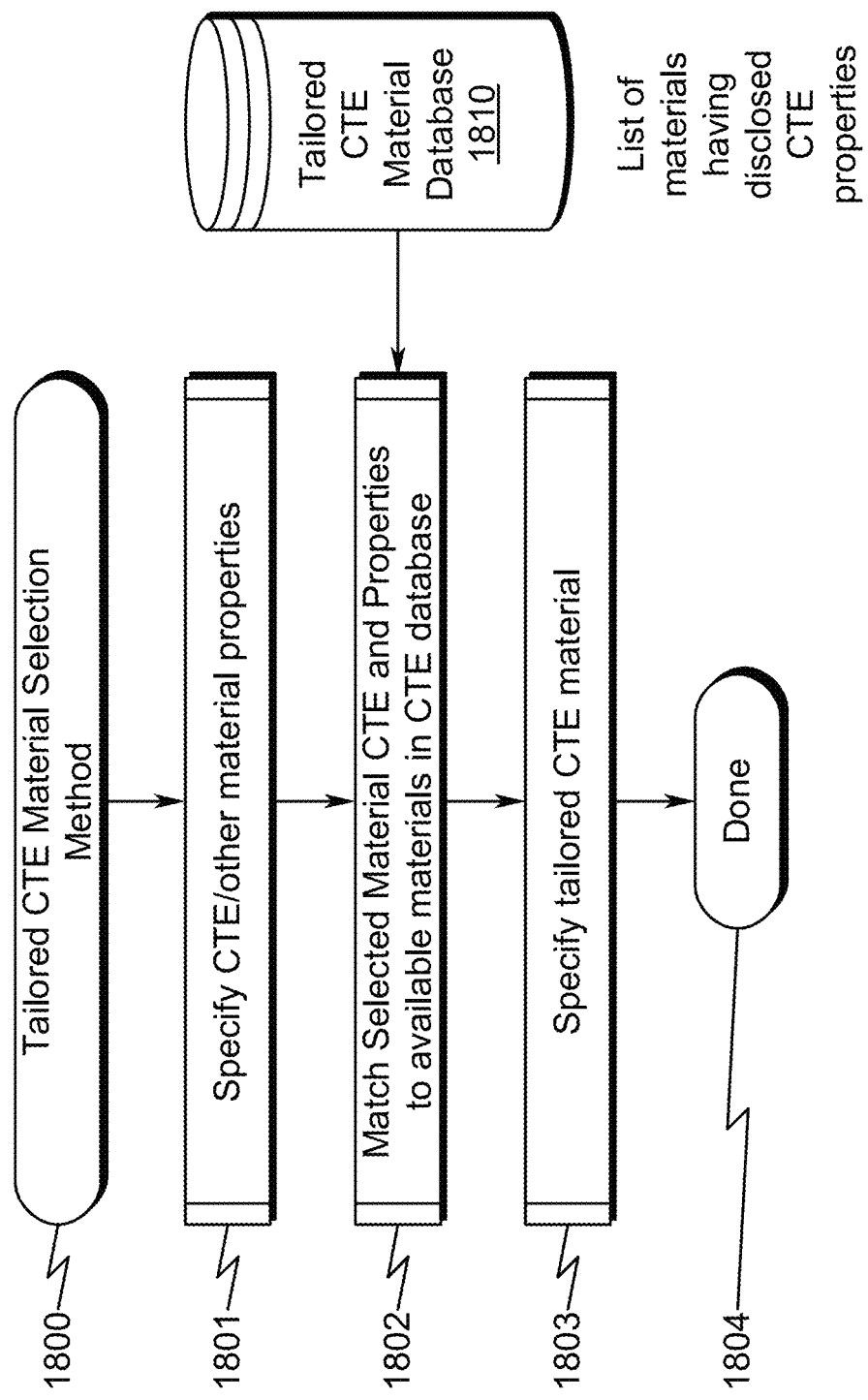
Figure 19:
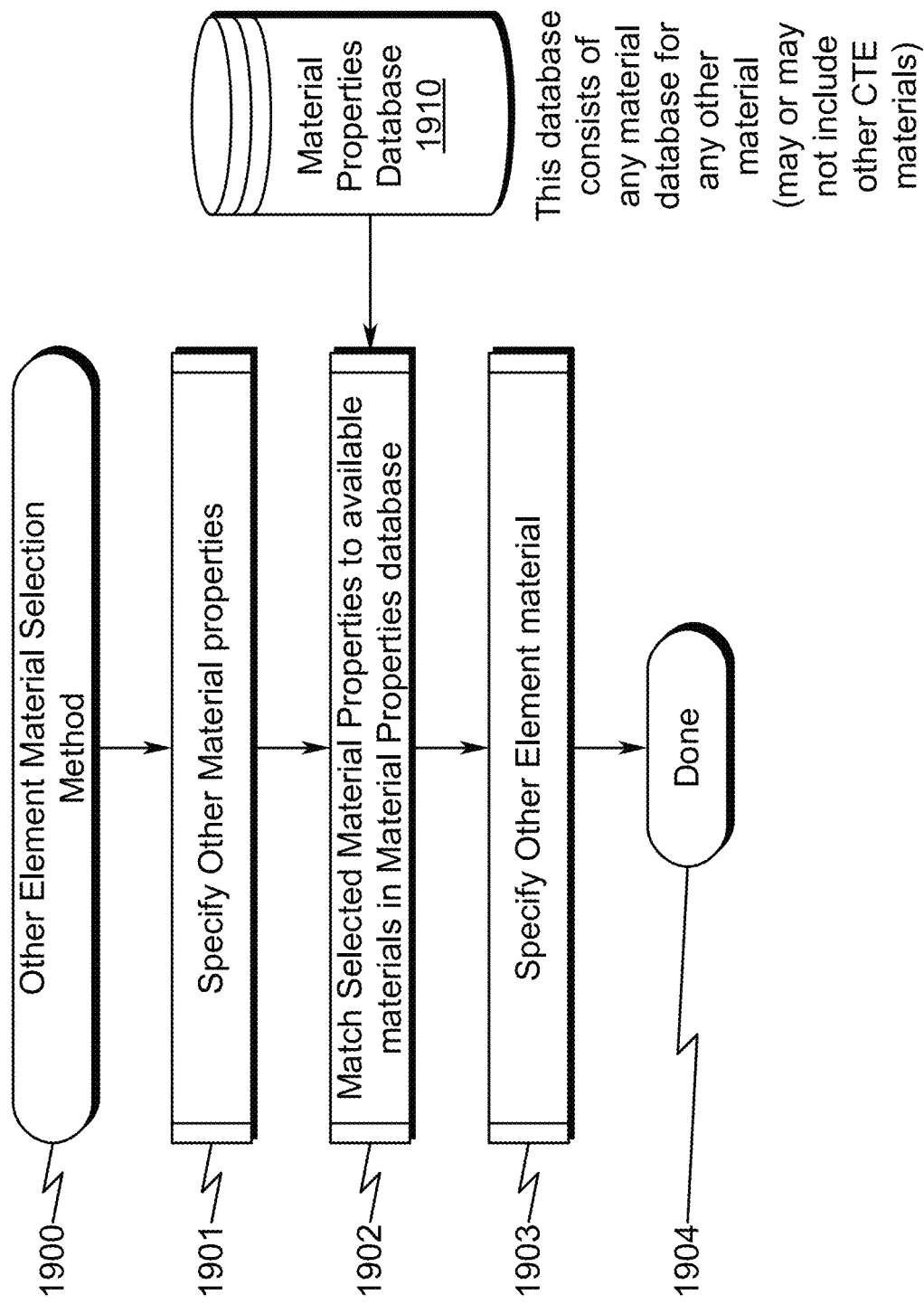
Figure 20:
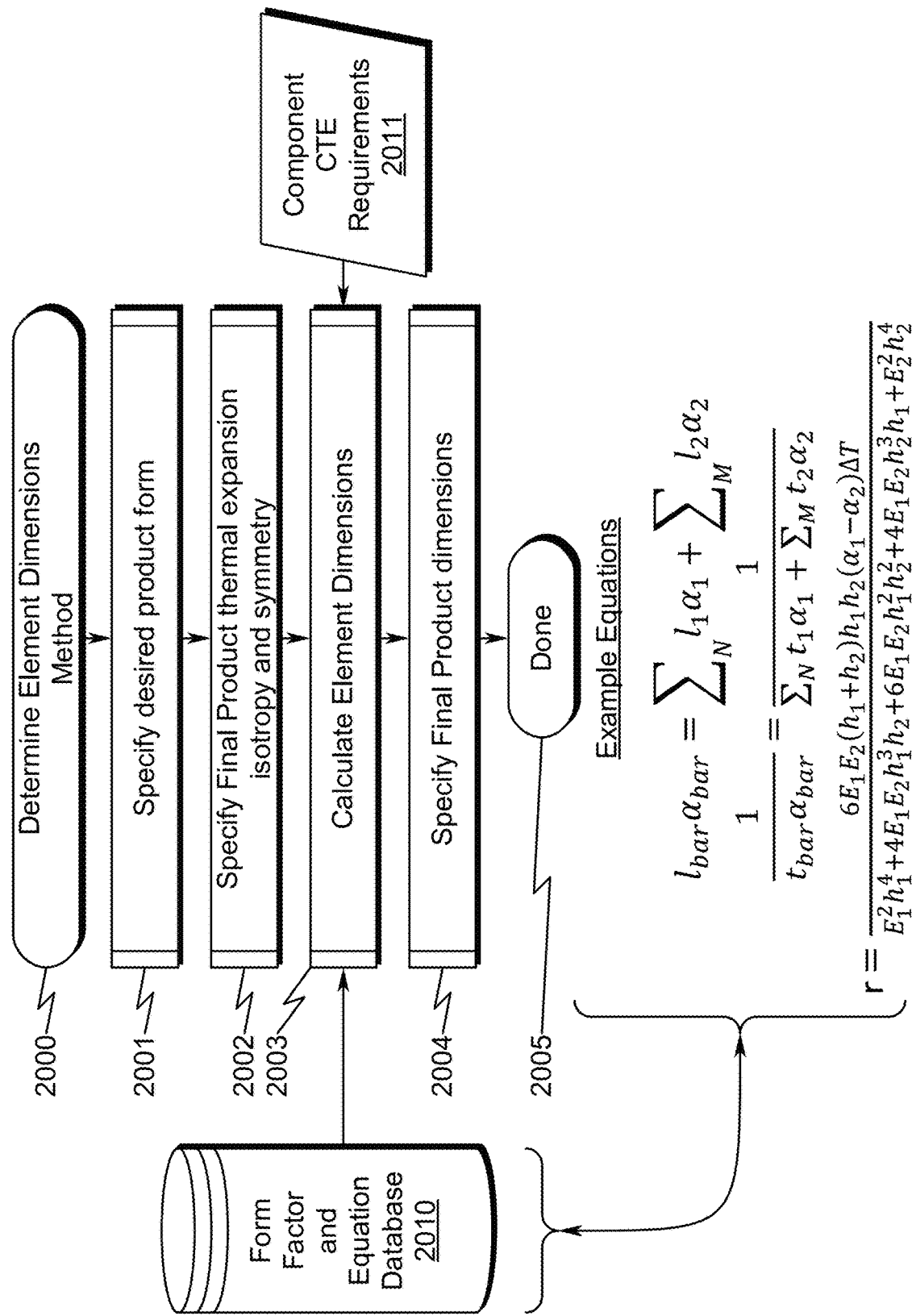
Figure 21:
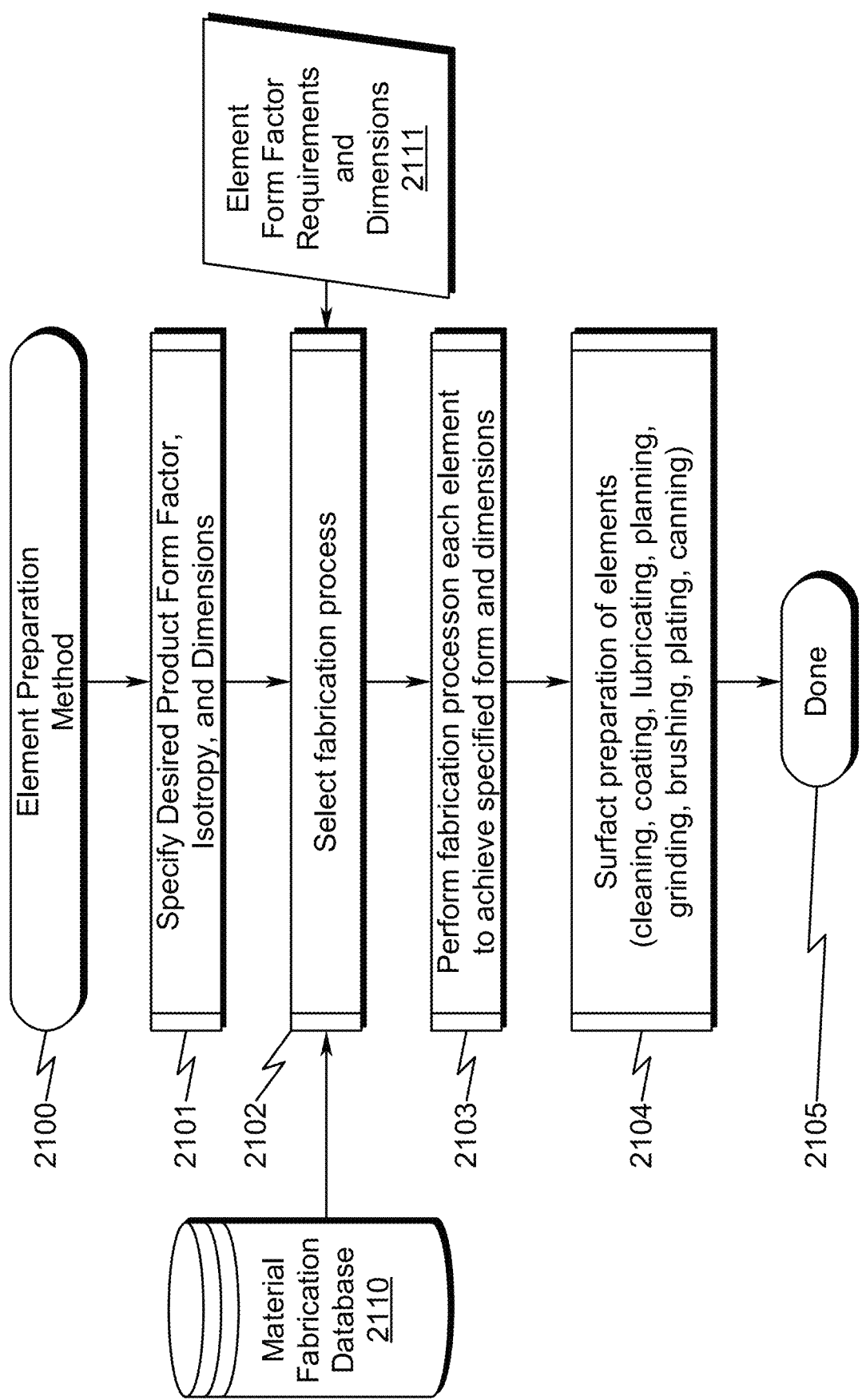
Figure 22:
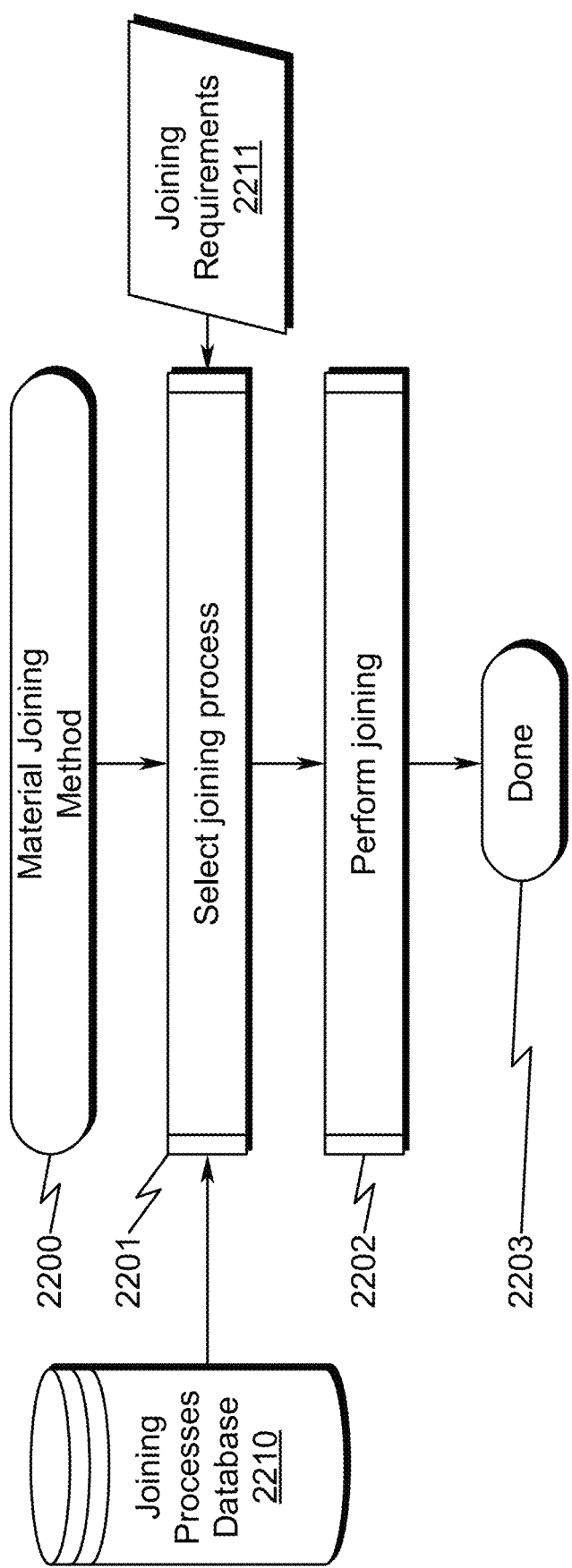
Figure 23:
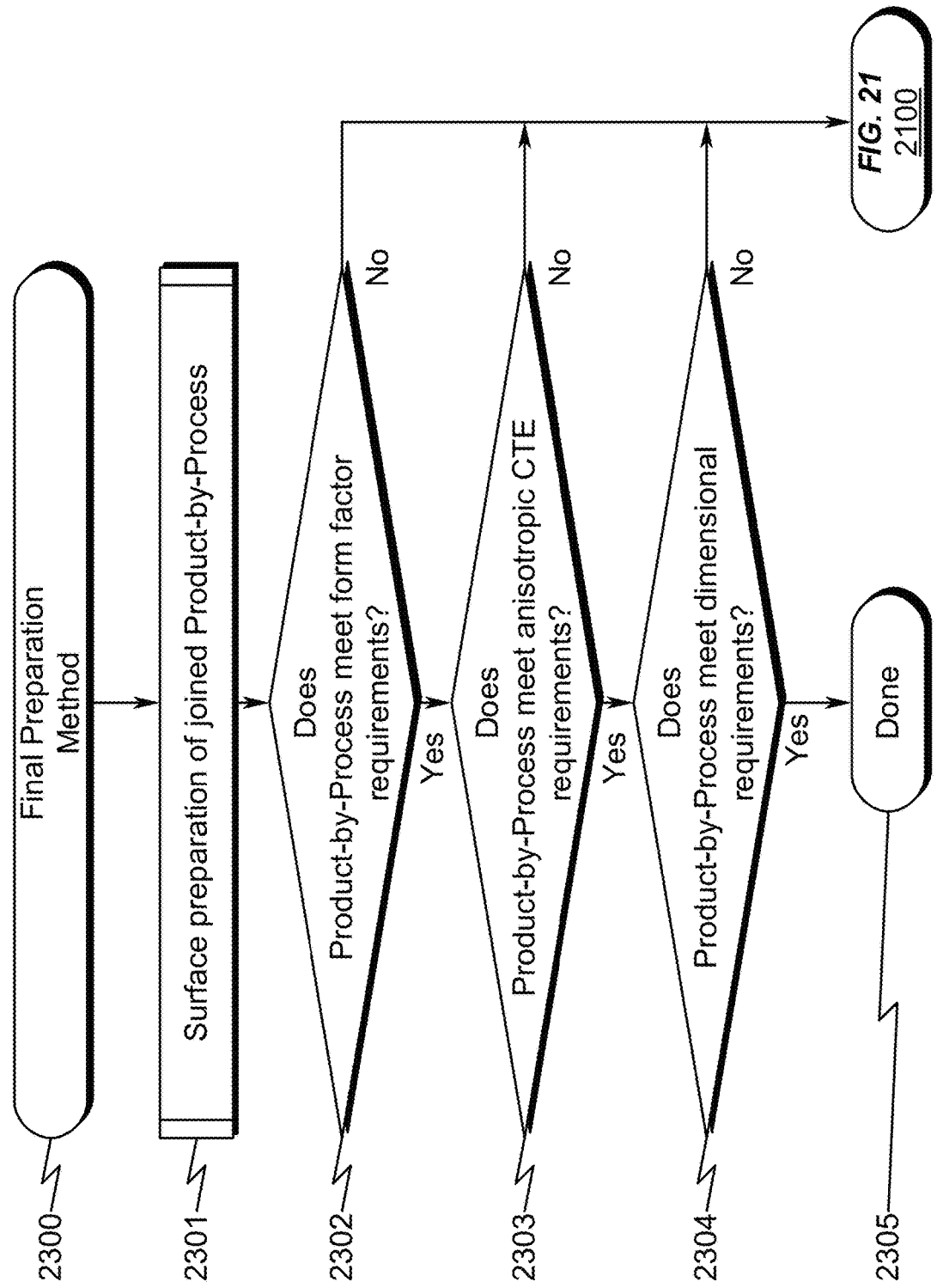
Figure 24:
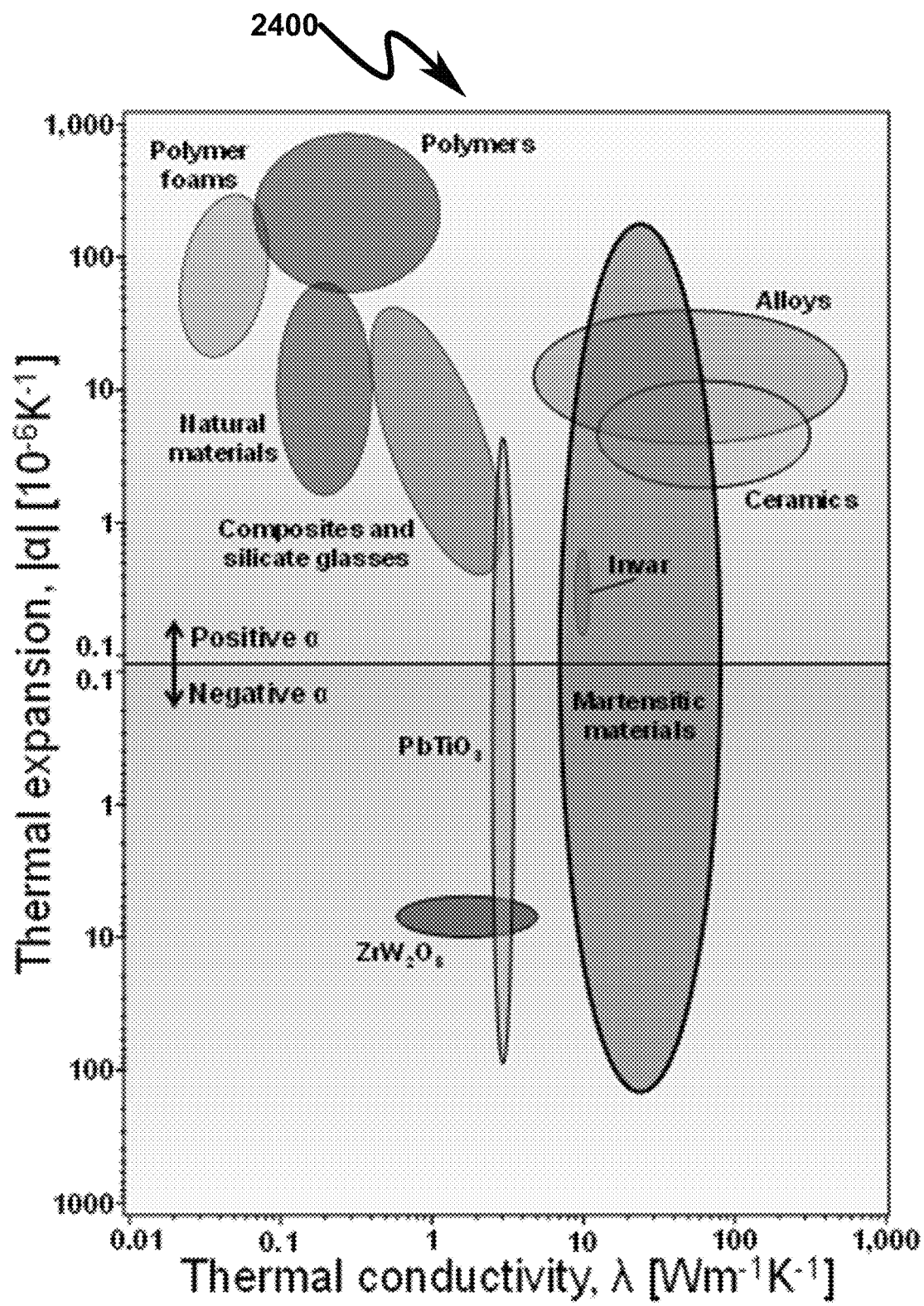
Figure 25:
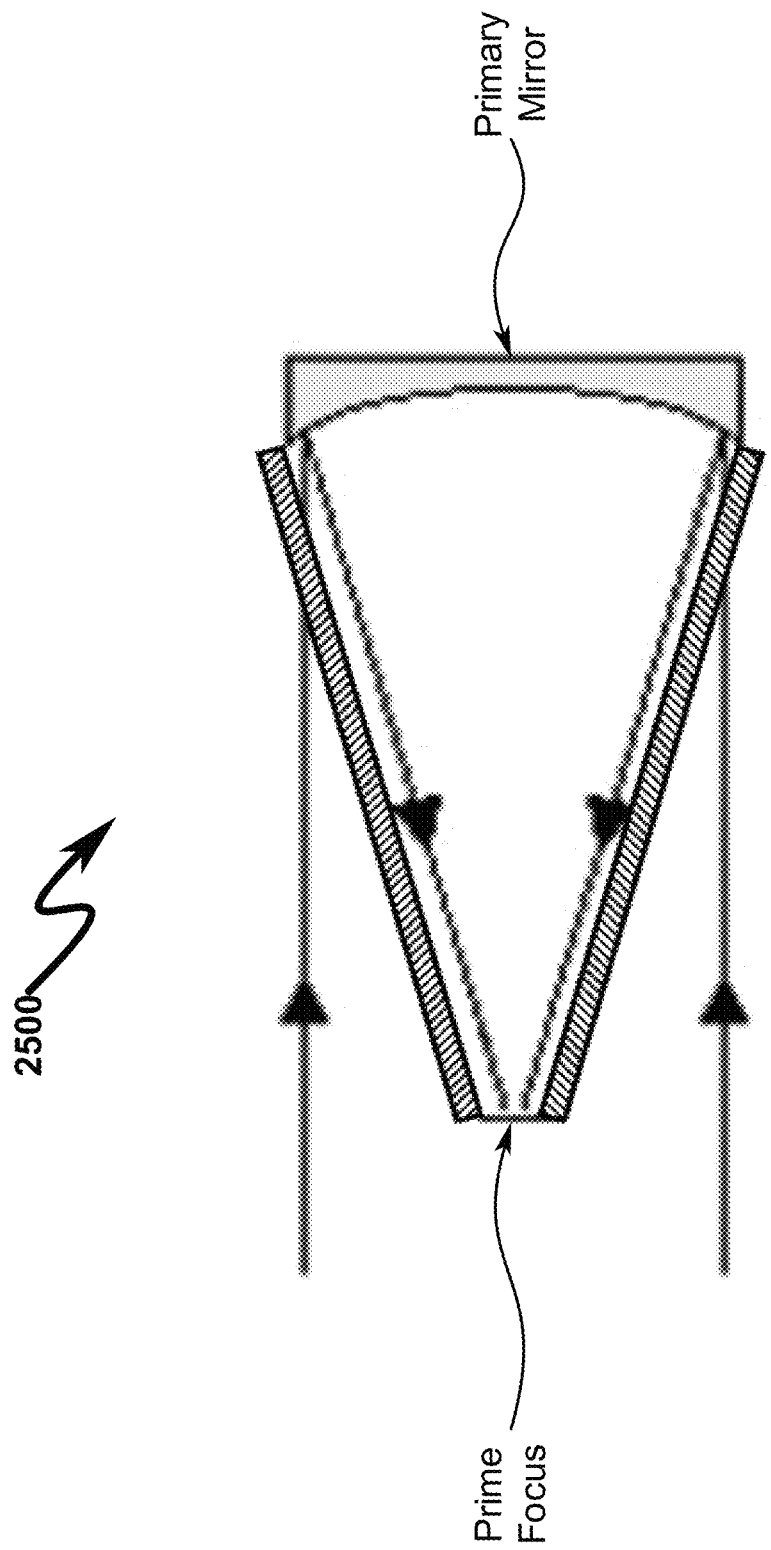
Figure 26:
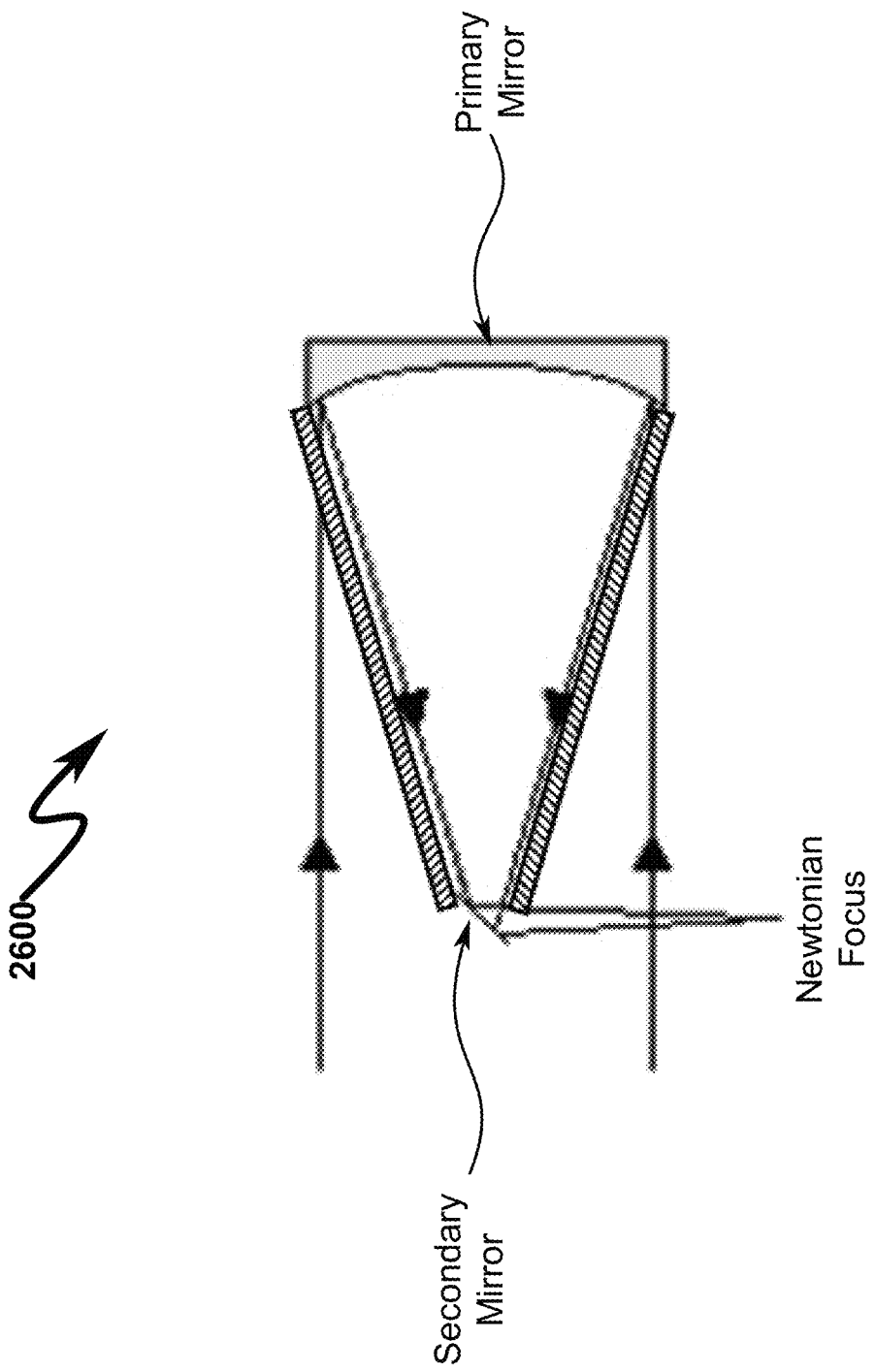
Figure 27:
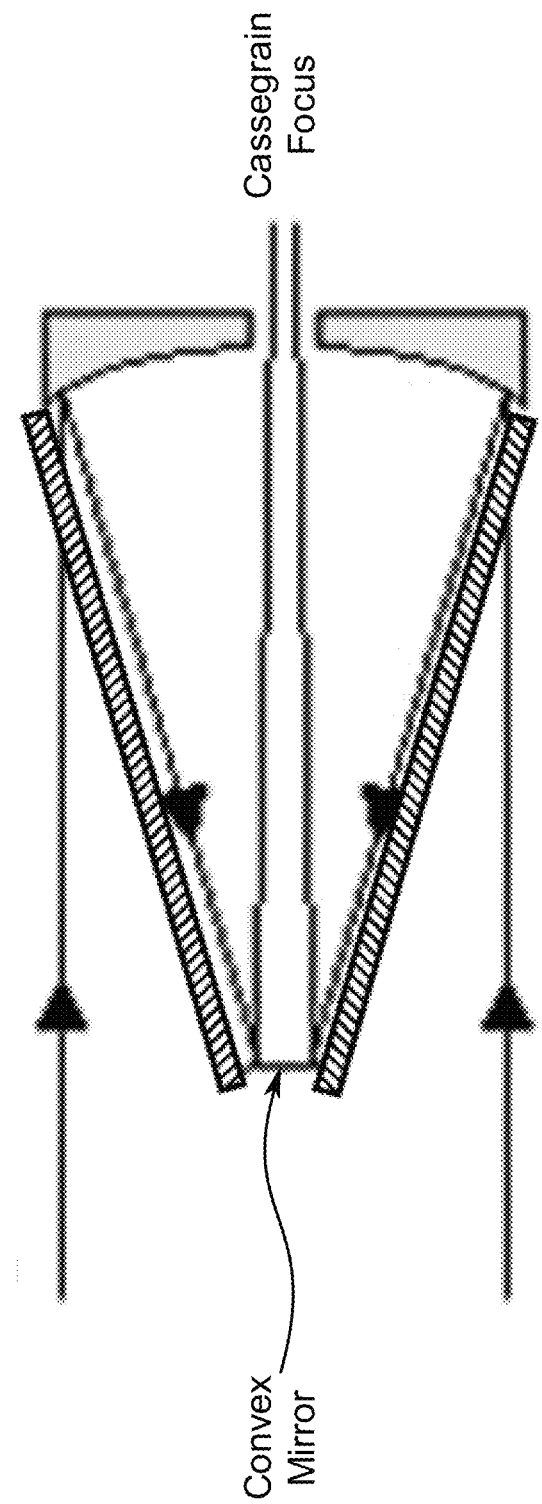
Figure 28:
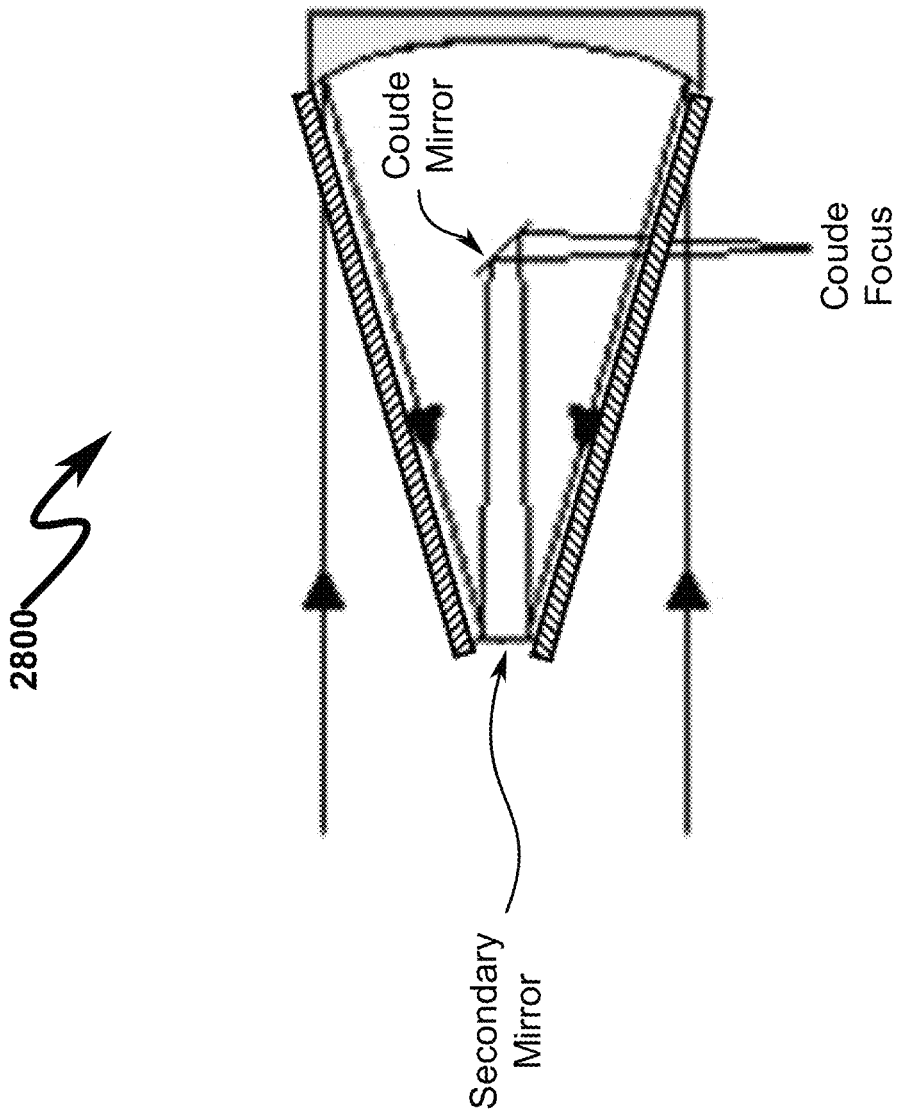
Figure 29:
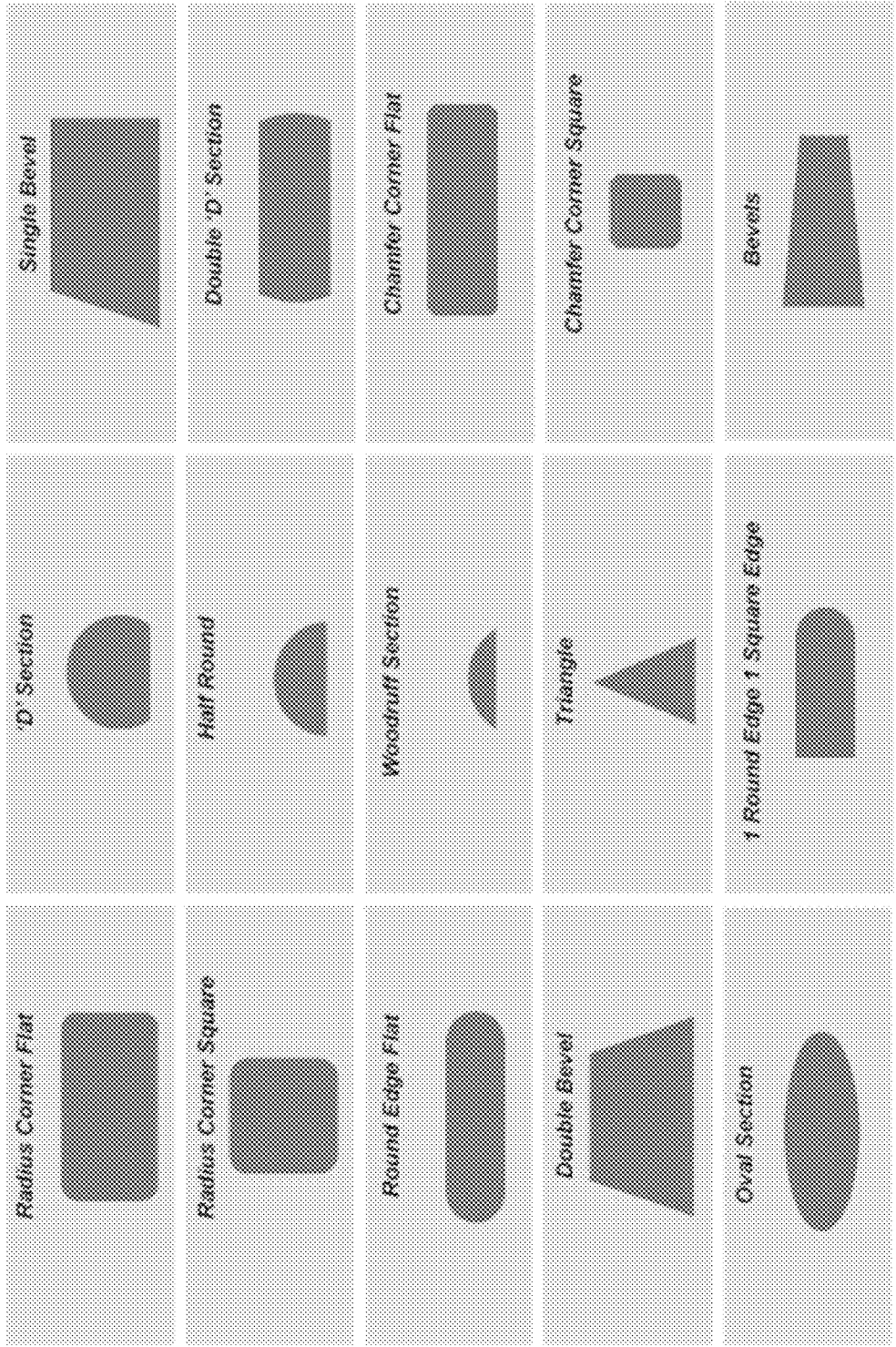
Figure 30:
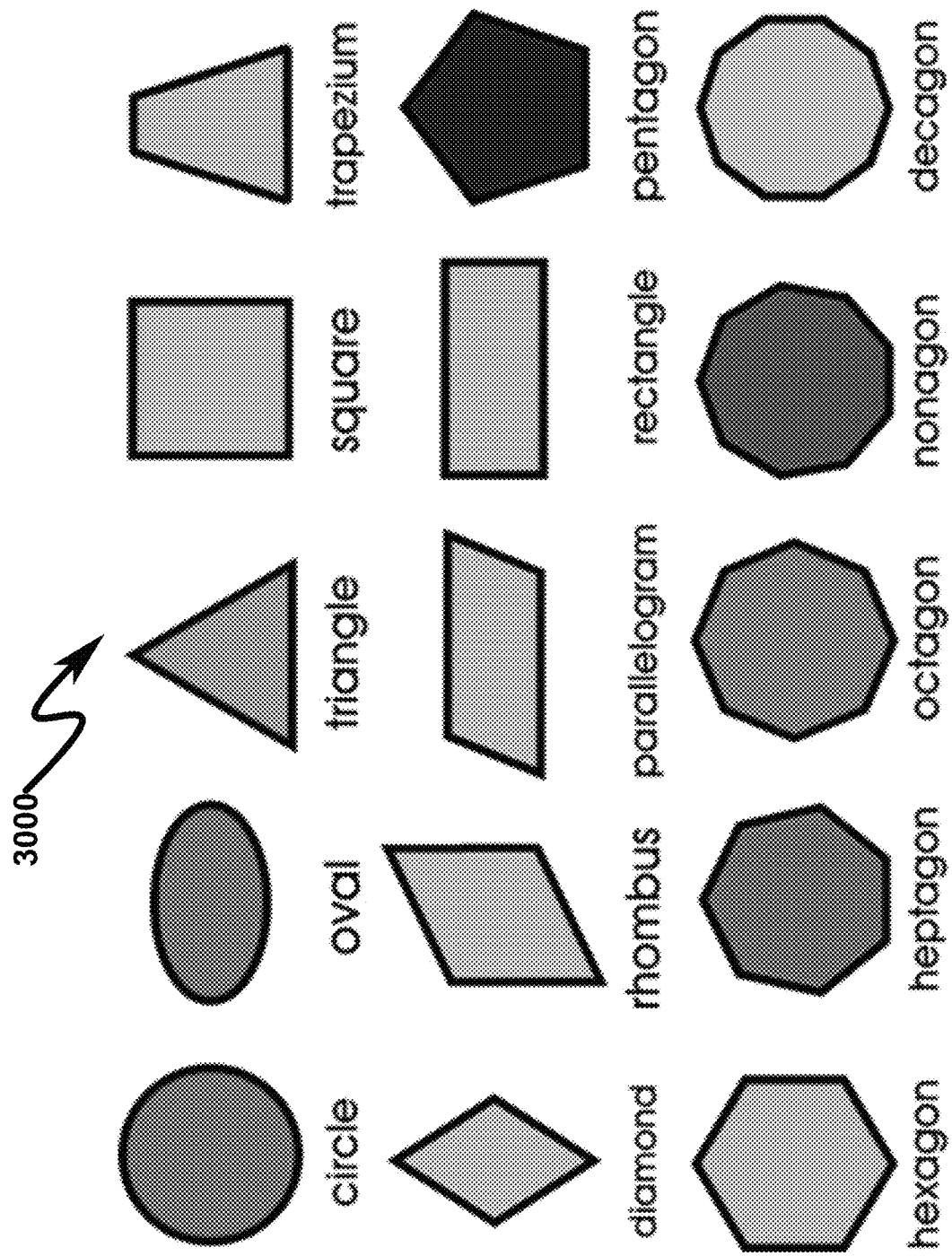
Figure 31:
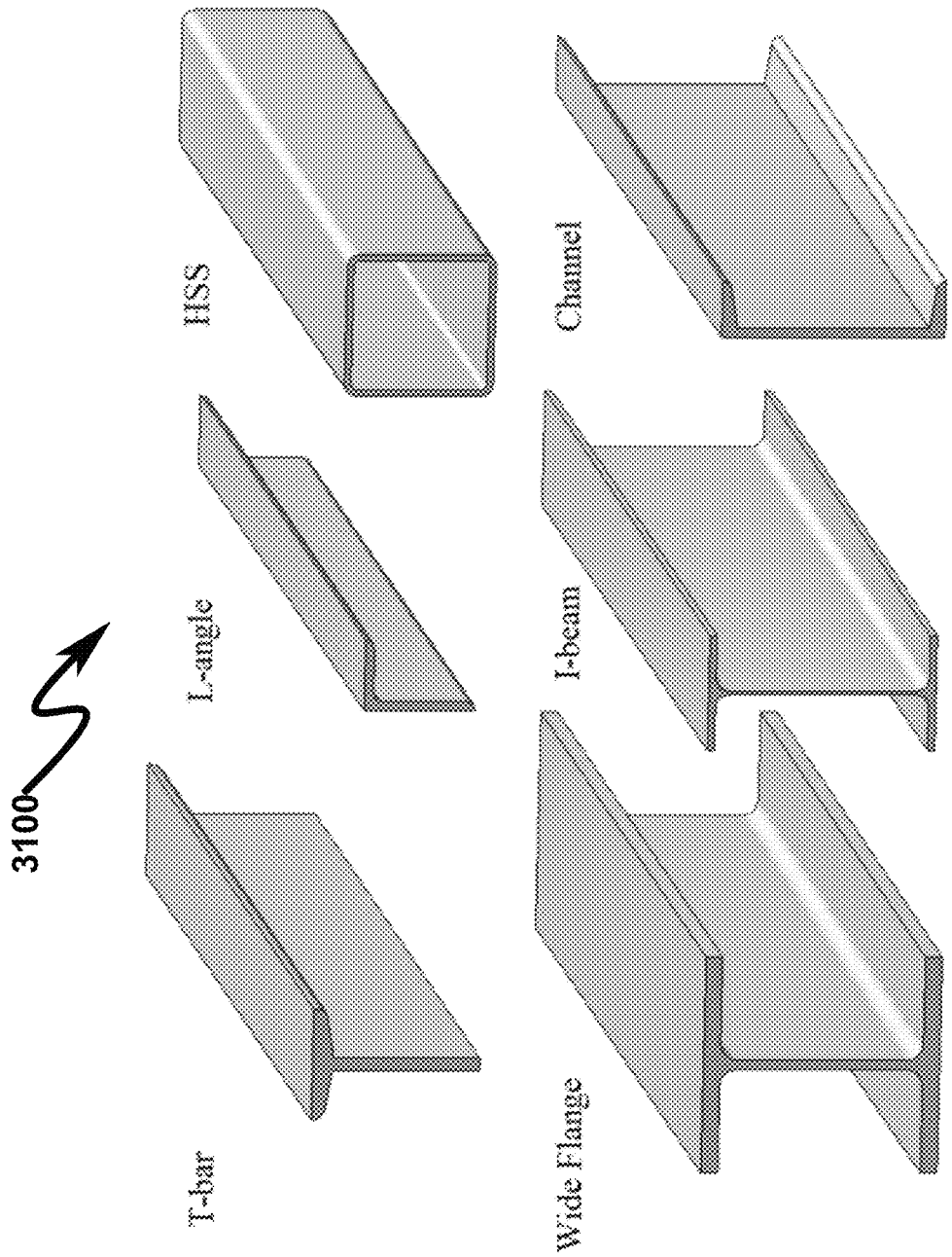
Figure 32:
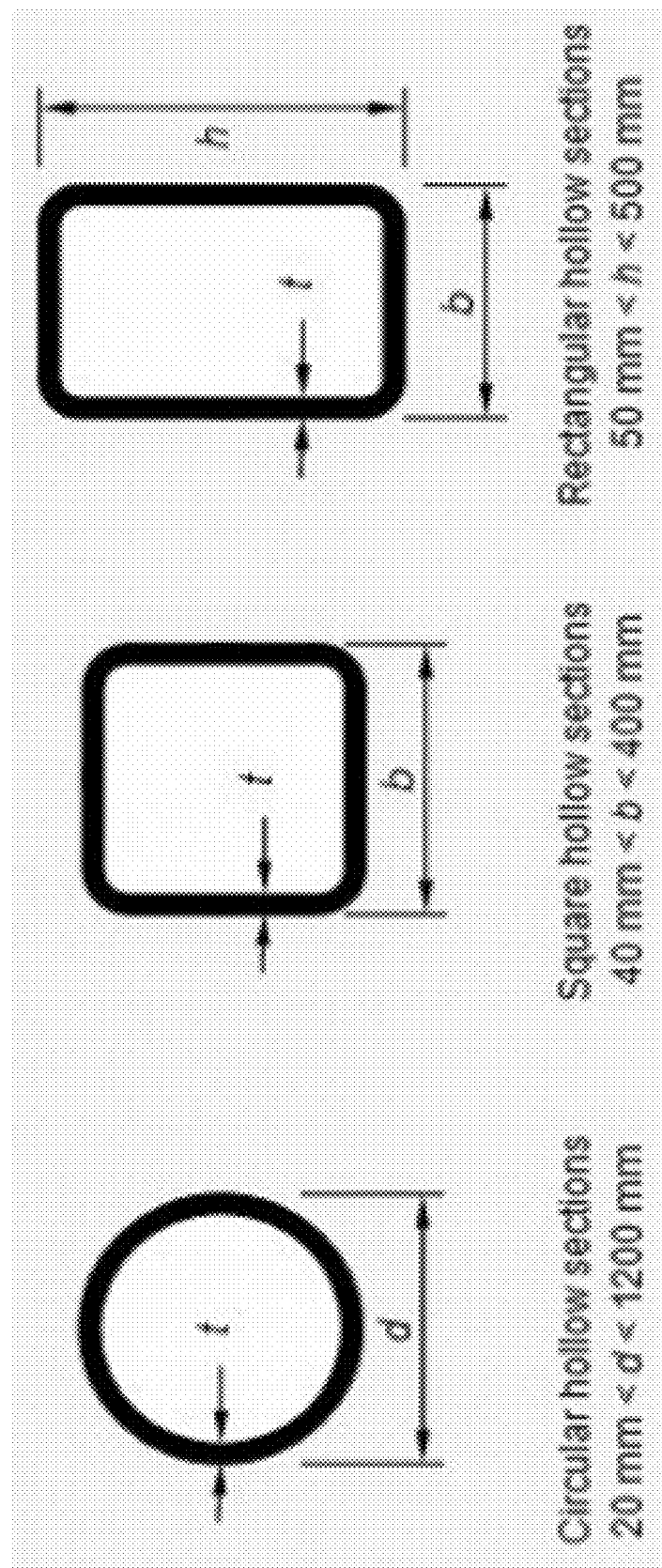
Figure 33:
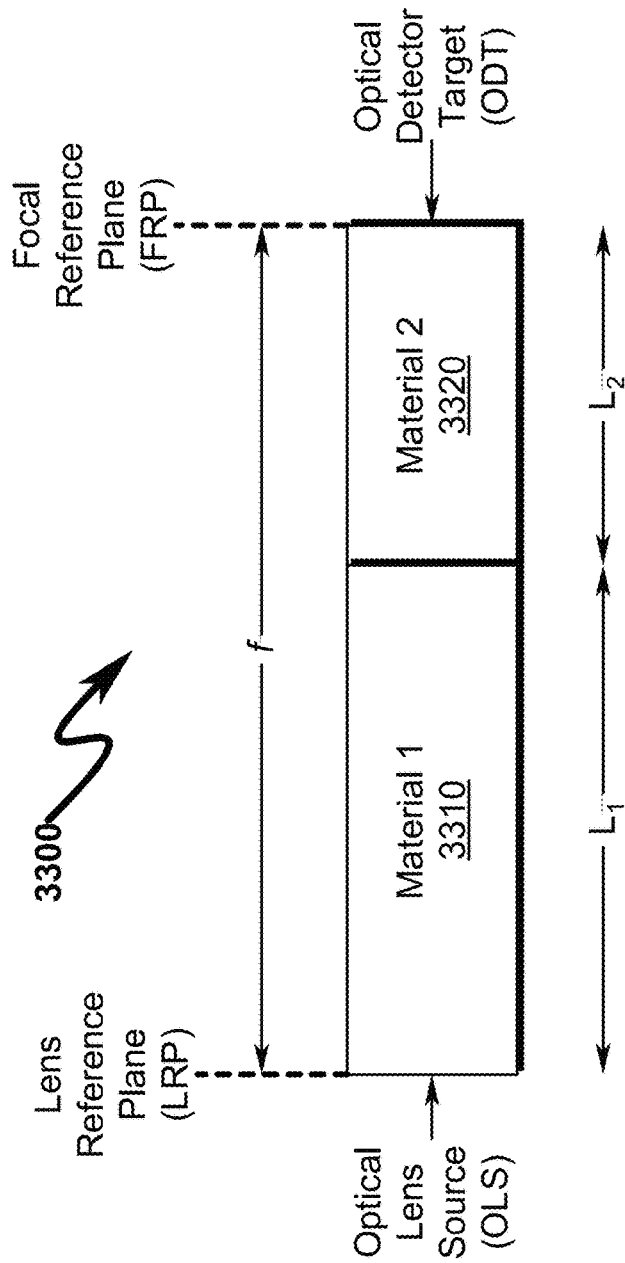
Figure 34:
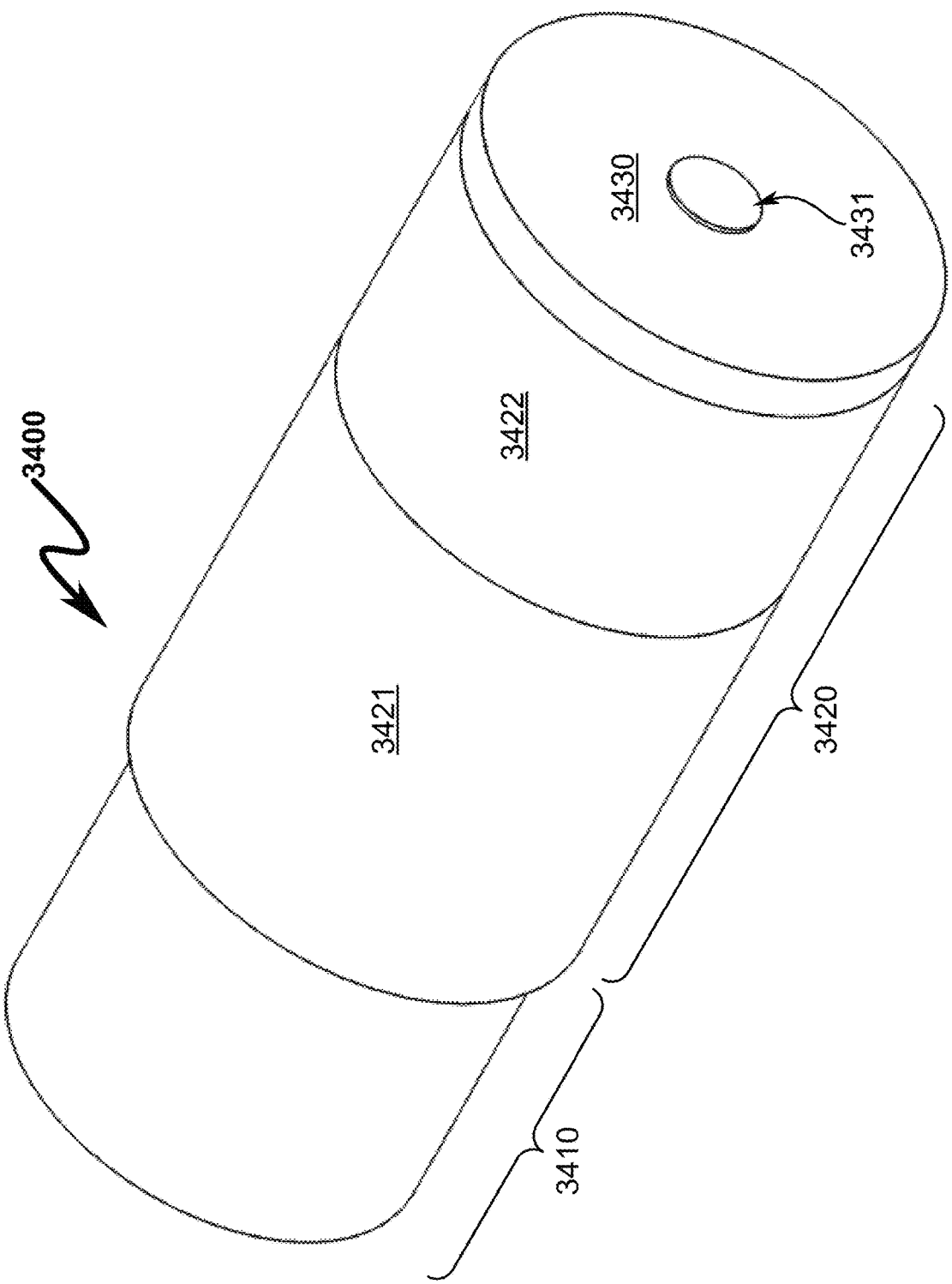
Figure 35:
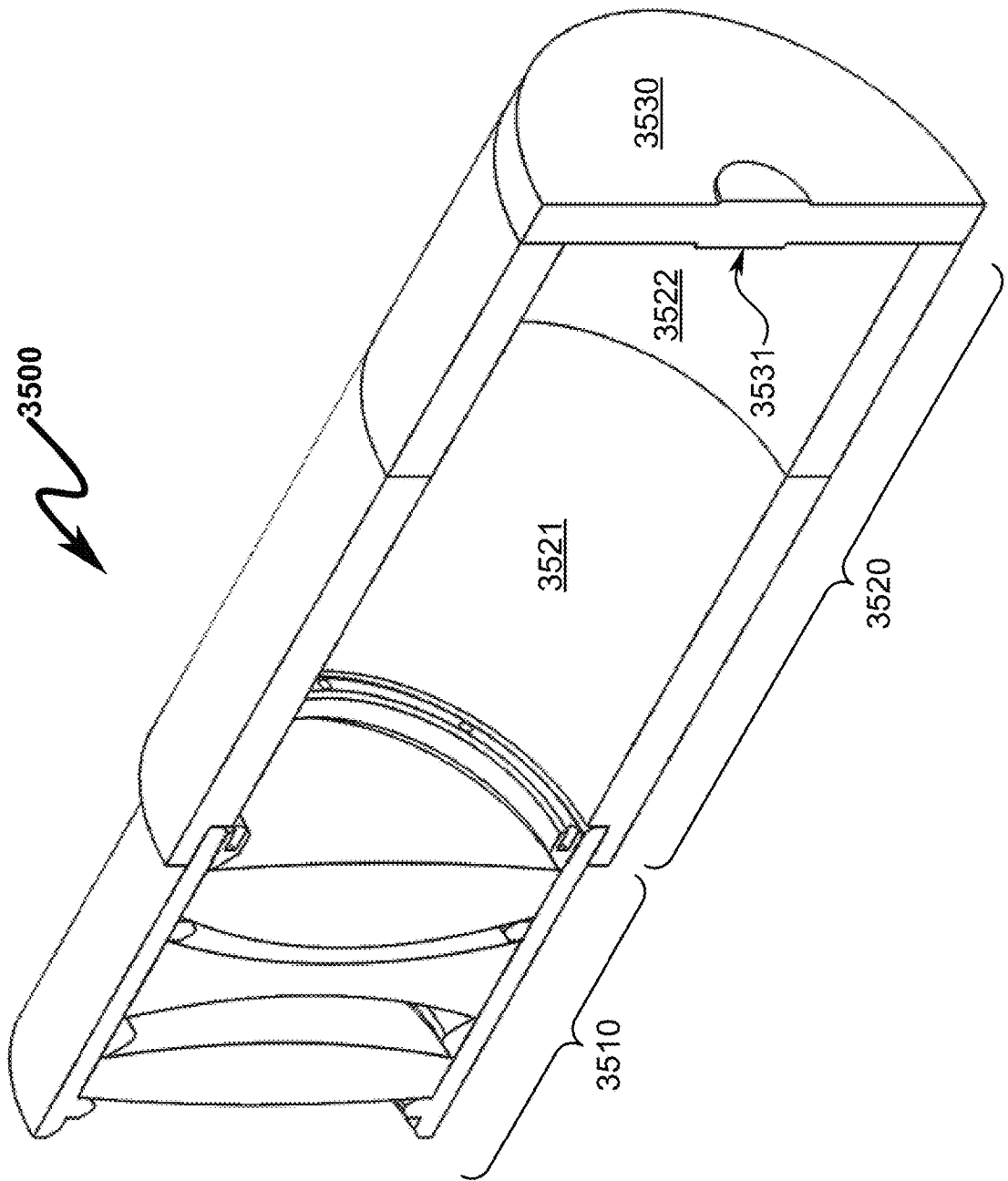
Figure 36:
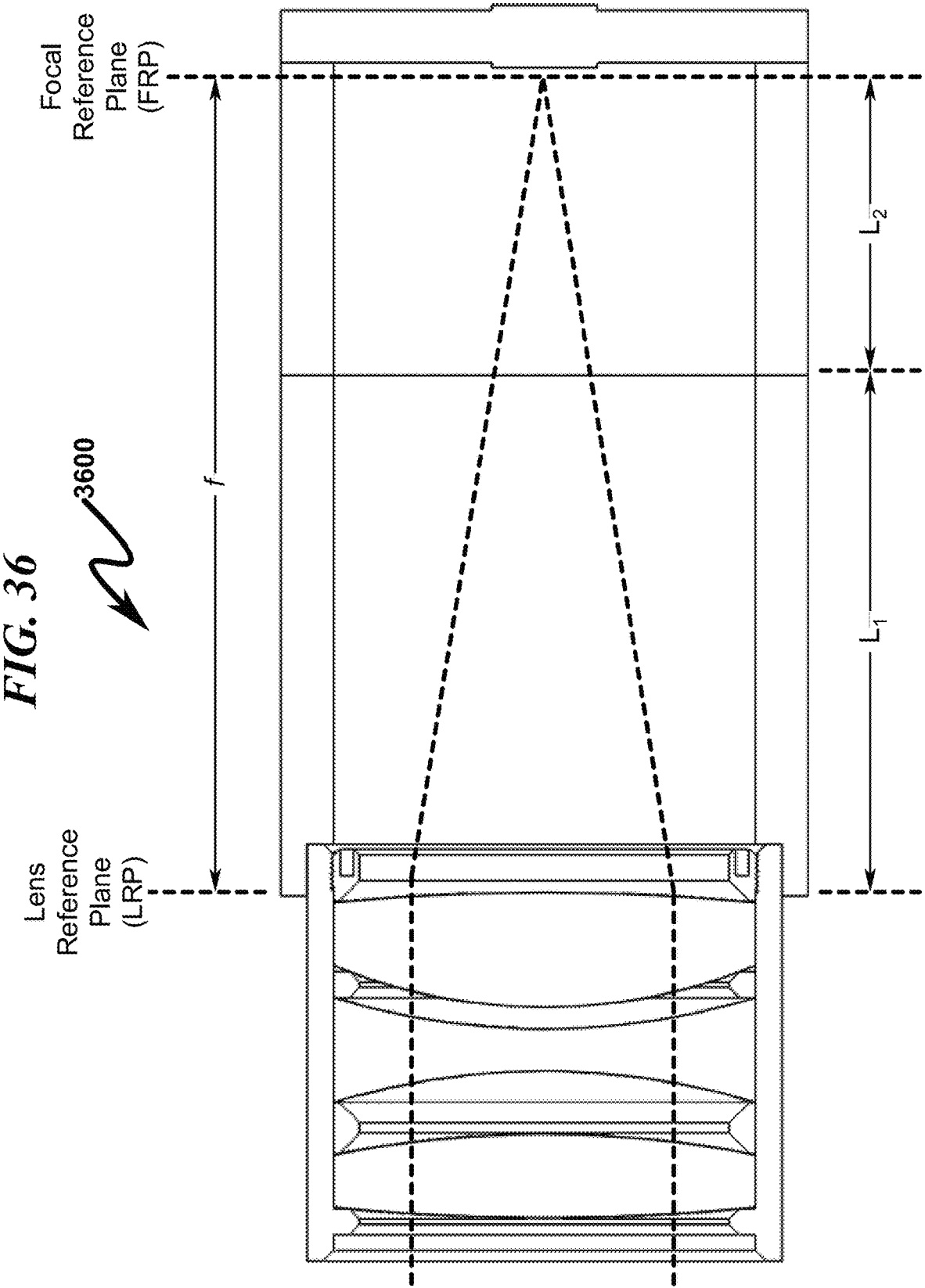
Figure 37:
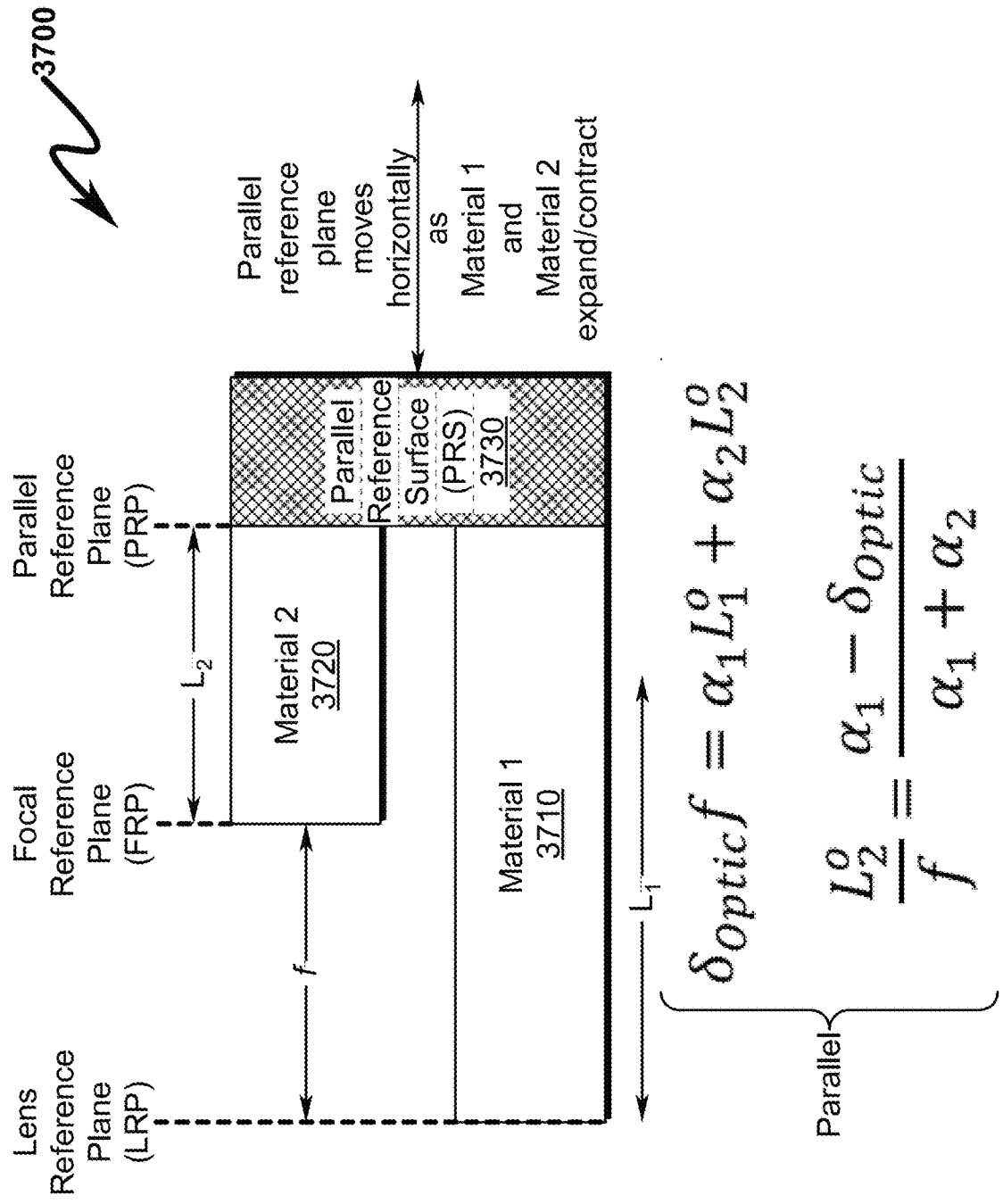
Figure 38:
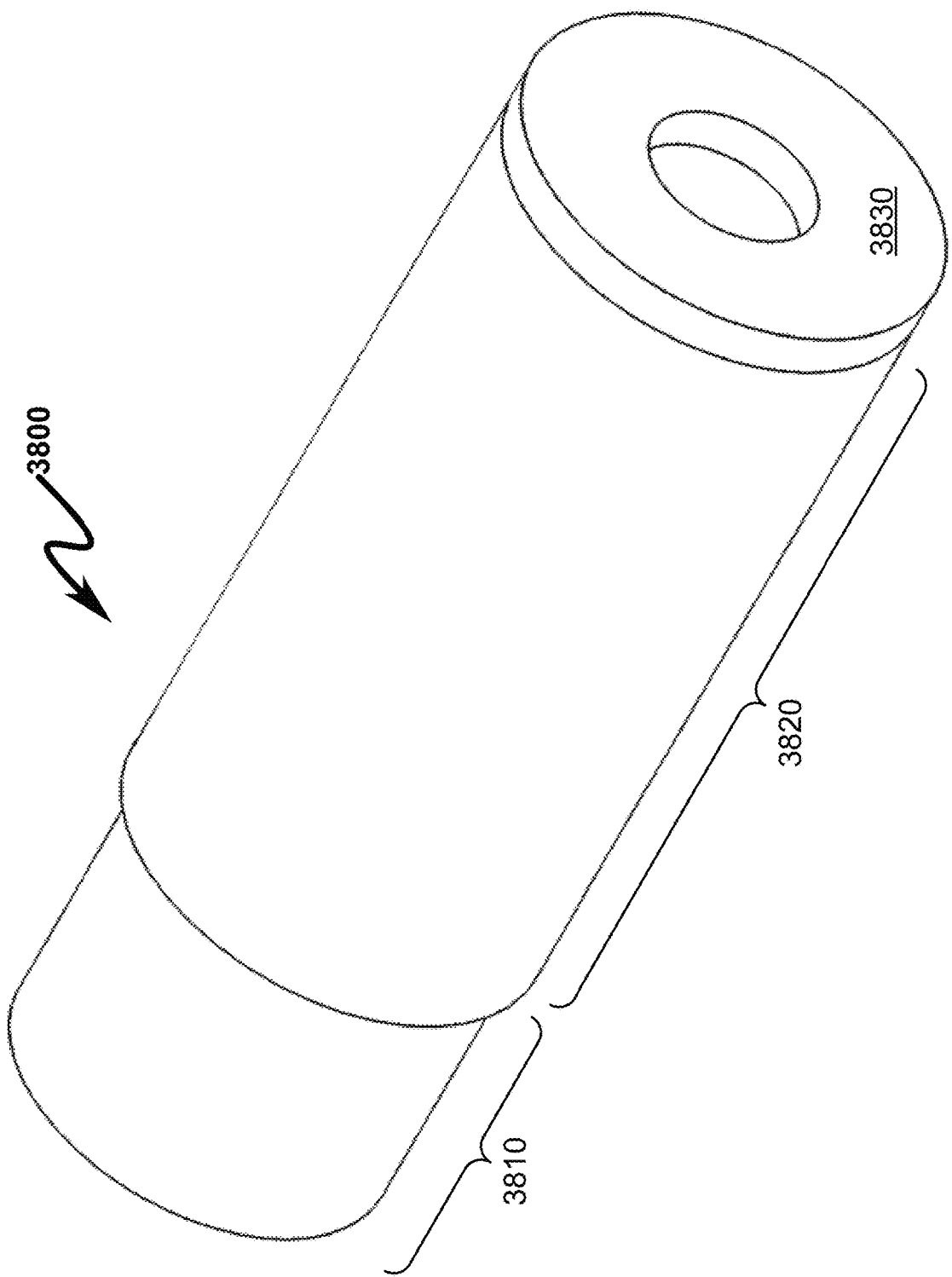
Figure 39:
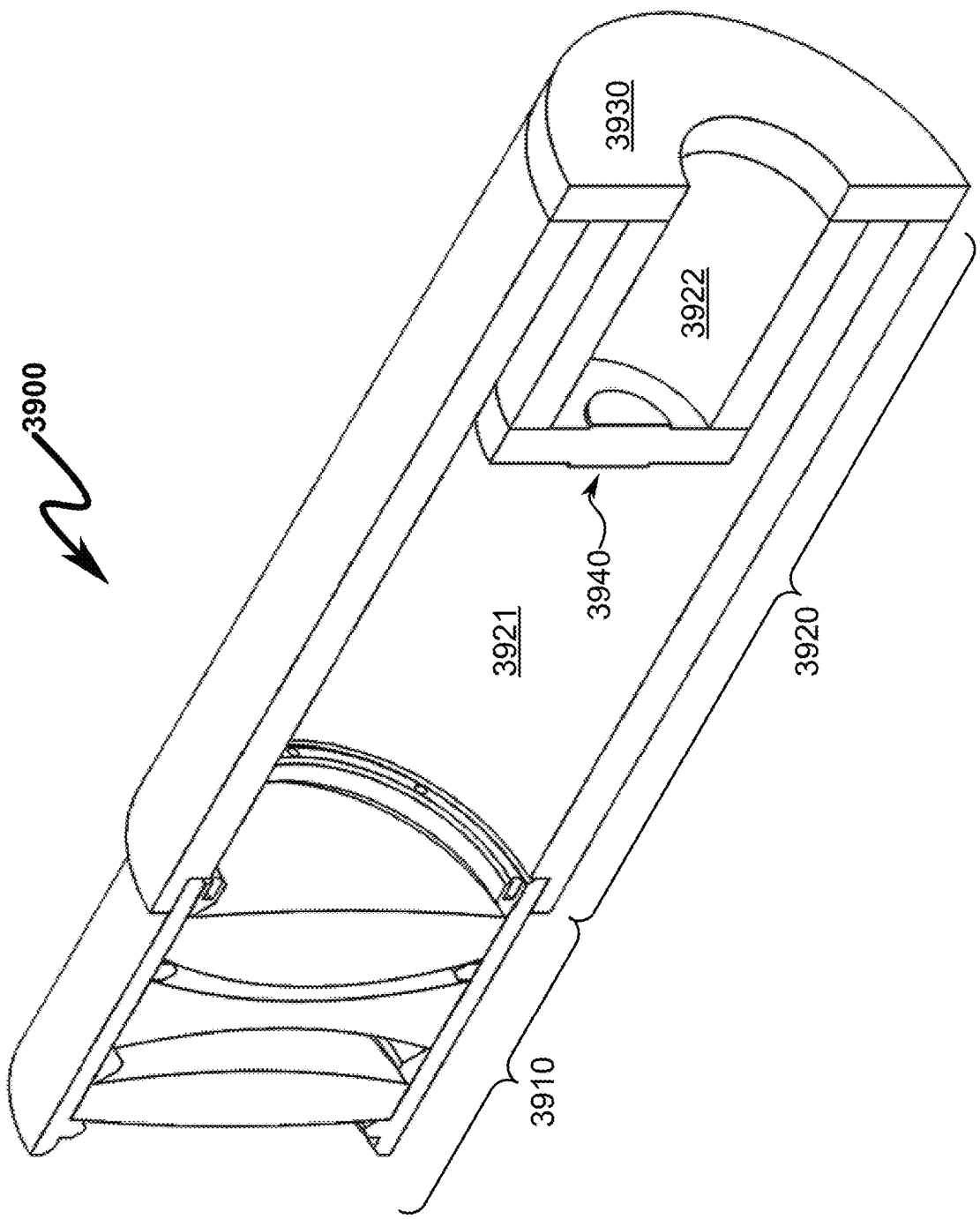
Figure 40:
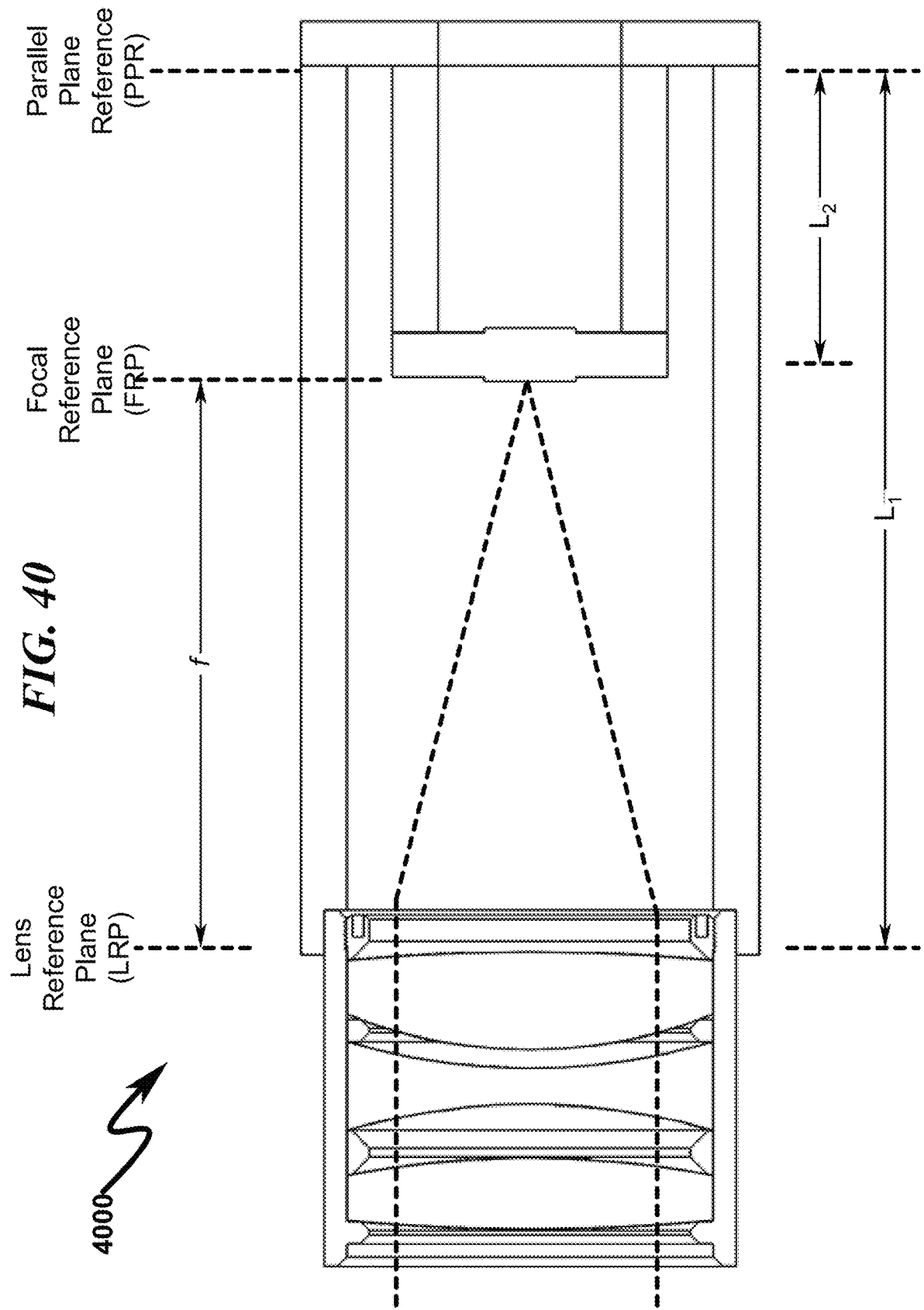
Figure 41:
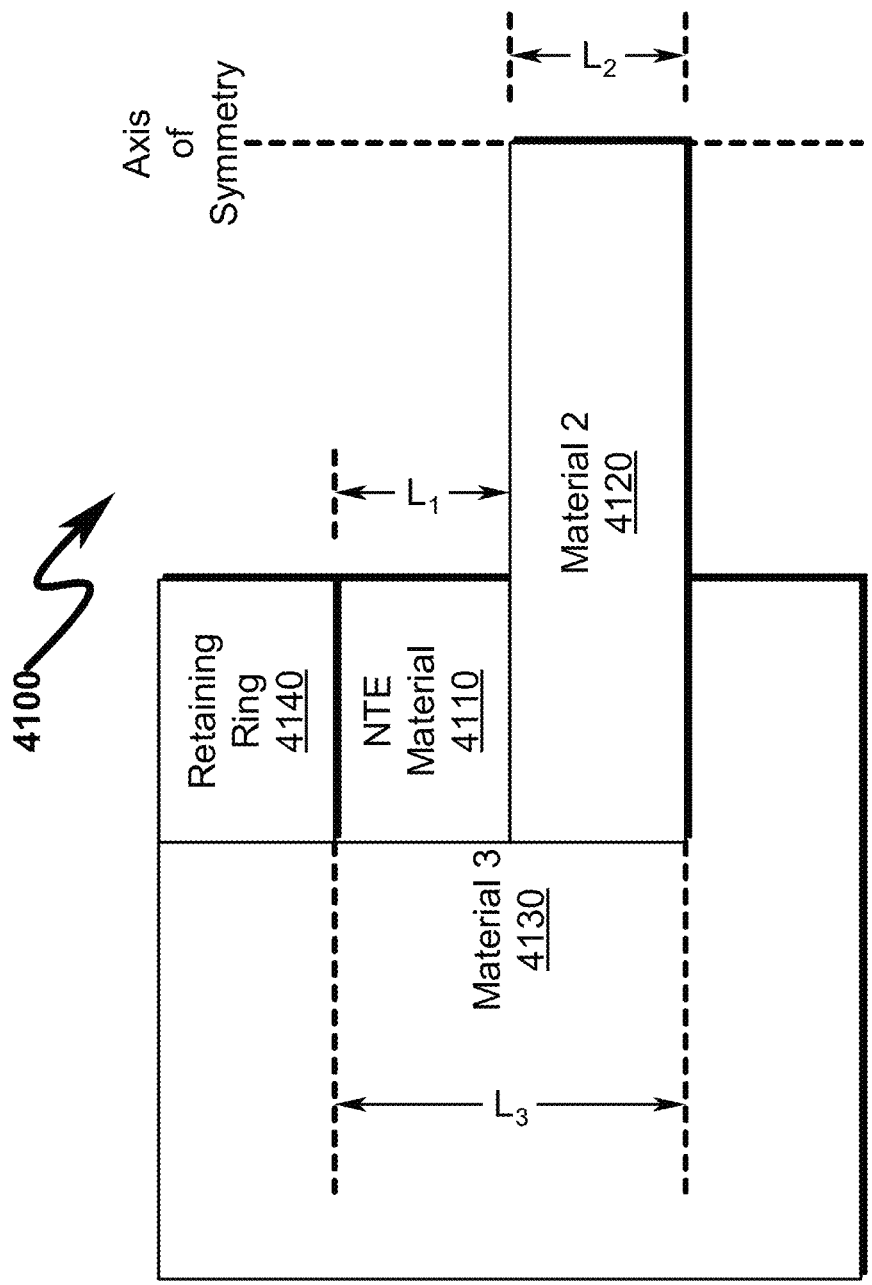
Figure 42:
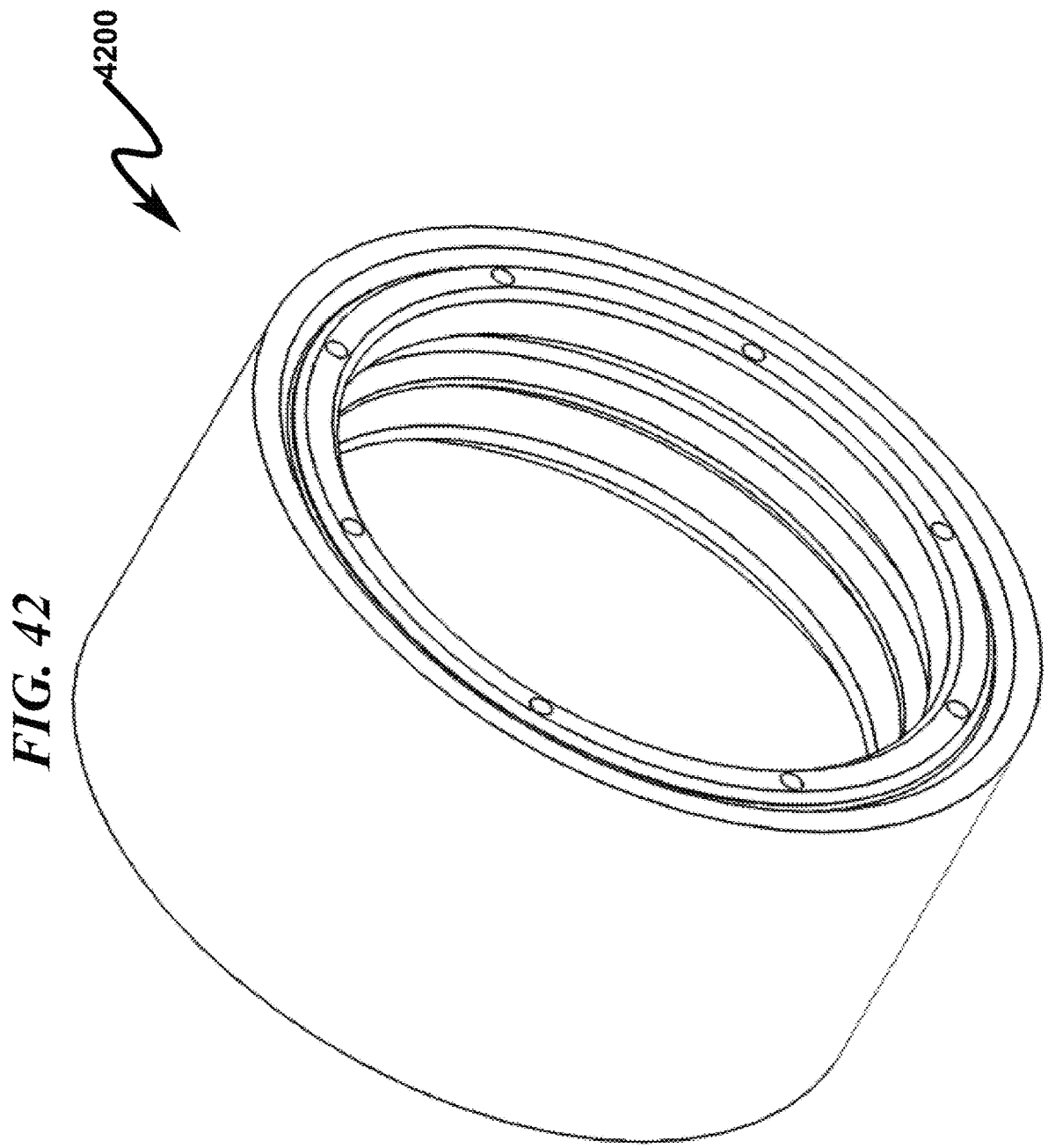
Figure 43:
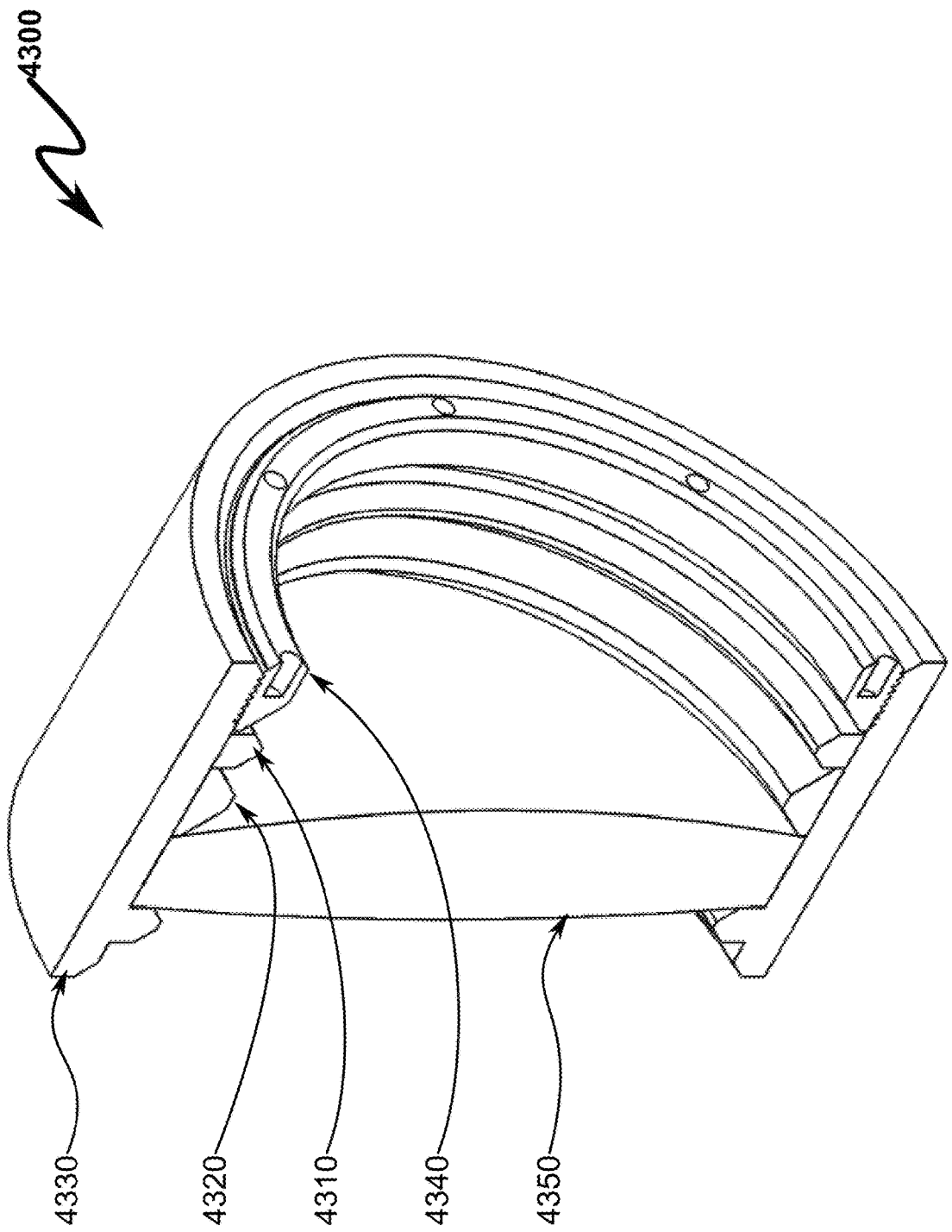
Figure 45:
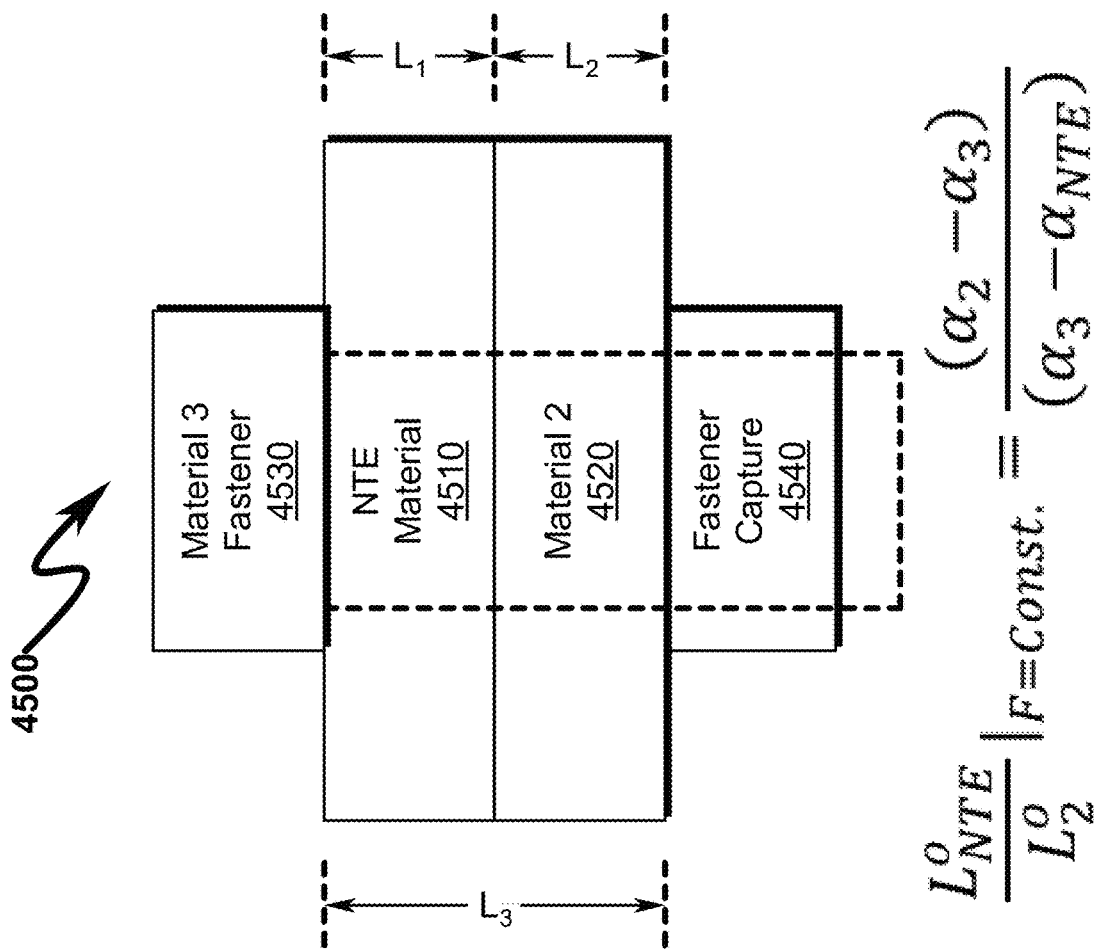
Figure 46:
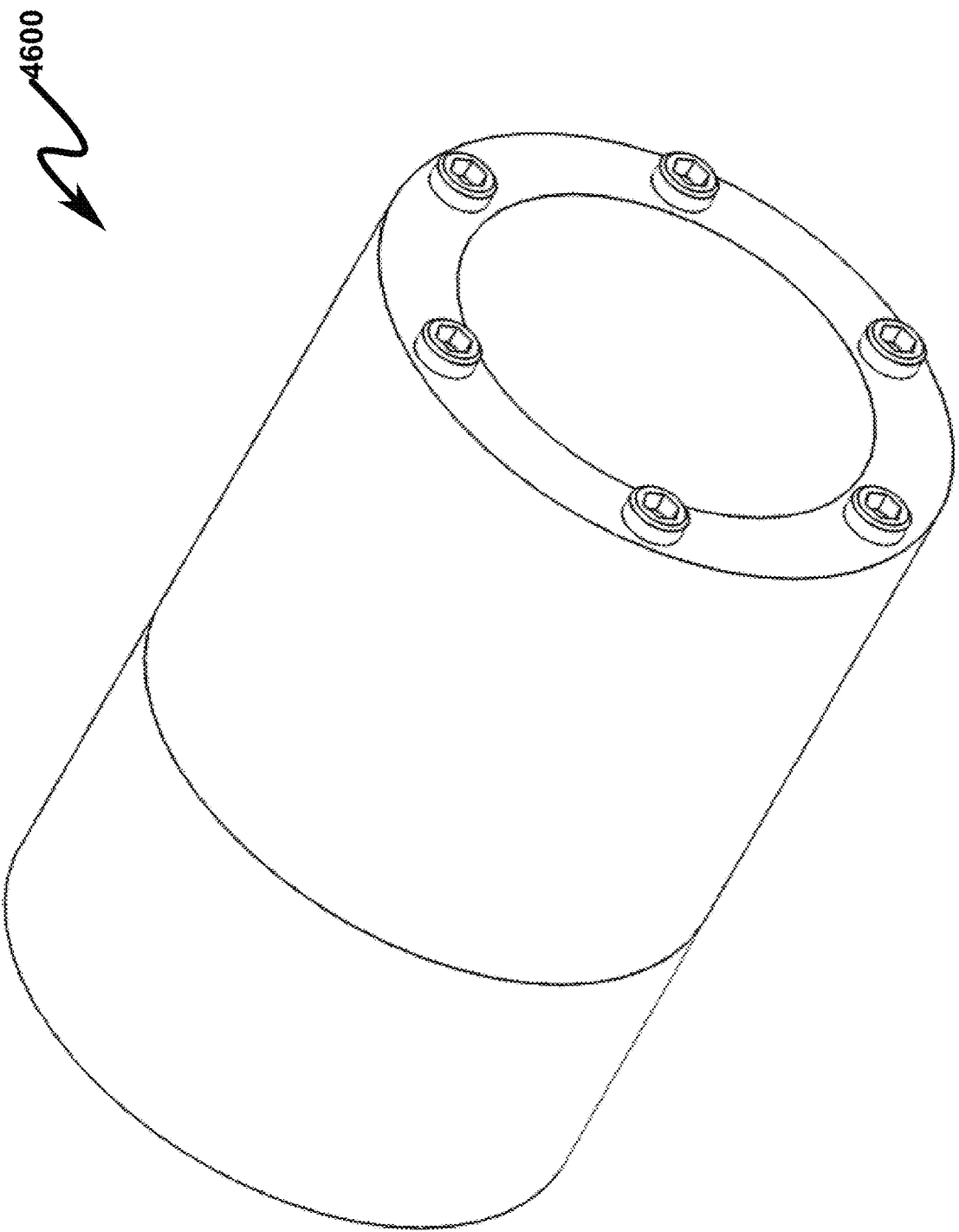
Figure 47:
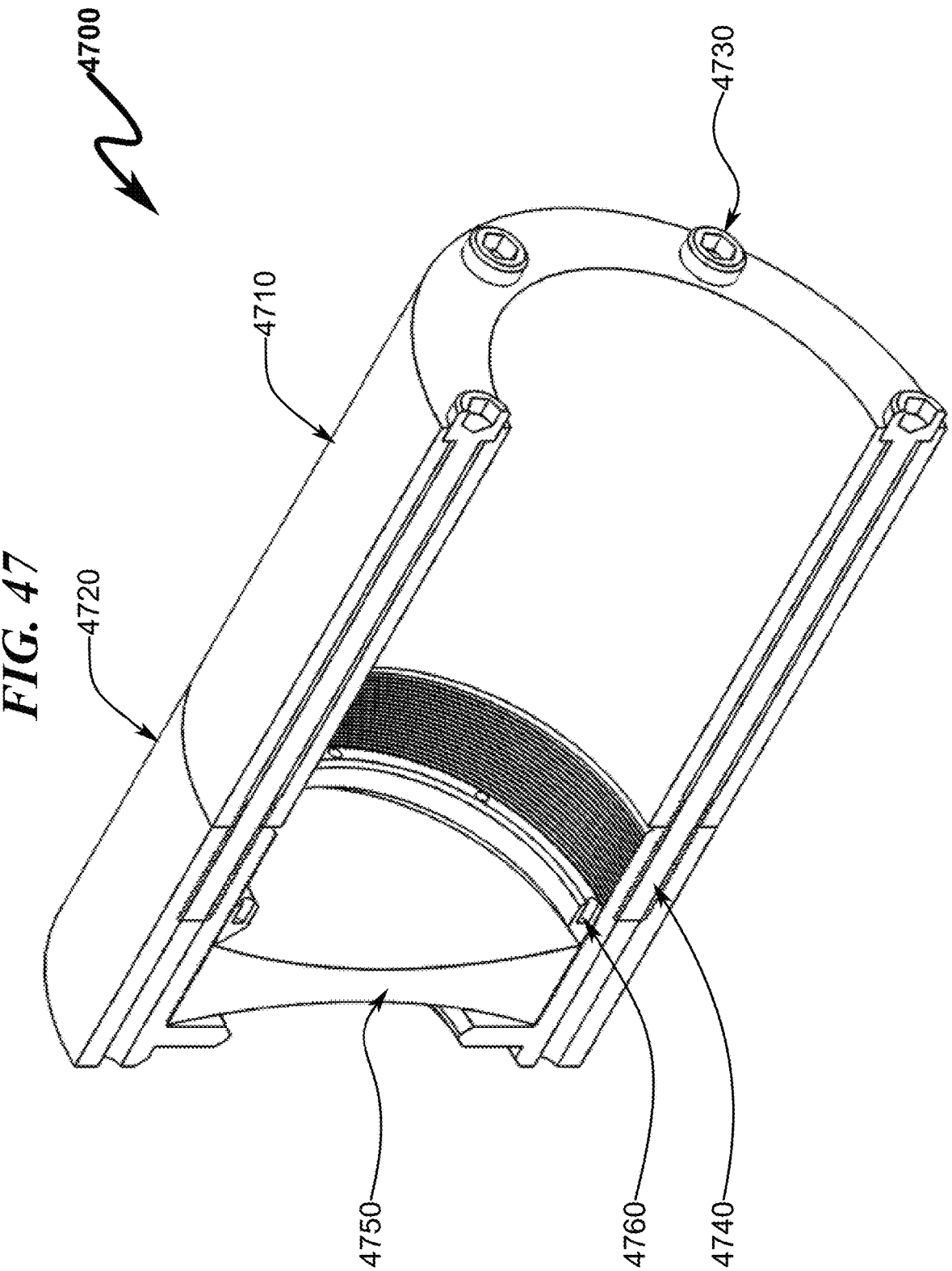
Figure 48:
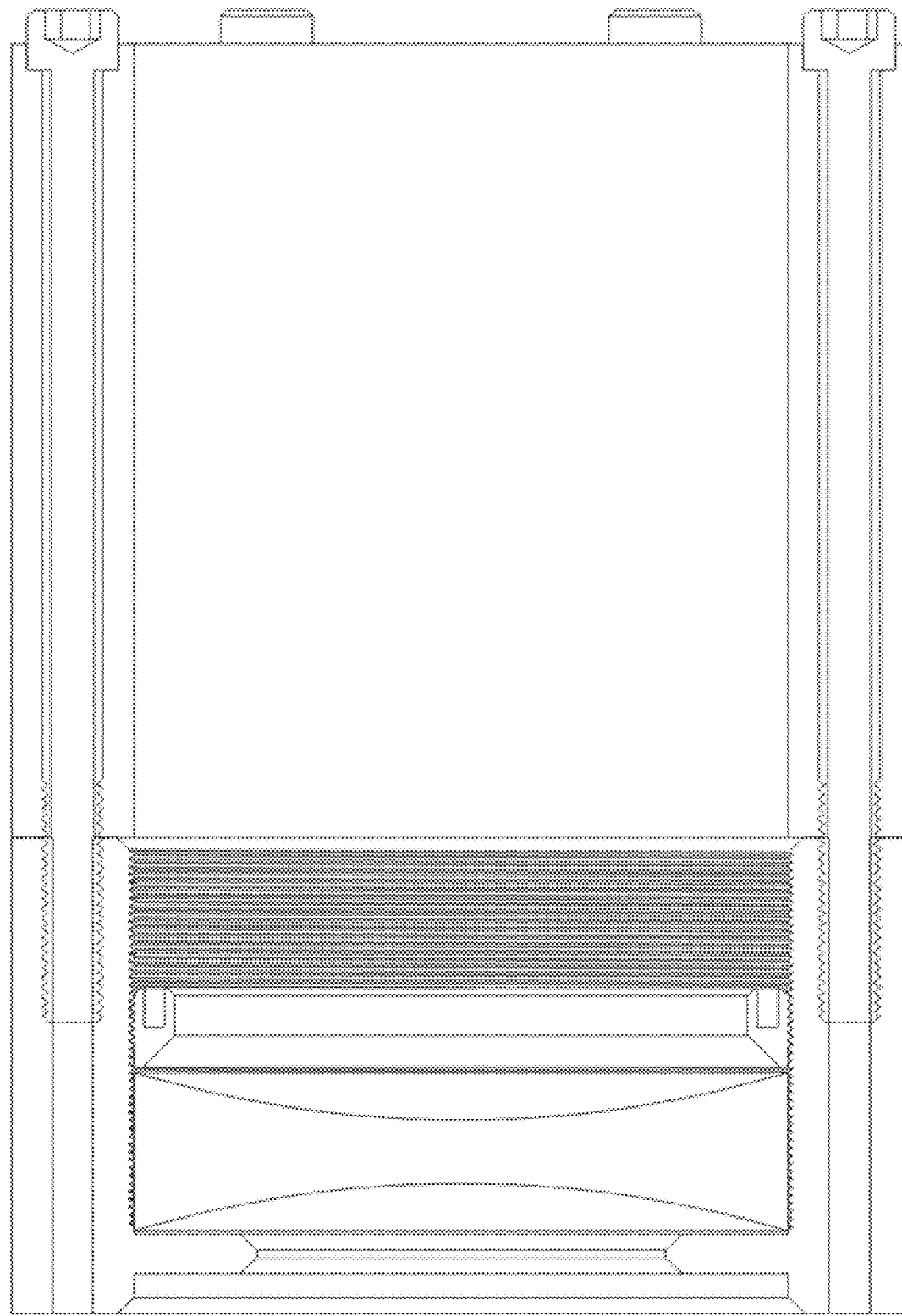
Figure 49:
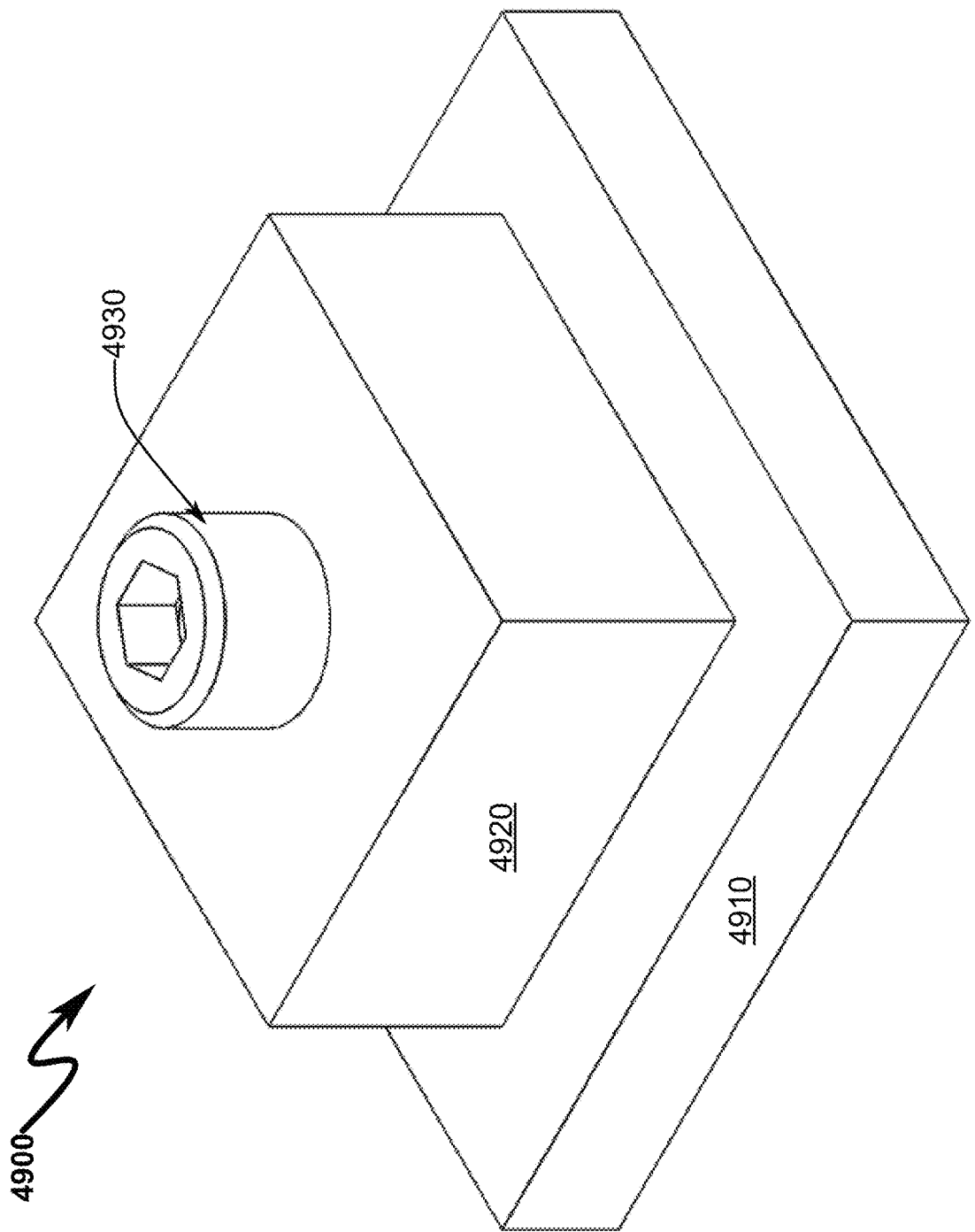
Figure 50:
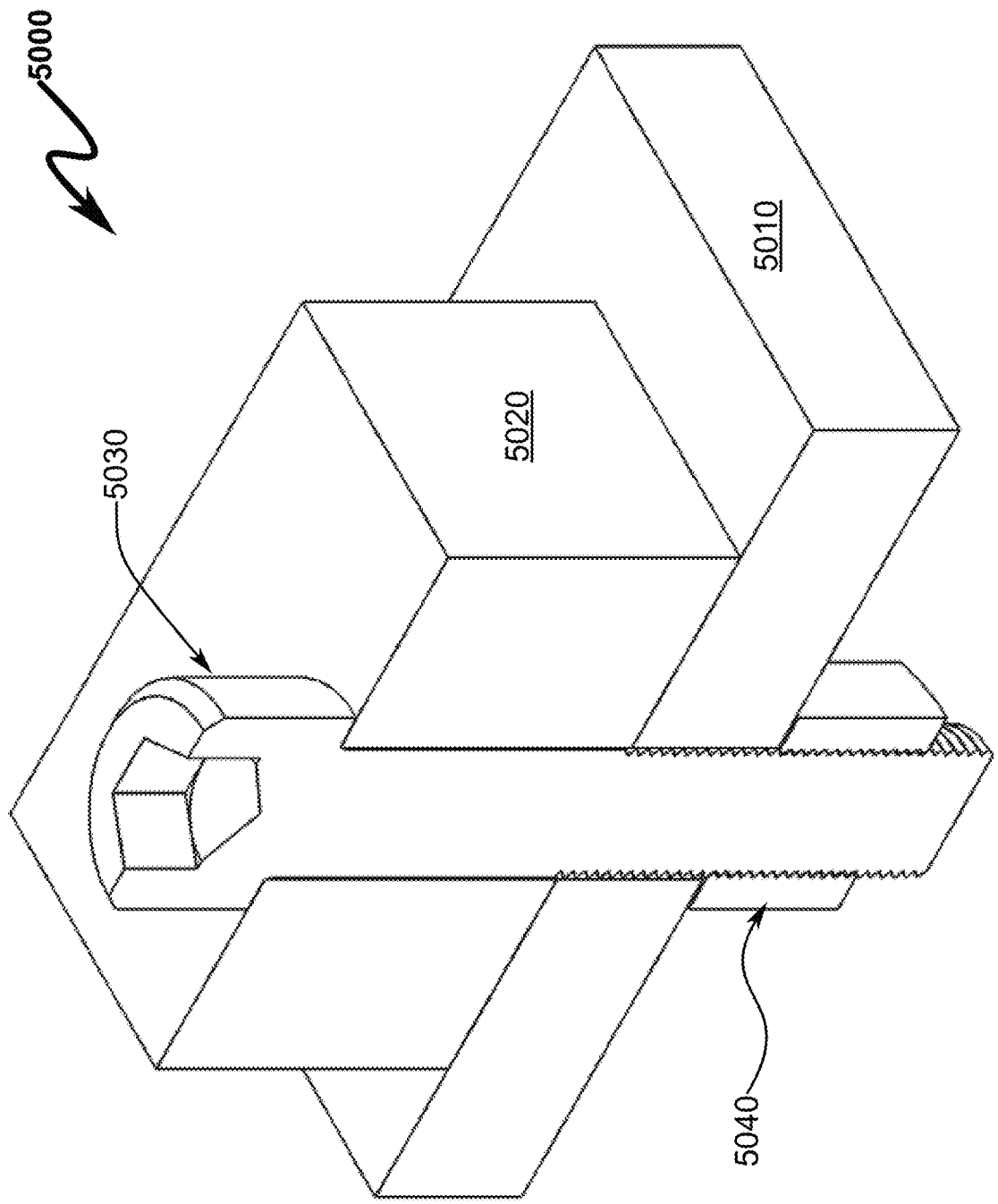
Figure 51:
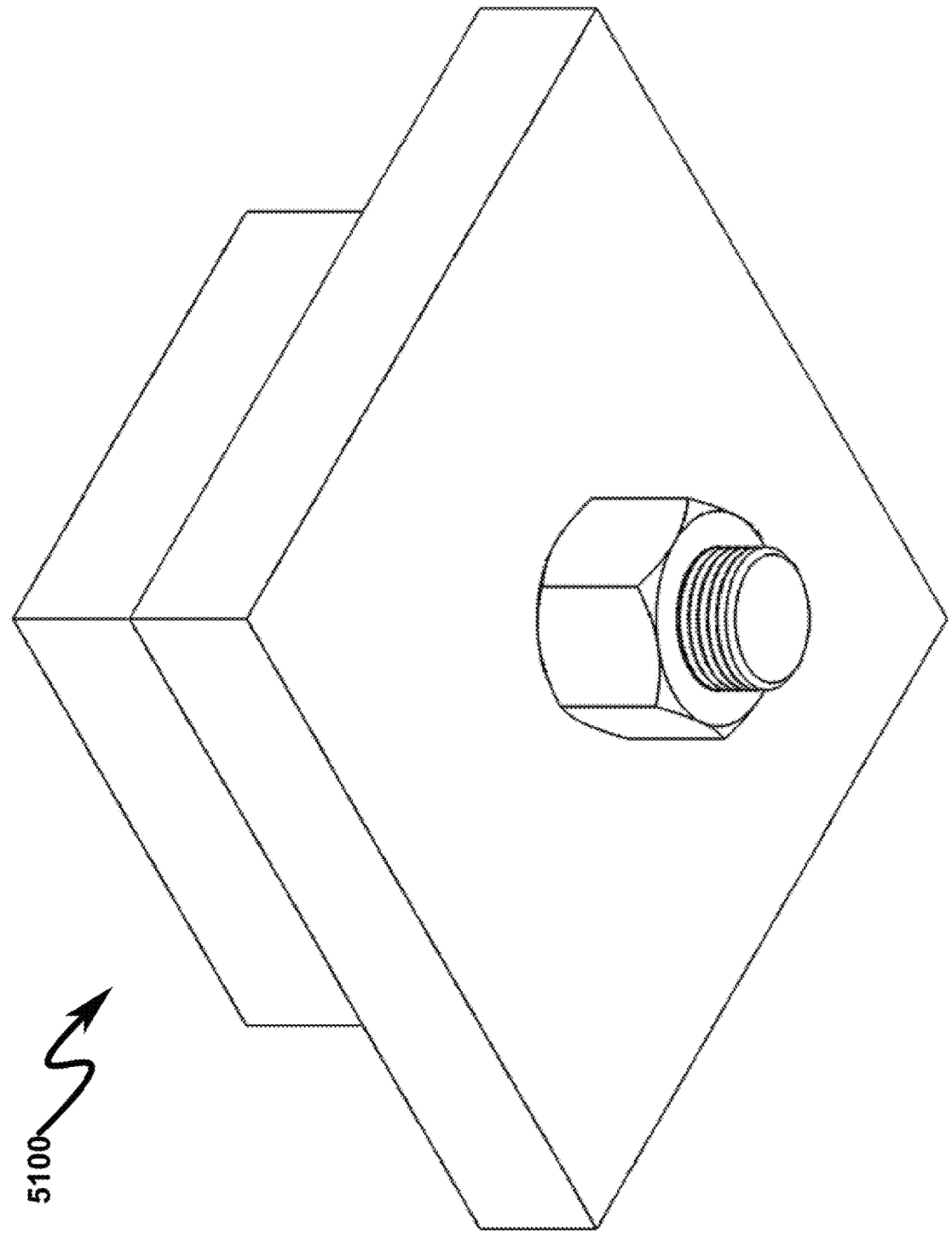
Figure 52:
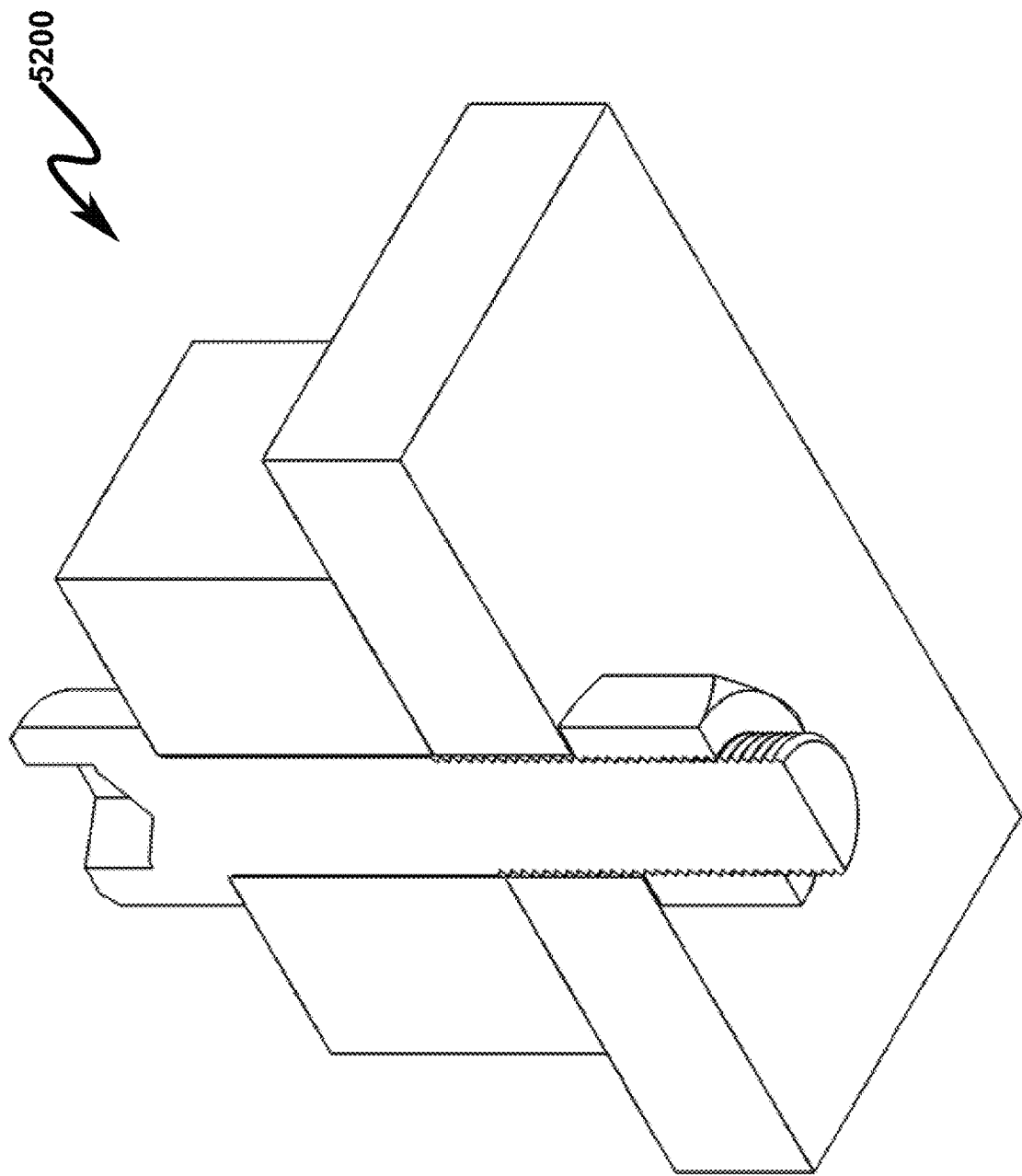
Figure 53:
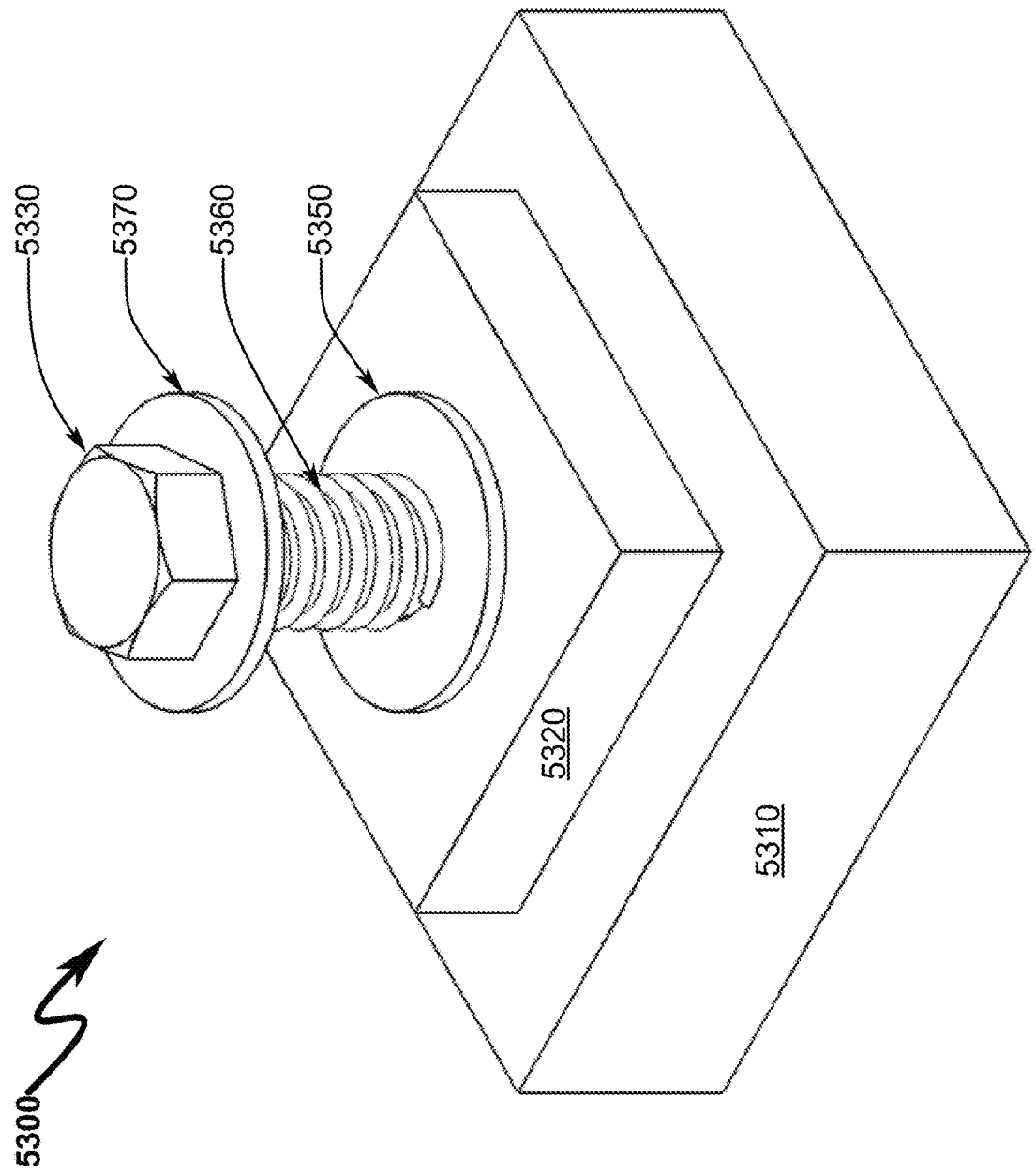
Figure 54:
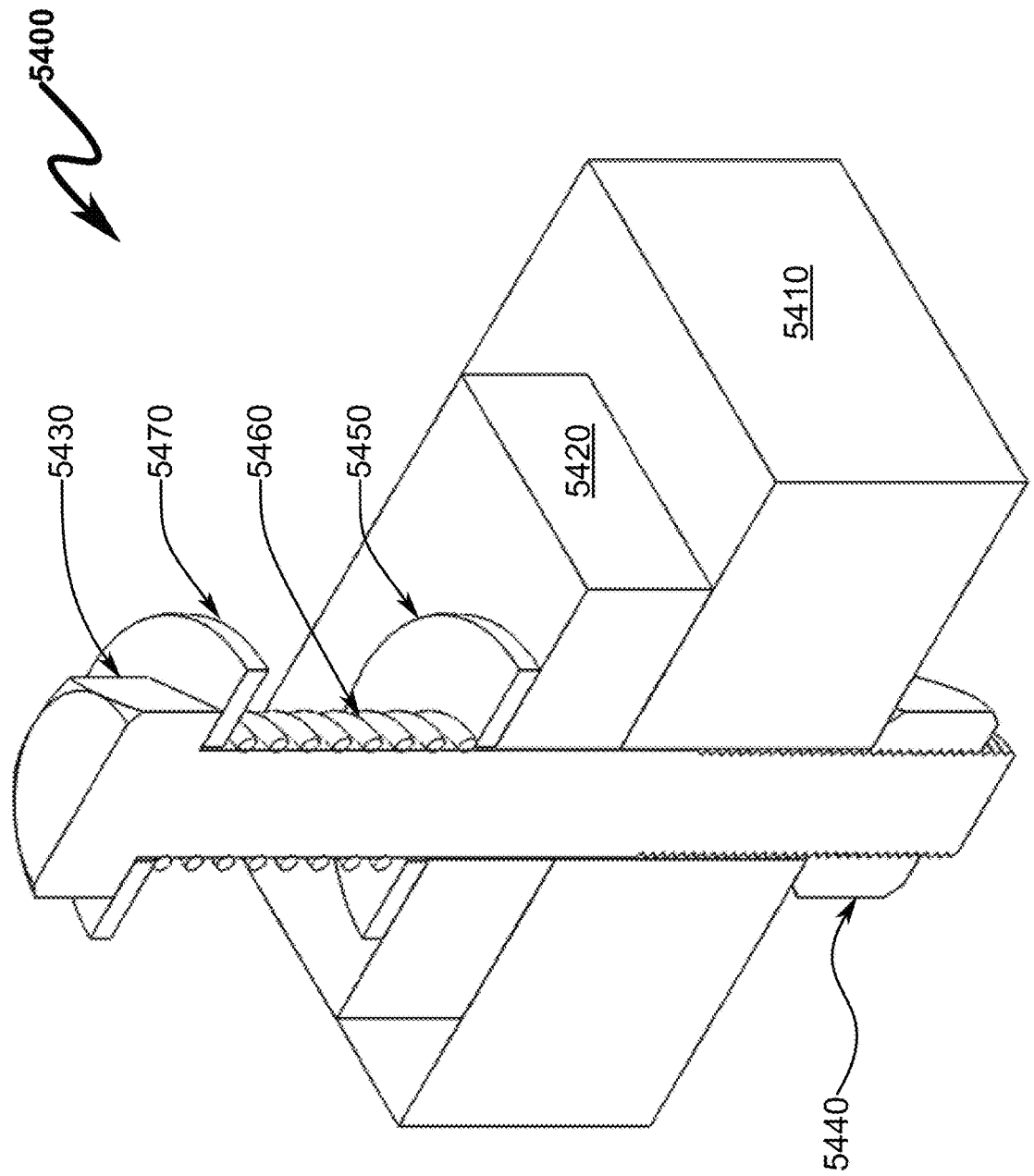
Figure 55:
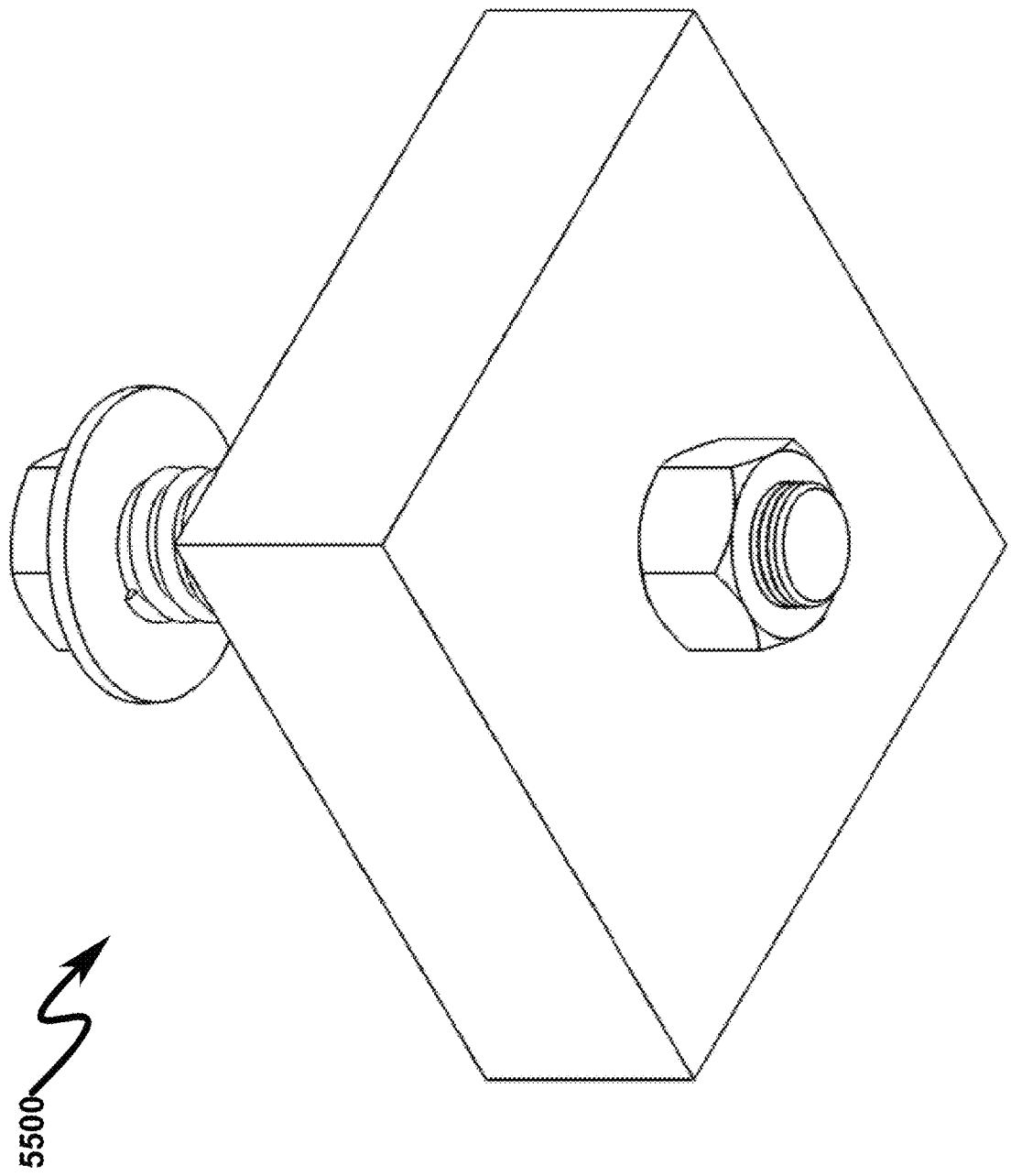
Figure 56:
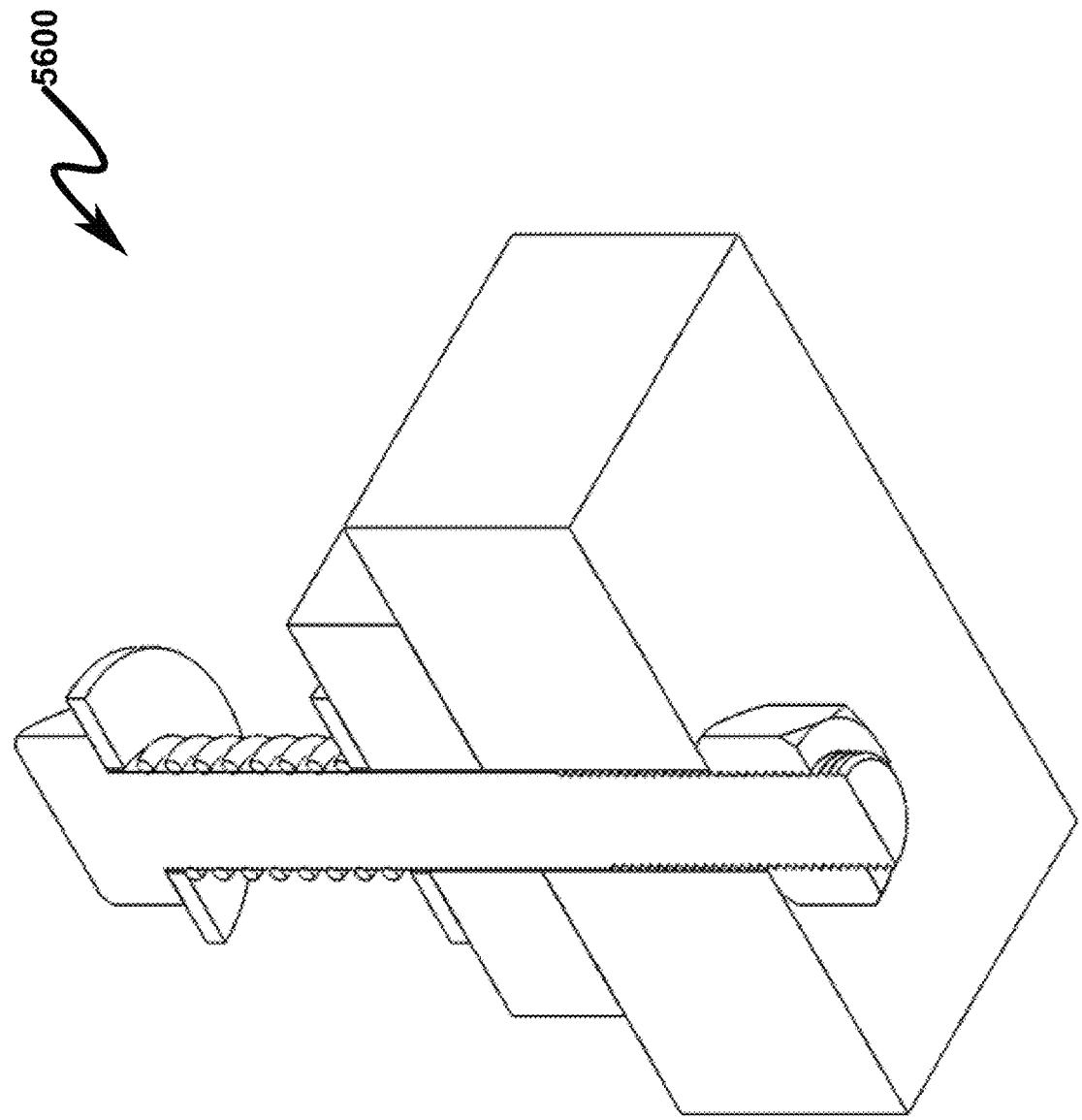

and separated along a common optical axis (COA) with one or more focal length separators (FLS);

FIG. 16 illustrates a right bottom front perspective assembly view of an exemplary tubular optical system (TOS) as taught by the present invention incorporating a plurality of optical lenses (POL) contained within a lens retaining tube (LRT) and separated along a common optical axis (COA) with one or more focal length separators (FLS);

FIG. 17 illustrates a flowchart depicting a preferred exemplary controlled thermal expansion multicomponent product-by-process manufacturing method of fabricating the metallic material having controlled thermal coefficient of expansion that is used in constructing the present invention;

FIG. 18 illustrates a flowchart depicting a preferred exemplary tailored CTE material selection method;

FIG. 19 illustrates a flowchart depicting a preferred exemplary other element material selection method;

FIG. 20 illustrates a flowchart depicting a preferred exemplary determine element dimensions method;

FIG. 21 illustrates a flowchart depicting a preferred exemplary element preparation method;

FIG. 22 illustrates a flowchart depicting a preferred exemplary material joining method;

FIG. 23 illustrates a flowchart depicting a preferred exemplary final preparation method;

FIG. 24 illustrates the range of thermal coefficient of expansion possible using the present invention teachings with respect to compensating for non-zero thermal coefficients of expansion in lenses and other lens retaining mechanisms;

FIG. 25 illustrates an exemplary Prime mirrored telescope application context using the present invention teachings;

FIG. 26 illustrates an exemplary Newtonian mirrored telescope application context using the present invention teachings;

FIG. 27 illustrates an exemplary Cassegrain mirrored telescope application context using the present invention teachings;

FIG. 28 illustrates an exemplary Coude mirrored telescope application context using the present invention teachings; and FIG. 29 illustrates exemplary shapes in which the various components of the present invention may be fabricated to produce structural members supporting lenses and inter-lens distances (page 1/4);

FIG. 30 illustrates exemplary shapes in which the various components of the present invention may be fabricated to produce structural members supporting lenses and inter-lens distances (page 2/4);

FIG. 31 illustrates exemplary shapes in which the various components of the present invention may be fabricated to produce structural members supporting lenses and inter-lens distances (page 3/4);

FIG. 32 illustrates exemplary shapes in which the various components of the present invention may be fabricated to produce structural members supporting lenses and inter-lens distances (page 4/4);

FIG. 33 illustrates a block diagram depicting generalized preferred exemplary series tailored athermally stabilized optical system (STASOS);

FIG. 34 illustrates a perspective view depicting a preferred exemplary series tailored athermally stabilized optical system (STASOS);

FIG. 35 illustrates a perspective front section view depicting a preferred exemplary series tailored athermally stabilized optical system (STASOS);

FIG. 36 illustrates a front section view depicting a preferred exemplary series tailored athermally stabilized optical system (STASOS) with optical transmission paths and focal reference plane (FRP) identified;

FIG. 37 illustrates a block diagram depicting a generalized preferred exemplary parallel tailored athermally stabilized optical system (PTASOS);

FIG. 38 illustrates a perspective view depicting a preferred exemplary parallel tailored athermally stabilized optical system (PTASOS);

FIG. 39 illustrates a perspective front section view depicting a preferred exemplary parallel tailored athermally stabilized optical system (PTASOS);

FIG. 40 illustrates a front section view depicting a preferred exemplary parallel tailored athermally stabilized optical system (PTASOS) with optical transmission paths and focal reference plane (FRP) identified;

FIG. 41 illustrates a block diagram depicting a generalized preferred exemplary pre-loaded housing tailored athermally stabilized lens retention/sealing system;

FIG. 42 illustrates a perspective view depicting a preferred exemplary pre-loaded housing tailored athermally stabilized lens retention/sealing system;

FIG. 43 illustrates a perspective front section view depicting a preferred exemplary pre-loaded housing tailored athermally stabilized lens retention/sealing system;

FIG. 44 illustrates a front section view depicting a preferred exemplary pre-loaded housing tailored athermally stabilized lens retention/sealing system;

FIG. 45 illustrates a block diagram depicting a generalized preferred exemplary pre-loaded fastener tailored athermally stabilized lens retention/sealing system;

FIG. 46 illustrates a perspective view depicting a preferred exemplary pre-loaded fastener tailored athermally stabilized lens retention/sealing system;

FIG. 47 illustrates a perspective front section view depicting a preferred exemplary pre-loaded fastener tailored athermally stabilized lens retention/sealing system;

FIG. 48 illustrates a front section view depicting a preferred exemplary pre-loaded fastener tailored athermally stabilized lens retention/sealing system;

FIG. 49 illustrates a top right front perspective view depicting a preferred exemplary athermally stabilized fastener that may be used in any number of lens alignment configurations detailed herein;

FIG. 50 illustrates a top right front perspective section view depicting a preferred exemplary athermally stabilized fastener that may be used in any number of lens alignment configurations detailed herein;

FIG. 51 illustrates a bottom right front perspective view depicting a preferred exemplary athermally stabilized fastener that may be used in any number of lens alignment configurations detailed herein;

FIG. 52 illustrates a bottom right front perspective section view depicting a preferred exemplary athermally stabilized fastener that may be used in any number of lens alignment configurations detailed herein;

FIG. 53 illustrates a top right front perspective view depicting a preferred exemplary athermally stabilized fastener incorporating a thermally stabilized spring retainer;

FIG. 54 illustrates a top right front perspective section view depicting a preferred exemplary athermally stabilized fastener incorporating a thermally stabilized spring retainer;

FIG. 55 illustrates a bottom right front perspective view depicting a preferred exemplary athermally stabilized fastener incorporating a thermally stabilized spring retainer; and FIG. 56 illustrates a bottom right front perspective section view depicting a preferred exemplary athermally stabilized fastener incorporating a thermally stabilized spring retainer.

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a LENS ALIGNMENT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

System Overview (0100)

Figure 1:
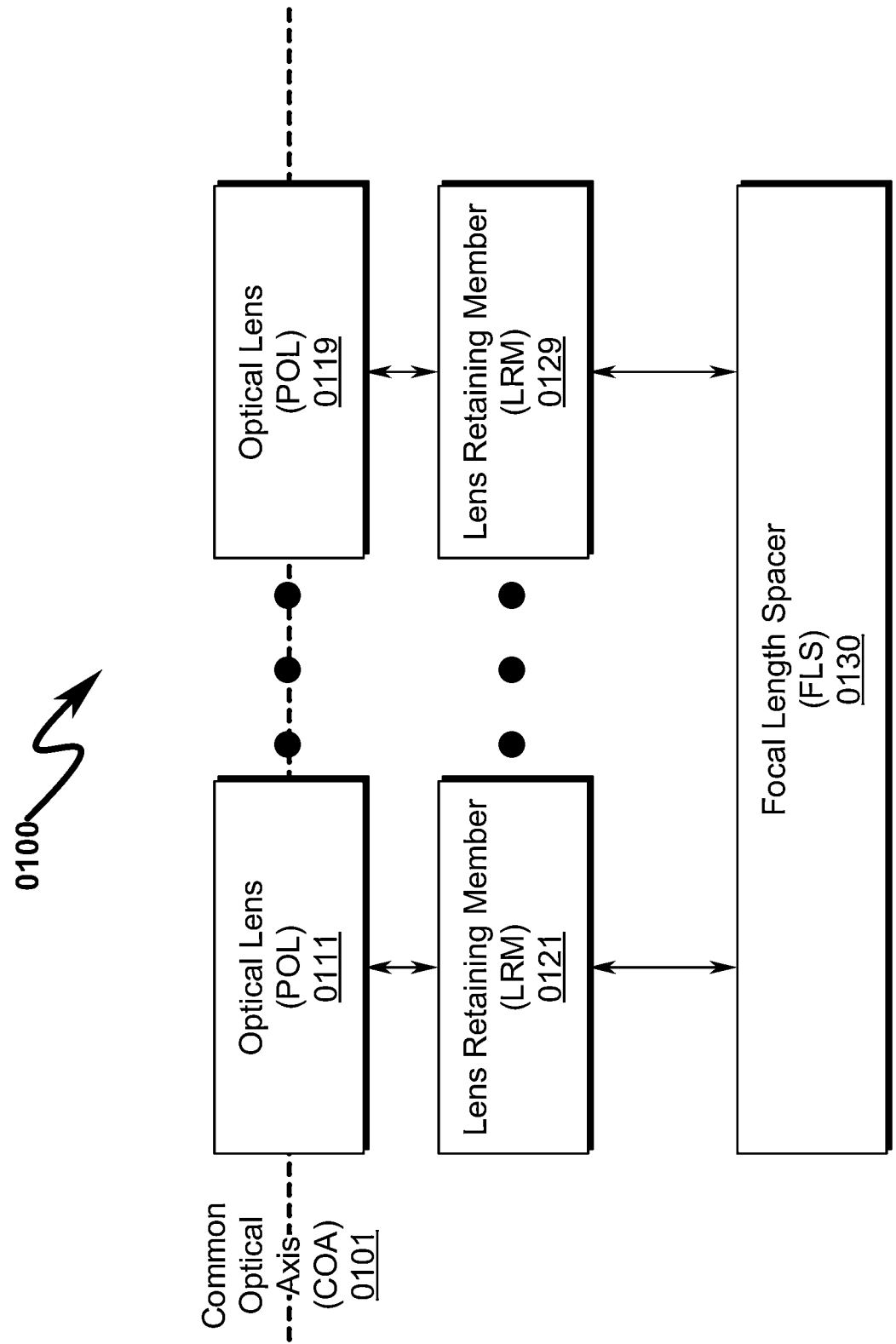
FIG. 1 illustrates a schematic block diagram of a preferred exemplary system embodiment.

A general invention system overview can be seen by referencing FIG. 1 (0100) wherein an optical system is presented in which a plurality of optical lenses (POL) (0111, 0119) are positioned within a corresponding plurality of lens retaining members (LRM) (0121, 0129) and separated along a common optical axis (COA) (0101) with one or more focal length separators (FLS) (0130).

The lens retaining members (LRM) (0121, 0129) and one or more focal length separators (FLS) (0130) are constructed of material having a neutral temperature coefficient or alternatively a temperature coefficient that compensates for the temperature coefficient associated with the plurality of optical lenses (POL) (0111, 0119) such that the overall focal lengths along the common optical axis (COA) (0101) are stable across a wide range of temperatures.

The lens assembly generally consists of lens elements with a common optical axis. The primary lens or lens group may be made up of a single or multiple lens elements and the secondary lens or lens group can be made up of a single or multiple lens elements. The assembly typically focuses light on an image detector. The lens spacing and focal length is maintained by a structural spacer (FLS).

The lenses (POL) and lens groups are made up of elements with a refractive index that change with temperature. By tailoring the thermal expansion of the lens spacer and focal length spacer (FLS) to a specific value, it is possible maintain focus and eliminate image aberrations. The result is a passively athermalized optical lens system.

Exemplary Linear Optical System Context (0200)-(0800)

Figure 2:
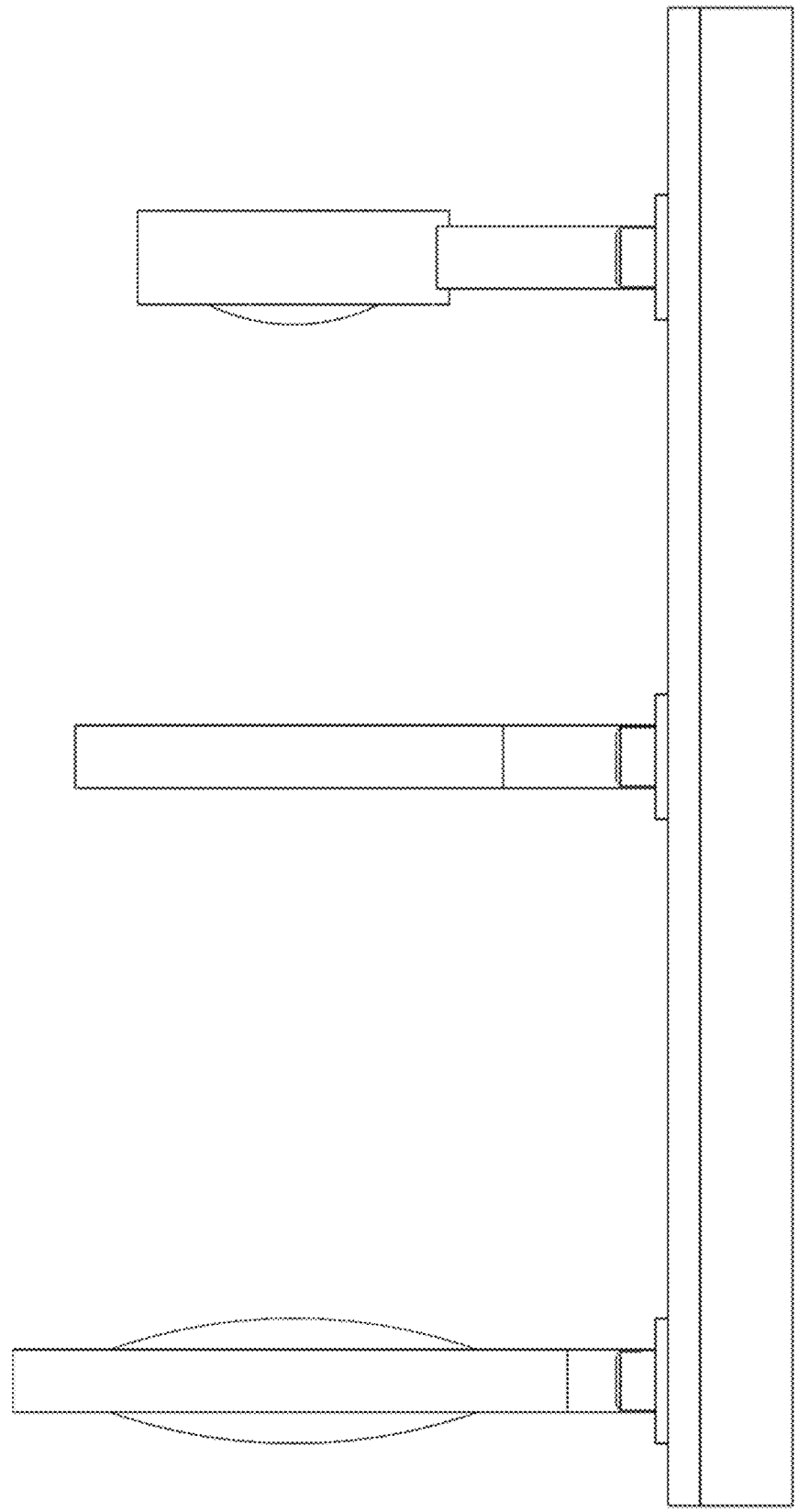
FIG. 2 illustrates a front view of an exemplary optical system as taught by the present invention incorporating a plurality of optical lenses (POL) contained within a corresponding plurality of lens retaining members (LRM) and separated along a common optical axis (COA) with one or more focal length separators (FLS)
Figure 3:
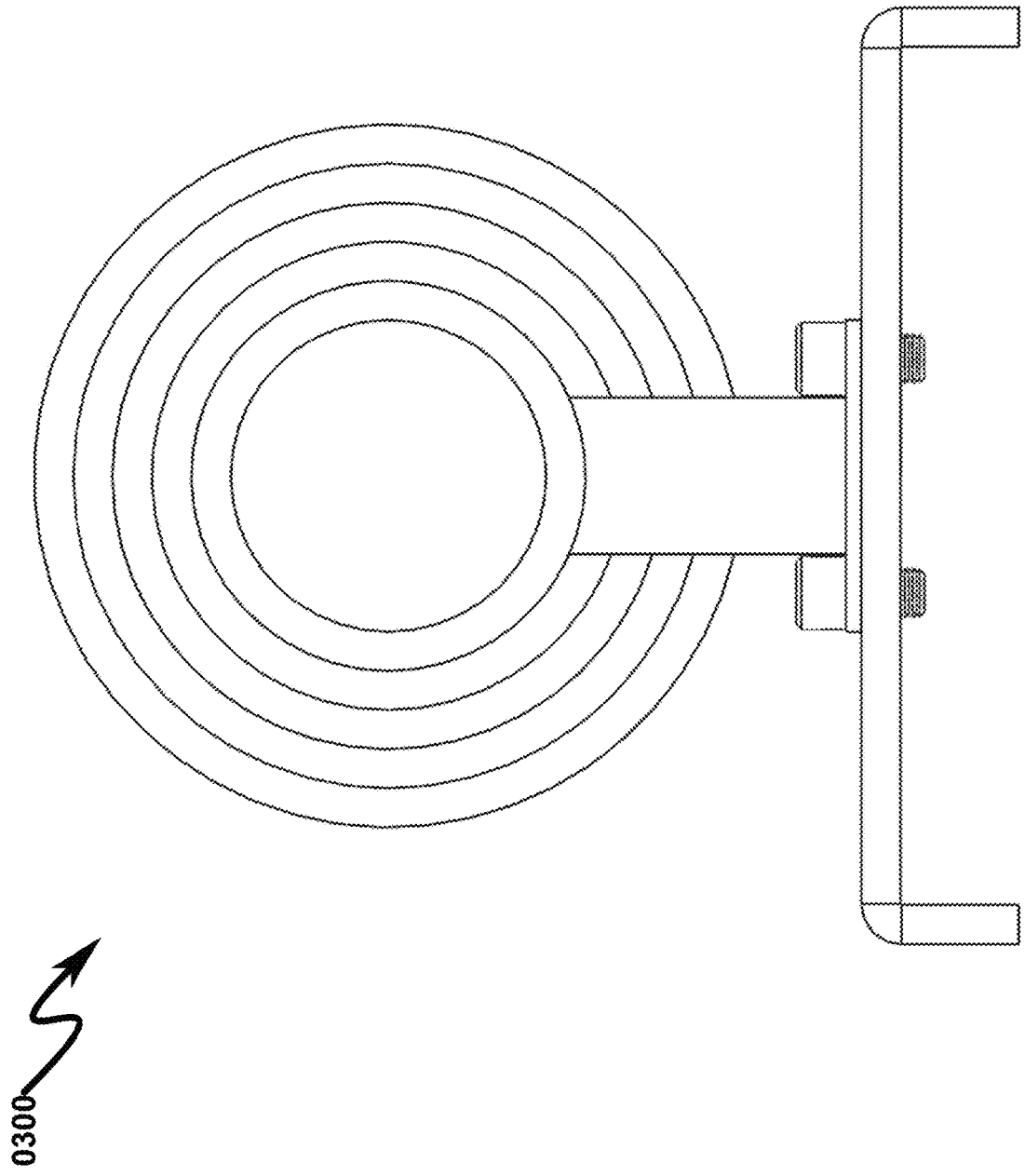
FIG. 3 illustrates a side view of an exemplary optical system as taught by the present invention incorporating a plurality of optical lenses (POL) contained within a corresponding plurality of lens retaining members (LRM) and separated along a common optical axis (COA) with one or more focal length separators (FLS)
Figure 4:
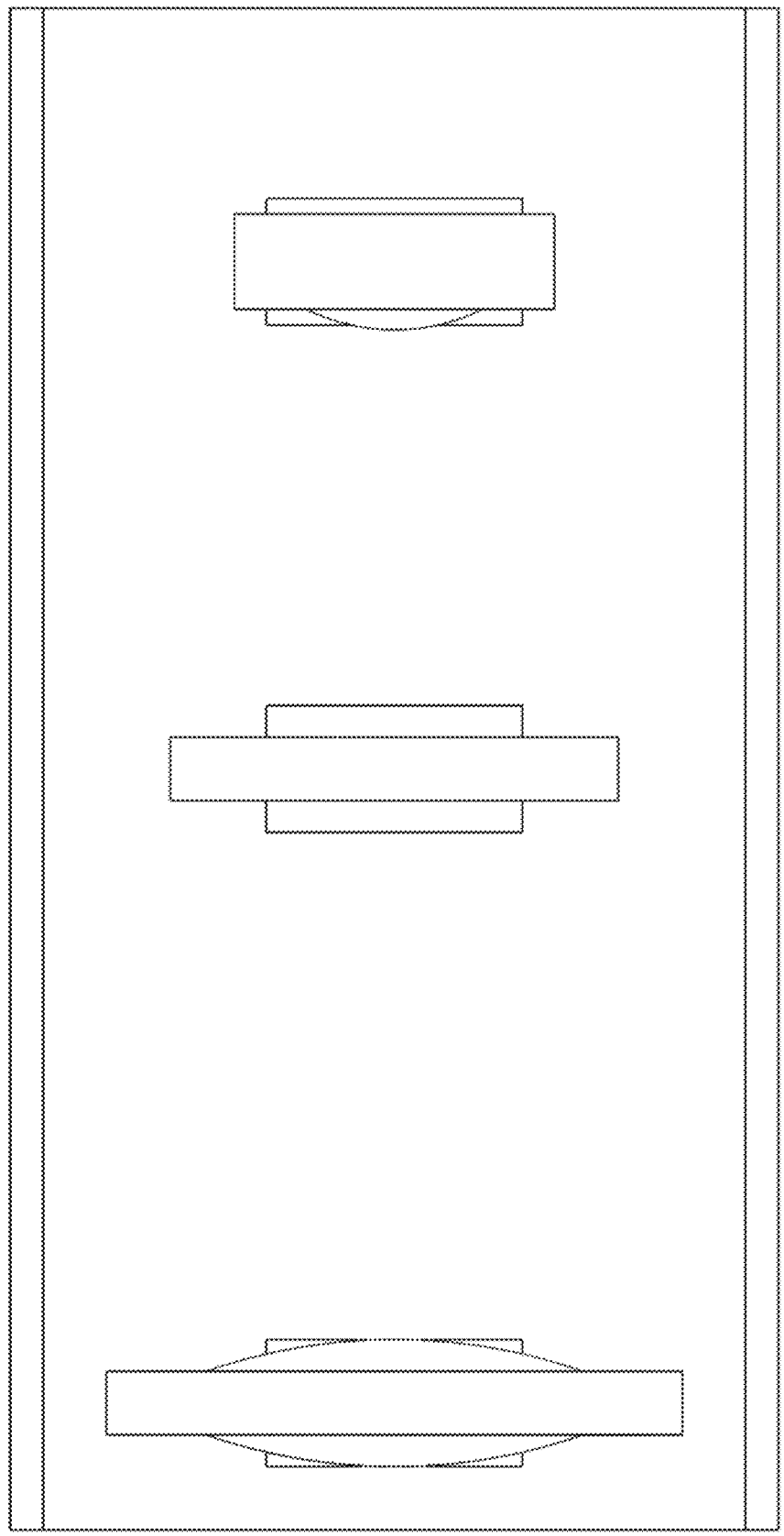
FIG. 4 illustrates a top view of an exemplary optical system as taught by the present invention incorporating a plurality of optical lenses (POL) contained within a corresponding plurality of lens retaining members (LRM) and separated along a common optical axis (COA) with one or more focal length separators (FLS)
Figure 5:
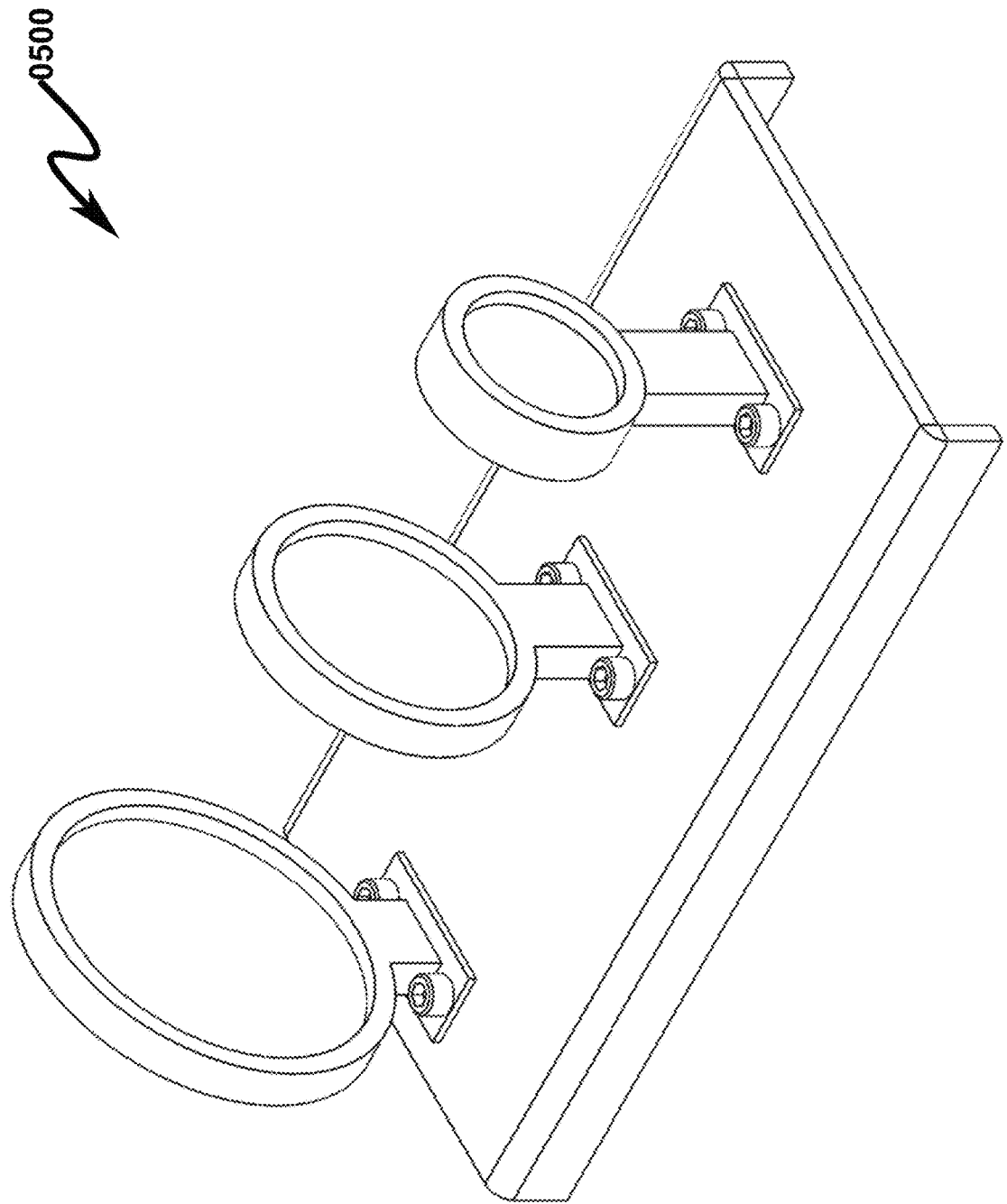
FIG. 5 illustrates a right top front perspective view of an exemplary optical system as taught by the present invention incorporating a plurality of optical lenses (POL) contained within a corresponding plurality of lens retaining members (LRM) and separated along a common optical axis (COA) with one or more focal length separators (FLS)
Figure 6:
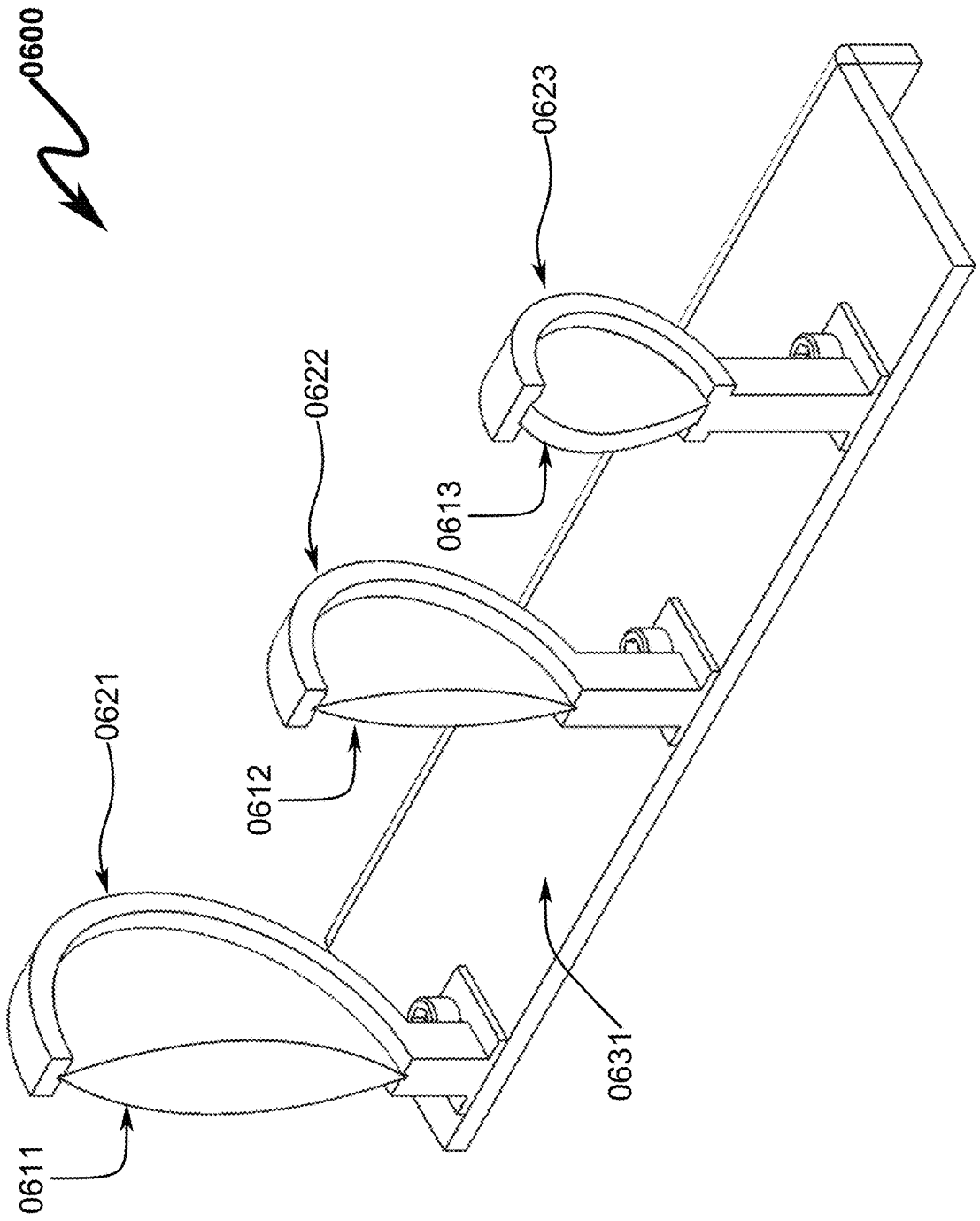
FIG. 6 illustrates a right top front perspective front section view of an exemplary optical system as taught by the present invention incorporating a plurality of optical lenses (POL) contained within a corresponding plurality of lens retaining members (LRM) and separated along a common optical axis (COA) with one or more focal length separators (FLS)
Figure 7:
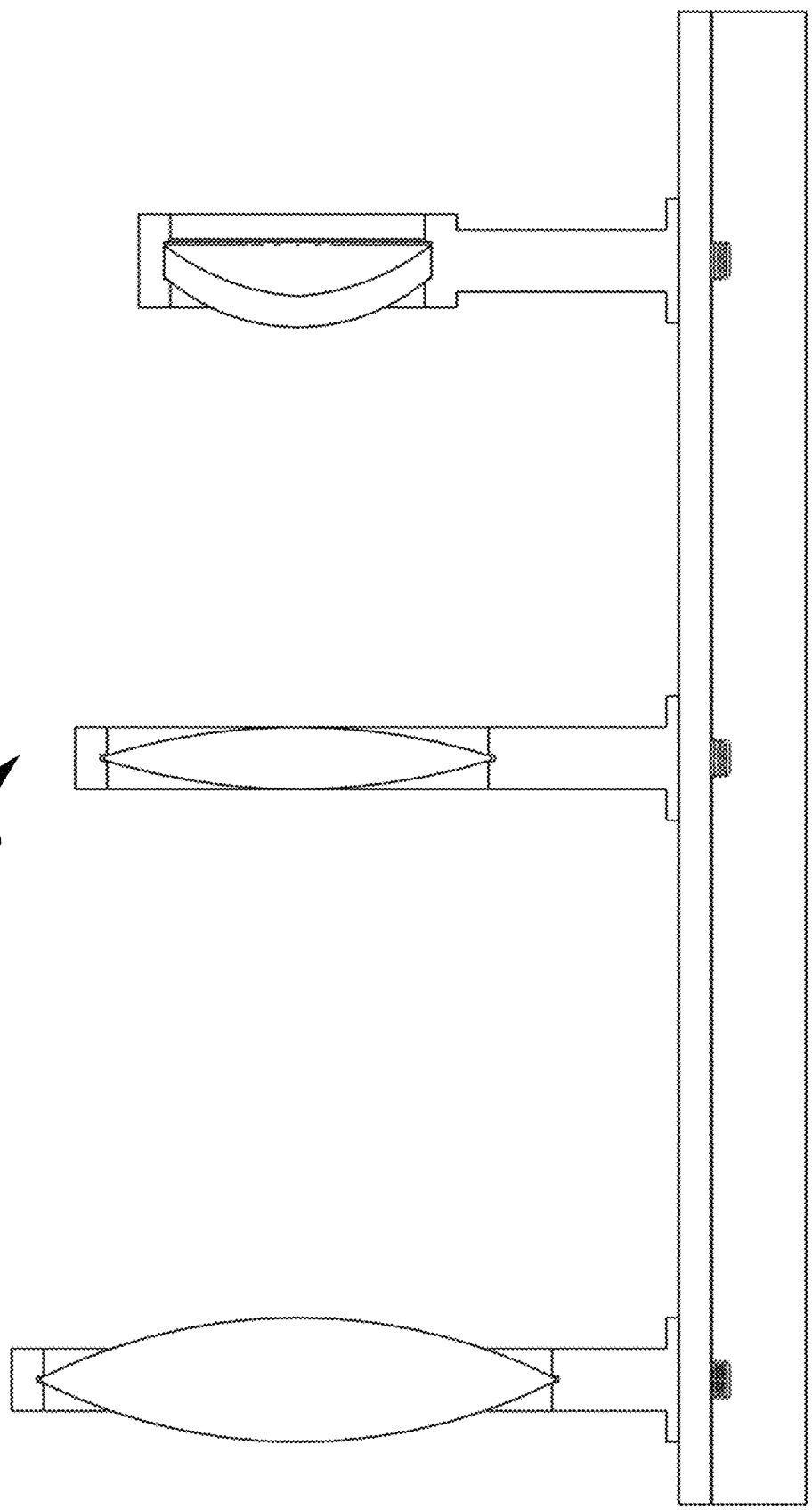
FIG. 7 illustrates a front section view of an exemplary optical system as taught by the present invention incorporating a plurality of optical lenses (POL) contained within a corresponding plurality of lens retaining members (LRM) and separated along a common optical axis (COA) with one or more focal length separators (FLS)
Figure 8:
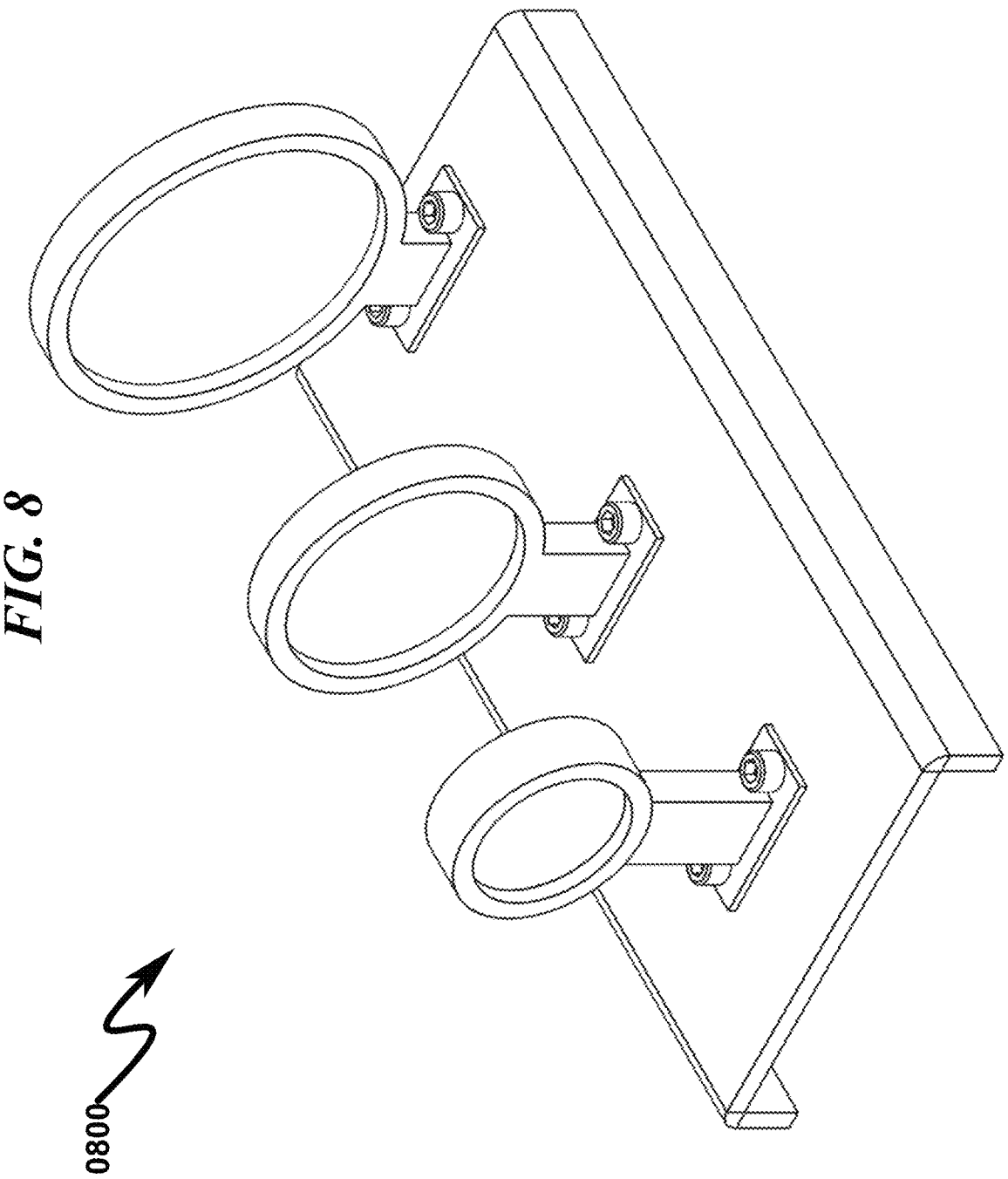
FIG. 8 illustrates a right top rear perspective view of an exemplary optical system as taught by the present invention incorporating a plurality of optical lenses (POL) contained within a corresponding plurality of lens retaining members (LRM) and separated along a common optical axis (COA) with one or more focal length separators (FLS)

FIG. 2 (0200)-FIG. 8 (0800) present an exemplary linear optical system application context detailing the concepts of the present invention. As seen from the sectional perspective view of FIG. 6 (0600), the plurality of optical lenses (POL) (0611, 0612, 0613) are aligned along a common optical axis (COA) via corresponding lens retaining members (LRM) (0621, 0622, 0623) which are separated longitudinally along the COA via the use of a common focal length spacer (FLS) (0631).

One skilled in the art will recognize that the exact lens form of the POL (0611, 0612, 0613) may be varied by application context and that the form of the LRM (0621, 0622, 0623) may also be adapted based on application context. While three lenses are presented in this system, the present invention anticipates that one or more lenses with corresponding LRM will be present in a given system, with one or more FLS used to separate the lenses or provide separation from a single lens and a sensor on which this single lens is focused.

Exemplary Tubular Optical System (TOS) Context (0900)-(1600)

Figure 9:
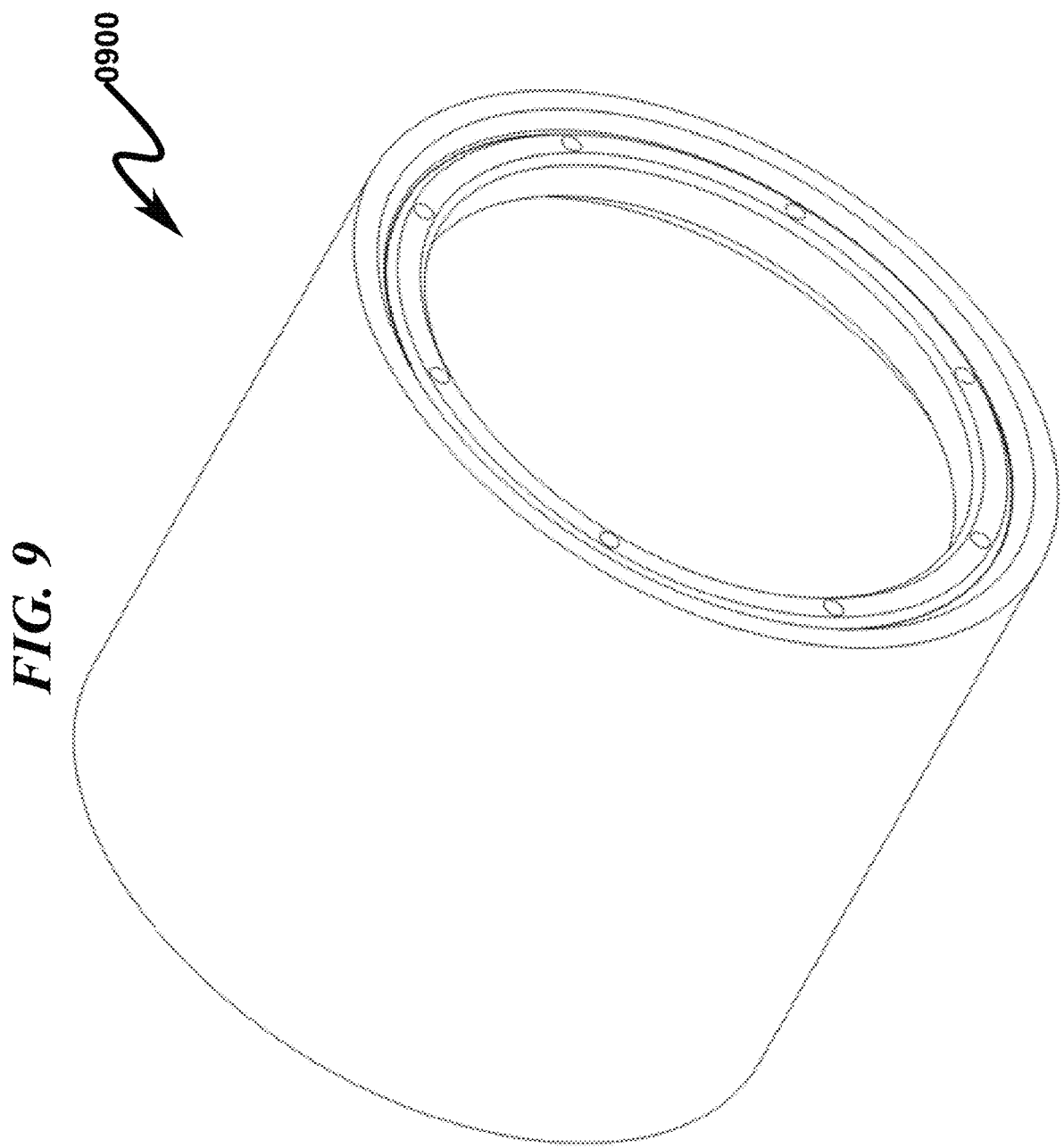
FIG. 9 illustrates a right top front perspective view of an exemplary tubular optical system (TOS) as taught by the present invention incorporating a plurality of optical lenses (POL) contained within a lens retaining tube (LRT) and separated along a common optical axis (COA) with one or more focal length separators (FLS)
Figure 10:
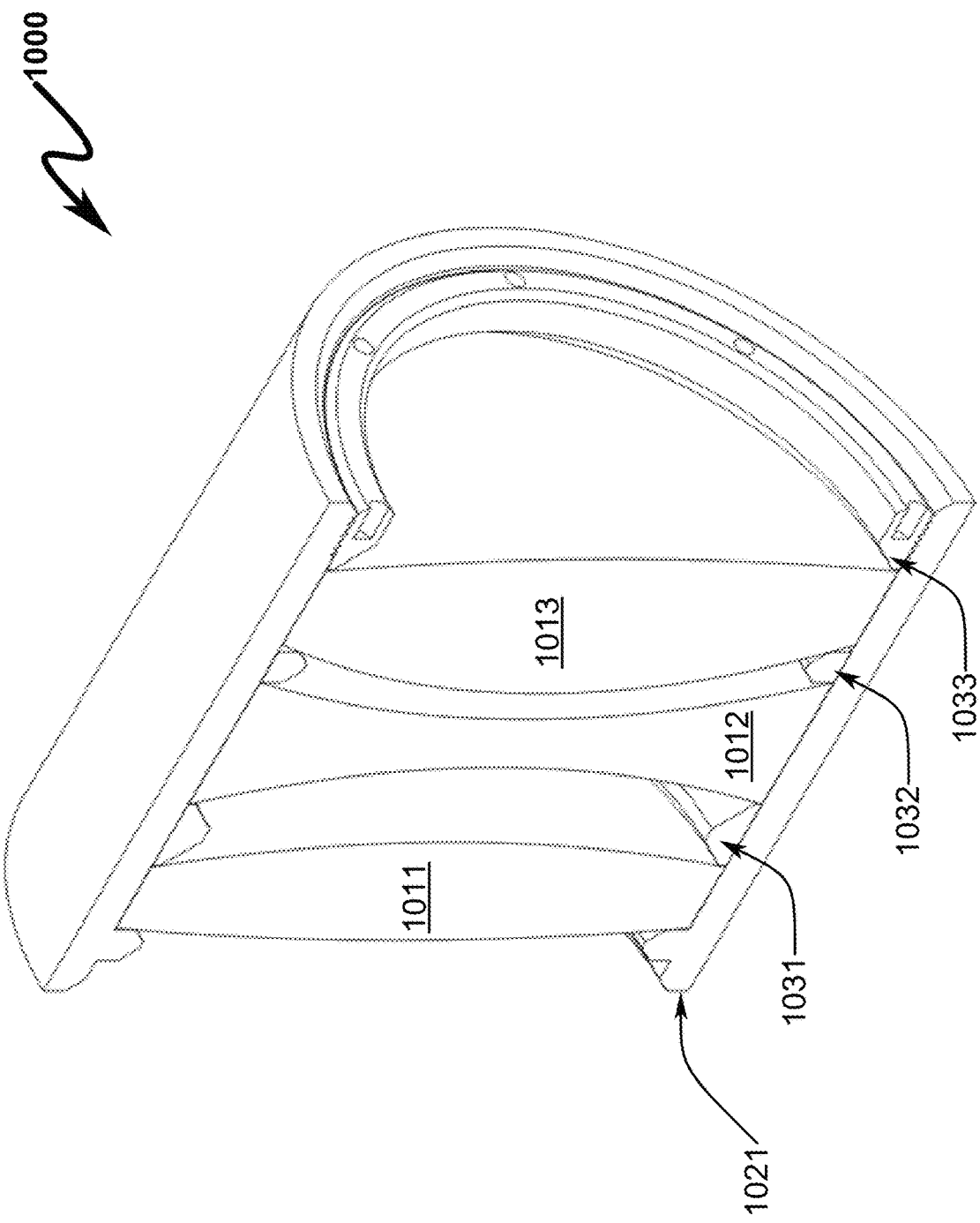
FIG. 10 illustrates a right top front perspective front section view of an exemplary tubular optical system (TOS) as taught by the present invention incorporating a plurality of optical lenses (POL) contained within a lens retaining tube (LRT) and separated along a common optical axis (COA) with one or more focal length separators (FLS)
Figure 11:
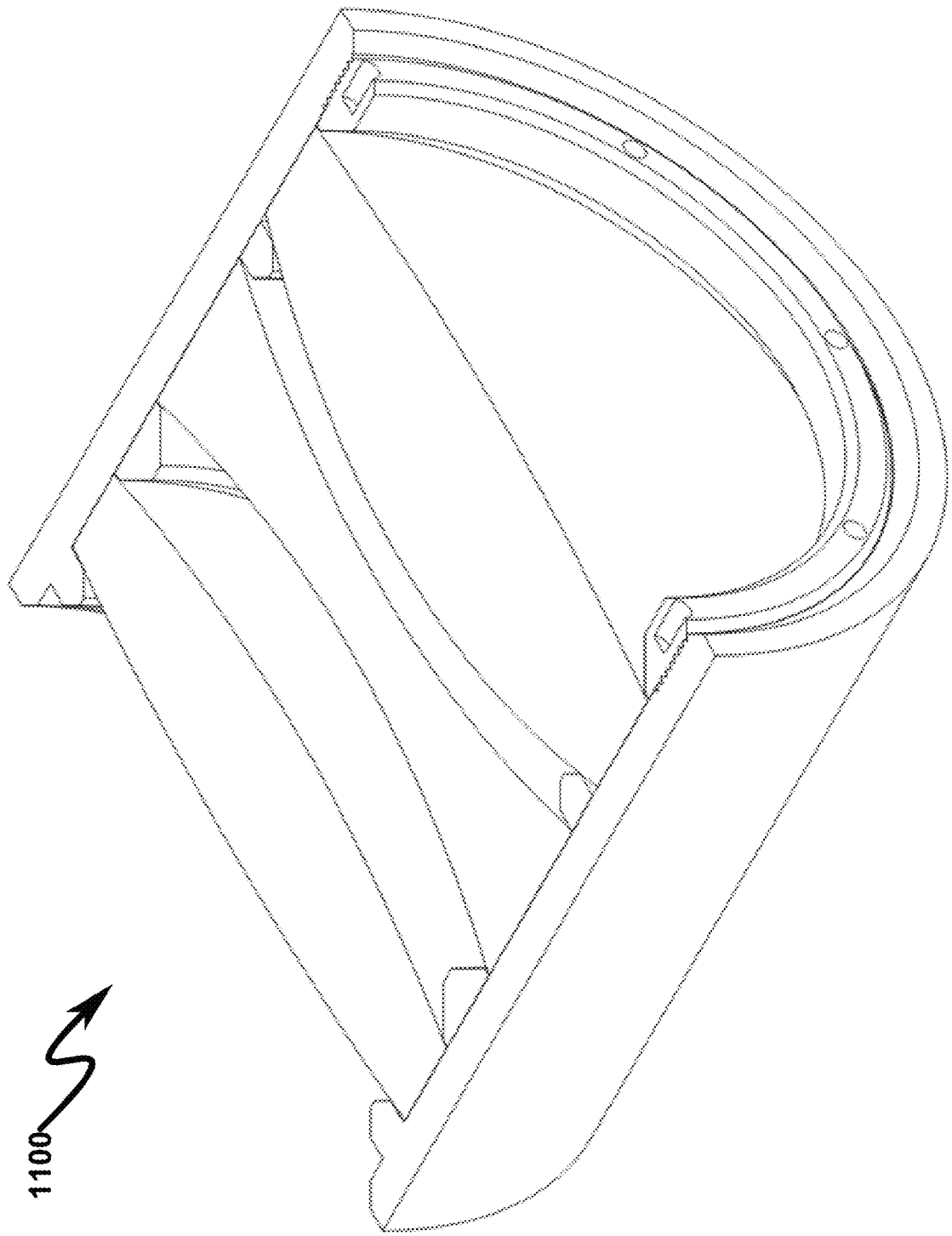
FIG. 11 illustrates a right top front perspective top section view of an exemplary tubular optical system (TOS) as taught by the present invention incorporating a plurality of optical lenses (POL) contained within a lens retaining tube (LRT) and separated along a common optical axis (COA) with one or more focal length separators (FLS)
Figure 12:
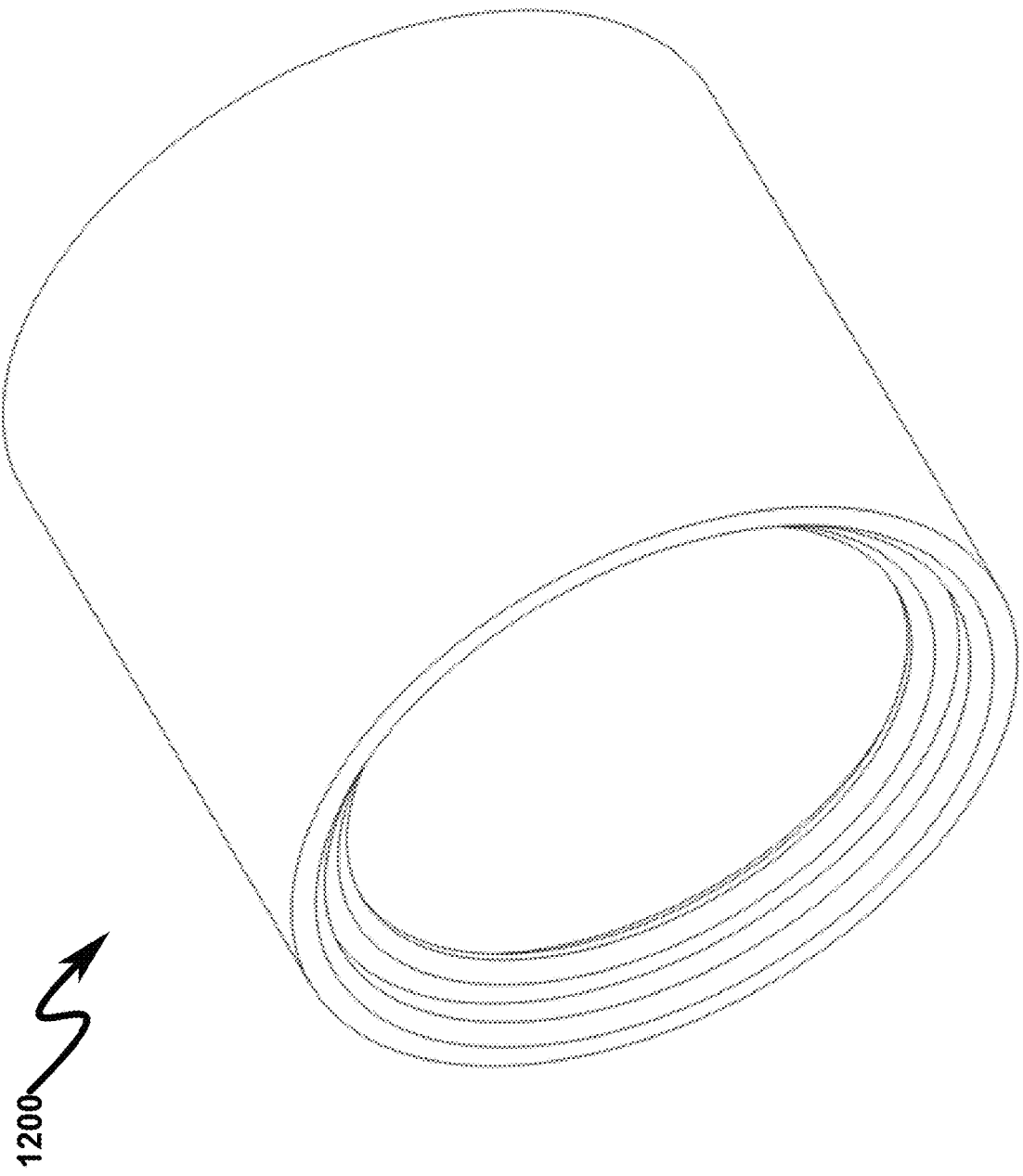
FIG. 12 illustrates a left top front perspective view of an exemplary tubular optical system (TOS) as taught by the present invention incorporating a plurality of optical lenses (POL) contained within a lens retaining tube (LRT) and separated along a common optical axis (COA) with one or more focal length separators (FLS)
Figure 13:
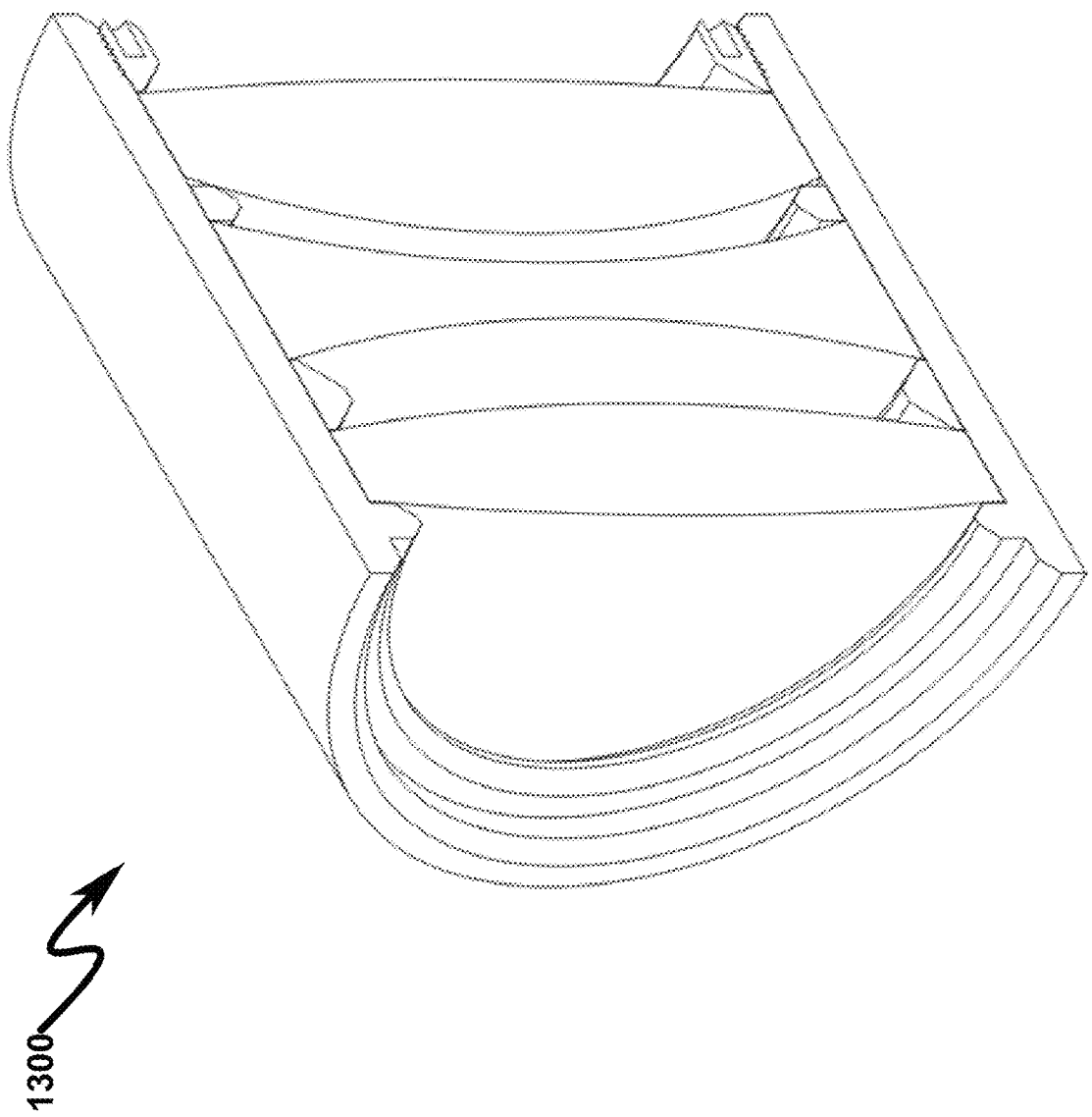
FIG. 13 illustrates a left top front perspective front section view of an exemplary tubular optical system (TOS) as taught by the present invention incorporating a plurality of optical lenses (POL) contained within a lens retaining tube (LRT) and separated along a common optical axis (COA) with one or more focal length separators (FLS)
Figure 14:
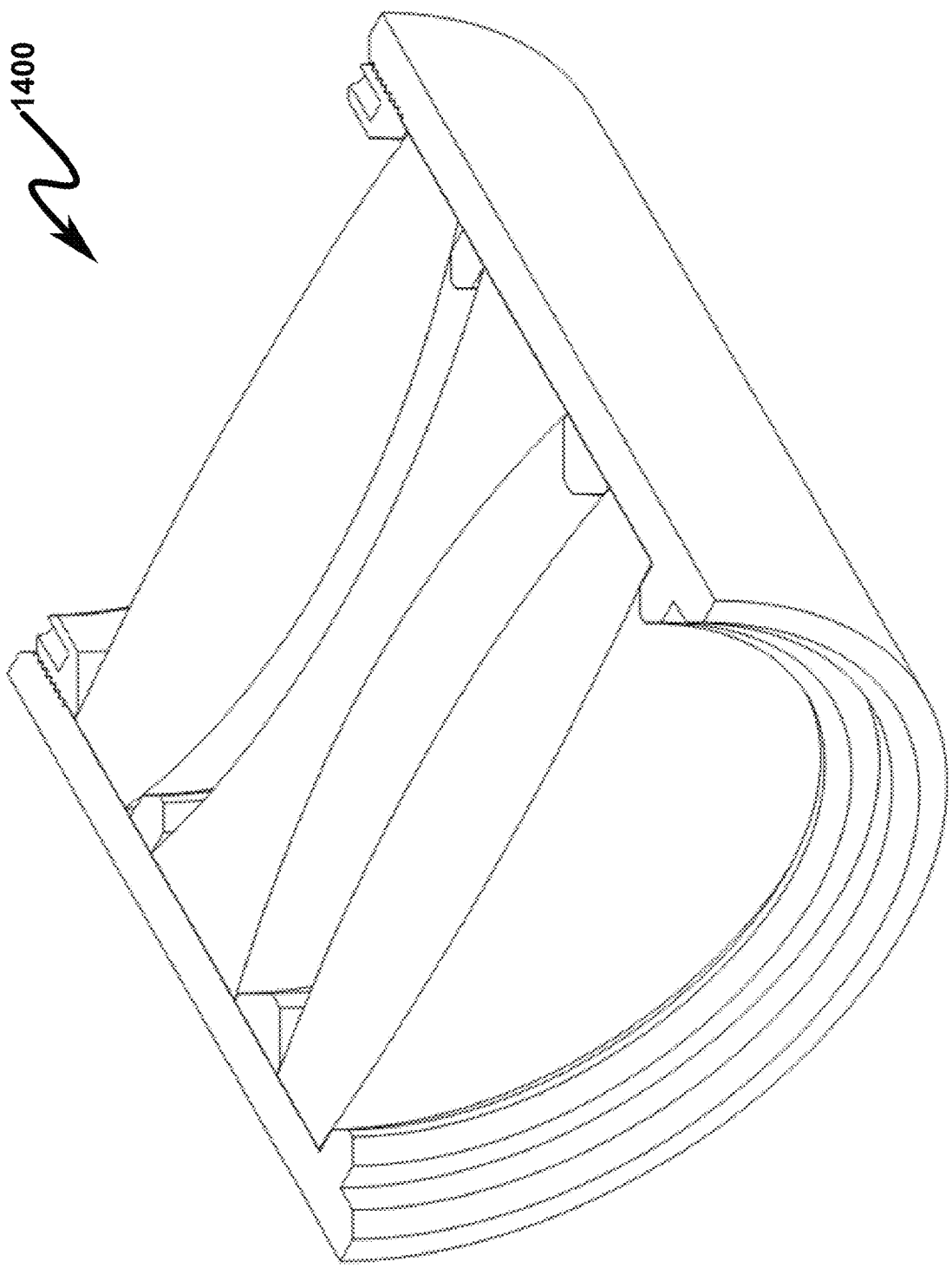
FIG. 14 illustrates a left top front perspective top section view of an exemplary tubular optical system (TOS) as taught by the present invention incorporating a plurality of optical lenses (POL) contained within a lens retaining tube (LRT) and separated along a common optical axis (COA) with one or more focal length separators (FLS)
Figure 15:
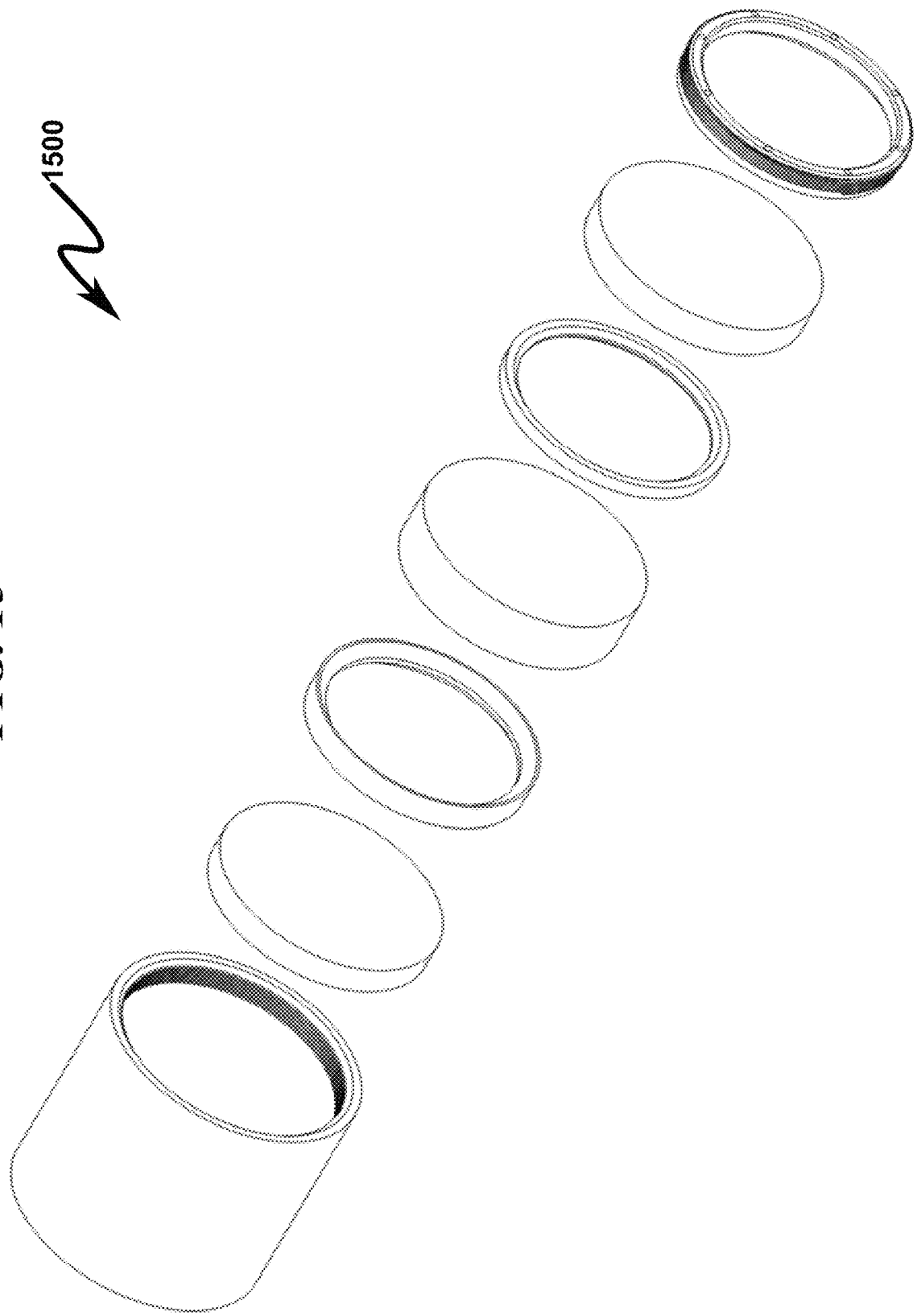
FIG. 15 illustrates a right top front perspective assembly view of an exemplary tubular optical system (TOS) as taught by the present invention incorporating a plurality of optical lenses (POL) contained within a lens retaining tube (LRT)

FIG. 9 (0900)-FIG. 16 (1600) present an exemplary tubular optical system (TOS) application context detailing the concepts of the present invention. As seen from the sectional perspective view of FIG. 10 (1000), the plurality of optical lenses (POL) (1011, 1012, 1013) are aligned along a common optical axis (COA) via a common lens retaining tube (LRT) (1021) with the optical lenses (POL) (1011, 1012, 1013) separated longitudinally along the COA via the use of multiple focal length spacers (FLS) (1031, 1032, 1033). As indicated in this exemplary embodiment, one or more of the focal length spacers (FLS) (1031, 1032, 1033) may be threaded so as to provide positive engagement with the LRT (1021) and thus secure the POL (1011, 1012, 1013) along the common optical axis (COA) within the LRT (1021). In addition to the components depicted, rubber gaskets, lens protectors, and other hardware may be added to affect a completed optical system depending on the particular application context.

One skilled in the art will recognize that the exact lens form of the POL (1011, 1012, 1013) may be varied by application context and that the form of the LRT (1021) may also be adapted based on application context. While three lenses (1011, 1012, 1013) are presented in this system, the present invention anticipates that one or more lenses within the LRT (1021) will be present in a given system, with one or more FLS used to separate the lenses or provide separation from a single lens and a sensor on which this single lens is focused.

Method Embodiment Summary (1700)-(2400)

The present invention may apply a manufacturing method to produce the LRM and/or FLS to achieve a controlled coefficient of expansion in each of these systems or individually if needed. Method flowcharts illustrating this are provided in FIG. 17 (1700)-FIG. 23 (2300) with a graph depicting the range of available temperature expansion coefficients provided in FIG. 24 (2400).

Exemplary Telescope System Context (2500)-(2800)

The present invention may be applied to telescope optical systems in some contexts. Examples of this are presented in FIG. 25 (2500)-FIG. 28 (2800).

Reflective Telescope Optics

The telescope assemblies depicted consist of reflective elements with a common optical axis. The primary mirror is made up of a single mirror and the secondary element can be made up of an image detector, mirror, or mirror group. The assembly focuses light on an image detector. The mirror spacing and focal length is maintained by a structural spacer (FLS).

The mirrors are made up of elements with reflective properties and curvature that change with temperature. By tailoring the thermal expansion of the mirror spacers to a specific value, it is possible to maintain focus and eliminate image aberrations. The result is a passively athermalized telescope.

Refractive Telescope Optics

For telescopes that incorporate lenses rather than mirrors (not generally depicted in FIG. 25 (2500)-FIG. 28 (2800) but depicted elsewhere in this disclosure), the lens assembly consists of lens elements with a common optical axis. The primary lens or lens group can be made up of a single or multiple lens elements and the secondary lens or lens group can be made up of a single or multiple lens elements. The assembly focuses light on an image detector. The lens spacing and focal length is maintained by a structural spacer.

The lenses and lens groups are made up of elements with a refractive index that change with temperature. By tailoring the thermal expansion of the lens spacer and focal length spacer to a specific value, one can maintain focus and eliminate image aberrations. The result is a passively athermalized lens.

Exemplary Structural Forms (2900)-(3200)

FIG. 29 (2900)-FIG. 32 (3200) provides exemplary structural forms from which the LRM and/or FLS may be constructed in order to achieve the system structure as claimed herein. Any of these depicted members may be constructed to have controlled thermal coefficient characteristics in order to stabilize the overall focal length of the optical system.

Axially Tailored Thermal Expansion (ATTE) (3300)-(4800)

Overview

The present invention anticipates the use of the disclosed negative thermal expansion material in an assembly with other positive thermal expansion materials to produce a desired change in length or to maintain a desired mechanical pre-load. In this way an axially tailored thermal expansion (ATTE) optical system may be constructed that is athermally stabilized ("athermalized").

The axial tailored thermal expansion (ATTE) is selected to match the performance requirements of the optical system. Namely, the thermal focus shift within the optical system due to thermal expansion within reflective optics or the refractive optics of the system.

Reflective Optics Focus Shift

The focus shift in a reflective optics system is generally due to the following thermal operations:
  Changes in mirror dimensions due to thermal expansion of the mirror;
  Changes in housing or mounting structure (spacer or lens barrel) dimensions due to thermal expansion; and
  Changes in pre-loading force due to thermal expansion mismatch between the housing or mounting structure and mirror elements.
The present invention may be configured to address both of these non-idealities in conjunction to produce an athermally stabilized optical system.

Refractive Optics Focus Shift

The focus shift in a refractive optics system is generally due to the following thermal operations:
  Changes in lens dimensions due to thermal expansion of the glass;
  Changes in the housing or mounting structure (spacer or metering) dimensions due to thermal expansion;
  Changes in pre-loading force due to thermal expansion mismatch between the housing and lens elements; and
  Changes in the glass index of refraction with changing temperature.
The present invention may be configured to address all of these non-idealities in conjunction to produce an athermally stabilized optical system.

Athermally Stabilized Optical System (ASOS)

Within the context of the present invention, thermal expansion tailoring designs are used for tailoring the thermal expansion coefficient of an optical mounting assembly to match the coefficient of thermal defocus ($\delta_{optic}$) that changes the focal length (f) of an optic assembly. A system that is "athermalized" is one that does not defocus with temperature changes. While some invention embodiments may employ only negative thermal expansion alloys as spacers between lens and reflective elements to adjust for the thermal expansion of the lens/reflective elements as discussed previously, some other preferred invention embodiments may utilize hybrid spacers containing a combination of positive/negative expansion elements to provide a better overall athermalized temperature characteristic.

Within this hybrid application context, the present invention anticipates the following hybrid construction scenarios:
  Different materials being assembled in series to produce a tailored thermal response that can tune the thermal expansion between the thermal expansion coefficients of the two materials. This technique may be used to create a series tailored athermally stabilized optical system (STASOS).
  Different materials being assembled in parallel to produce a tailored thermal response. This technique may be used to create a parallel tailored athermally stabilized optical system (PTASOS). The negative thermal expansion alloys provide a new way to achieve optical focal length expansions and contractions that are beyond currently achievable values. This tailored thermal expansion above or below the thermal expansion coefficients of each constituent material is enabled by having one material be a positive thermal expansion value and the other material having a negative thermal expansion value.

Series Tailored Athermally Stabilized Optical System (STASOS) (3300)-(3600)

An example of STASOS series tailored thermal response is generally depicted in FIG. 33 (3300) wherein a first material (3310) having length L1 is mated with a second material (3320) having length L2 to stabilize or adjust the focal distance between a lens reference plane (LRP) associated with an optical lens source (OLS) and a focal reference plane (FRP) associated with an optical detector target (ODT). The differential optical length associated with the combination is the linear combination of the first material (3310) with its associated coefficient of expansion ($\alpha 1$) and the second material (3320) with its associated coefficient of expansion ($\alpha 2$). By careful selection of the material thicknesses (L1 and L2) and the coefficients of expansion ($\alpha 1$ and $\alpha 2$) the system can be athermally stabilized to minimize or eliminate the differential in focal length ($\delta opticf$) associated with the series optical system.

An example of this athermally stabilized series configuration is generally depicted in FIG. 34 (3400)-FIG. 36 (3600) wherein a TOS lens system (3410, 3510) is mated to a thermally stabilized focus tube (3420, 3520) and a detector endcap (3430, 3530) incorporating the optical detector target (ODT) (3431, 3531). The focus tube (3420, 3520) is segmented into two sections having a first material component (3421, 3521) and a second material component (3422, 3522). The first material component (3421, 3521) and a second material component (3422, 3522) are selected as indicated above to have complementary thermal expansion characteristics as indicated above to create an overall athermally stabilized optical system along the common optical axis. FIG. 35 (3500)-FIG. 36 (3600) provide additional detail depicting section perspective and side section views of this exemplary embodiment. FIG. 36 (3600) provides additional detail depicting the focal path associated with the overall system.

Note that the present invention anticipates stacking of NTE/PTE spacers between lenses/mirrors in an overall optical system employing STASOS such that the optical distance between the lenses along the common optical axis (COA) is maintained as a constant or alternatively varies in a complementary fashion to the expansion characteristics of the lenses so as to maintain focus along the common optical axis (COA).

Parallel Tailored Athermally Stabilized Optical System (PTASOS) (3700)-(4000)

An example of PTASOS parallel tailored thermal response is generally depicted in FIG. 37 (3700) wherein a first material (3710) having length L1 is mated in parallel with a second material (3720) having length L2 to a parallel reference surface (PRS) (3730) (the contact plane defined as a horizontally adjustable parallel reference plane (PRP)) to stabilize or adjust the focal distance between a lens reference plane (LRP) associated with an optical lens source (OLS) and a focal reference plane (FRP) associated with an optical detector target (ODT). The differential optical length associated with the combination is the sum combination of the first material (3710) with its associated coefficient of expansion (α1) (positive or negative) and the second material (3720) with its associated coefficient of expansion (α2) (negative or positive). By careful selection of the material thicknesses (L1 and L2) and the coefficients of expansion (α1 and α2) the system can be constructed to achieve coefficients of expansion that exceed that of either the first material (3710) or second material (3720).

An example of this athermally stabilized parallel configuration is generally depicted in FIG. 38 (3800)-FIG. 40 (4000) wherein a TOS lens system (3810, 3910) is mated to a thermally stabilized focus tube (3820, 3920) and a detector endcap (3430, 3930). The focus tube (3820, 3920) is segmented into two sections having a first material component (3921) and a second material component (3922). The first material component (3921) and a second material component (3922) may be selected as indicated above to have parallel coefficients of expansion that exceed that of either the first material (3921) or second material (3922). FIG. 39 (3900)-FIG. 40 (4000) provide additional detail depicting section perspective and side section views of this exemplary embodiment. FIG. 40 (4000) provides additional detail depicting the focal path associated with the overall system.

As indicated above, this parallel configuration is capable of providing coefficients of expansion that exceed those of individual material components via the use of complementary sign (positive/negative and negative/positive) expansion coefficients in the selected material components for the first material component (3921) and the second material component (3922). In one preferred embodiment, extreme positive thermal expansion values are achieved by selecting a positive thermal expansion material for the first material (3921) and a negative thermal expansion material for the second material (3922). In another preferred embodiment, extreme negative thermal expansion values are achieved by selecting a negative thermal expansion material for the first material (3921) and a positive thermal expansion material for the second material (3922).

Composite CTM Components

The present invention anticipates that the lens retaining members/tubes (LRM/LRT) and focal length spacers (FLS) described herein may be constructed from a number of different material combinations, including but not limited to the following:
- a negative thermal expansion metallized material as described herein and within patent applications referenced herein;
- a composite made from negative thermal expansion metallized material and another material with positive CTE; and
- joining/stacking of the elements detailed above using any of the following attachment methodologies:
  - Optical Contact Bonding;
  - Adhesives;
  - Welding;
  - Brazing;
  - Soldering; and
  - Mechanical pre-load from any of the following fastening means:
    - Thread components;
    - Press fit/shrink fit;
    - Screws; and
    - Retaining rings.

Constant Mechanical Pre-Load (4100)-(4800)

A pre-load can be held constant with changing temperature for lens retention or sealing applications in some preferred embodiments. In these scenarios, the negative thermal expansion (NTE) material is assembled in series with another positive thermal expansion (PTE) material. The assembly is then pre-loaded to a desired value using a housing, bolt, or other fastening means. A constant force can be obtained by selecting the CTE and length of the NTE material to solve the equations in FIG. 41 (4100) and FIG. 45 (4500). The only difference in the process for determining the correct dimensions is that the "Form Factor and Equation Database" in FIG. 20 (2000) would include the equations displayed in FIG. 41 (4100) and FIG. 45 (4500).

FIG. 41 (4100)-FIG. 44 (4400) depict a preferred exemplary pre-loaded lens retention system that has been athermally stabilized that illustrates this concept. Here it can be seen that a NTE material (4110) is combined in series with a second PTE material (4120) and captured within a third material (4130) via a retaining ring (4140). The combination of NTE material (4110) and PTE material (4120) maintains a constant pre-loaded distance L3=L1+L2 over temperature with respect to the position of the retaining ring (4140) and the third material (4130). This scenario is depicted in more detail in FIG. 42 (4200)-FIG. 44 (4400) in which the system is configured to athermally align a lens along a common optical axis. Here it can be seen that the NTE material (4310) and PTE material (4320) are retained within a third tubular material (4330) by a retaining ring (4340) to capture/fasten a lens (4350) within the third tubular material (4330). The combination of the NTE material (4310) and PTE material (4320) may be athermalized together or in combination with the thermal characteristics of the third tubular material (4330), retaining ring (4340), and/or lens (4350).

FIG. 45 (4500)-FIG. 48 (4800) depict a preferred exemplary pre-loaded lens fastener system that has been athermally stabilized that illustrates this concept. Here it can be seen that a NTE material (4510) is combined in series with a second PTE material (4520) and captured using a third material fastener (4530) via a fastener capture (4540) (which may be integrated within the NTE material (4510) and/or PTE material (4520) and/or be a separate fastener such as a nut, etc.). The combination of NTE material (4510) and PTE material (4520) maintains a constant pre-loaded distance L3=L1+L2 over temperature with respect to the position of the third material fastener (4530) and the fastener capture (4540). This scenario is depicted in more detail in the example construction of FIG. 46 (4600)-FIG. 48 (4800) in which the system is configured to athermally align a lens (4750) along a common optical axis. Here it can be seen that the NTE material (4710) and PTE material (4720) are configured in tubular fashion and are combined together with a fastener (4730) with the fastener capture (4740) being formed within the PTE material (4720) to capture a lens (4750) with the assistance of a retaining ring (4760) threaded to the PTE material (4720). One skilled in the art will recognize that the positions of the NTE material (4510) and PTE material (4520) may be swapped with no loss of generality in the teaching of the invention.

Athermally Compensated Fastening (4900)-(5600)

Within many preferred invention contexts a number of athermally compensated lens mounting methodologies may be utilized that incorporate the teachings of the present invention. Several examples of this are depicted in FIG. 49 (4900)-FIG. 56 (5600). One skilled in the art will recognize that these examples are only several of many possibilities.

As a first example, the stacked athermally compensated system depicted in FIG. 49 (4900)-FIG. 52 (5200) depicts a first material (4910, 5010) stacked with a second material (4920, 5020) and combined with a fastener (4930, 5030) and fastening nut (5040). The first material (4910, 5010) and second material (4920, 5020) may be selected with complementary coefficients of expansion such that the overall vertical stack maintains a constant distance or alternatively has a predetermined coefficient of vertical expansion. The fastener (4930, 5030) and fastening nut (5040) in this instance will expand according to a different coefficient of expansion that may be unrelated to that of the first material (4910, 5010) and second material (4920, 5020).

As a second example, the stacked athermally compensated system depicted in FIG. 53 (5300)-FIG. 56 (5600) depicts a first material (5310, 5410) stacked with a second material (5320, 5420) and combined with a fastener (5330, 5430) and fastening nut (5440). The first material (5310, 5410) and second material (5320, 5420) may be selected with complementary coefficients of expansion such that the overall vertical stack maintains a constant distance or alternatively has a predetermined coefficient of vertical expansion. The fastener (5330, 5430) and fastening nut (5440) in this instance will expand according to a different coefficient of expansion that may be unrelated to that of the first material (5310, 5410) and second material (5320, 5420). This uncontrolled expansion is compensated for by the washer (5350, 5450)+spring (5360, 5460)+washer (5370, 5470) series combination that compensates for the thermal expansion/contraction of the fastener (5330, 5430) and fastening nut (5440). One skilled in the art will no doubt recognize that this technique may be utilized in a variety of ways to achieve thermally stabilized lens alignment.

Exemplary LRM/FLS Materials

The LRM/FLS candidate materials may be selected from a list of materials that have been discovered to exhibit the required CTE when combined as indicated below:

$Ti_{100-A}X_A$ (X=at least one of Ni, Nb, Mo, Ta, Pd, Pt, or combinations thereof) (A=0 to 75 atomic percent composition), $Ti_{100-A-B}Ni_AX_B$ (X=at least one of Pd, Hf, Zr, Al, Pt, Au, Fe, Co, Cr, Mo, V, O or combinations thereof) (A=0 to 55 atomic percent composition and B=0 to 75 atomic percent composition such that A+B<100), $Ti_{100-A-B}Nb_AX_B$ (X=at least one of Al, Sn, Ta, Hf, Zr, Al, Au, Pt, Fe, Co, Cr, Mo, V, O, or combinations thereof) (A=0 to 55 atomic percent composition and B=0 to 75 atomic percent composition such that A+B<100), $Ti_{100-A-B}Ta_AX_B$ (X=at least one of Al, Sn, Nb, Zr, Mo, Al, Au, Pt, Fe, Co, Cr, Hf, V, O, or combinations thereof) (A=0 to 55 atomic percent composition and B=0 to 75 atomic percent composition such that A+B<100), $Ni_{100-A-B}Mn_AX_B$ (X=at least one of Ga, In, Sn, Al, Sb, Co, or combinations thereof) (A=0 to 50 atomic percent composition and B=0 to 50 atomic percent composition such that A+B<100), $Ni_{100-A-B-C}Mn_ACO_BX_C$ (X=at least one of Ga, In, Sn, Al, Sb, or combinations thereof) (A=0 to 50 atomic percent composition, B=0 to 50 atomic percent composition, and C=0 to 50 atomic percent composition such that A+B+C<100), $Ni_{100-A-B}Fe_AGa_B$ (A=0 to 50 atomic percent composition and B=0 to 50 atomic percent composition such that A+B<100), $Cu_{100-A}X_A$ (X=at least one of Zn, Ni, Mn, Al, Be, or combinations thereof) (A=0 to 75 atomic percent composition), $Cu_{100-A-B}Al_AX_B$ (X=at least one of Zn, Ni, Mn, Be, or combinations thereof) (A=0 to 50 atomic percent composition and B=0 to 50 atomic percent composition such that A+B<100), $Cu_{100-A-B-C}Mn_AAl_BX_C$ (X=at least one of Zn, Ni, Be, or combinations thereof) (A=0 to 50 atomic percent composition, B=0 to 50 atomic percent composition, and C=0 to 50 atomic percent composition such that A+B+C<100), $Co_{100-A-B}Ni_AX_B$ (X=at least one of Al, Ga, Sn, Sb, In, or combinations thereof) (A=0 to 50 atomic percent composition and B=0 to 50 atomic percent composition such that A+B<100), $Fe_{100-A-B}Mn_AX_B$ (X=at least one of Ga, Ni, Co, Al, Ta, Si, or combinations thereof) (A=0 to 50 atomic percent composition and B=0 to 50 atomic percent composition such that A+B<100), $Fe_{100-A-B}Ni_AX_B$ (X=at least one of Ga, Mn, Co, Al, Ta, Si, or combinations thereof) (A=0 to 50 atomic percent composition and B=0 to 50 atomic percent composition such that A+B<100), $Fe_{100-A-B-C}Ni_ACO_BAl_CX_D$ (X=at least one of Ti, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), $Fe_{100-A-B-C}Ni_ACO_B\text{-}Ti_CX_D$ (X=at least one of Al, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), and combinations thereof that exhibit martensitic transformation.

NiTi, NiTiPd, NiTiHf, NiTiPt, NiTiAu, NiTiZr, NiMn, NiMnGa, NiMnSn, NiMnIn, NiMnAl, NiMnSb, NiCoMn, NiCoMnGa, NiCoMnSn, NiCoMnAl, NiCoMnIn, NiCoMnSb, NiFeGa, MnFeGa, TiNb, TiMo, TiNbAl, TiNbSn, TiNbTa, TiNbZr, TiNbO, CuMnAlNi, CuMnAl, CuZnAl, CuNiAl, CuAlBe, CoNi, CoNiAl, CoNiGa, FeMn, FeMnGa, FeMnNi, FeMnCo, FeMnAl, FeMnTa, FeMnNiAl, FeNiCoAl, FeNiCoAlTa, FeNiCoAlTi, FeNiCoAlNb, FeNiCoAlW, FeNiCoAlCr, FeMnSi, FeNiCo, FeNiCoTi, as well as derivations and combinations thereof that exhibit martensitic transformation.

Other LRM/FLS materials may be utilized as described in United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, and other patents/patent applications incorporated herein.

System Summary

The present invention system may be broadly generalized as a lens alignment system comprising:
(a) a plurality of optical lenses (POL);
(b) a plurality of singular lens retaining members (LRM) each configured to retain exactly one of the POL; and
(c) one or more focal length spacers (FLS);
wherein:
the LRM is configured to align the POL along a common optical axis (COA);
the FLS is configured to define spacing between two or more of the LRM along the COA by mechanical attachment to the two or more of the LRM;
the LRM are each constructed from a thermalized metallic material (TMM) selected to produce a thermally neutral or controlled optical (TNO) variation in focal length of each of the POL;
the FLS are each constructed from a thermalized metallic material (TMM) selected to produce a thermally neutral or controlled optical (TNO) variation in longitudinal distance between each of the LRM along the COA;
the TMM is constructed by deforming a metallic material substantially comprising a first phase by applying tension in a first direction;
the metallic material is subsequently deformed via application of tension from the first phase into a second phase;
the metallic material, subsequent to the deformation, exhibits a negative first thermal expansion characteristic having a negative coefficient of thermal expansion within a predetermined range;
the negative coefficient of thermal expansion is in at least the first direction; and
the metallic material, subsequent to the deformation, exhibits a second thermal expansion characteristic in a second direction.

This general system summary may be augmented by the various elements described herein to produce a wide variety of invention embodiments consistent with this overall design description.

Method Summary

A preferred exemplary embodiment of the present invention method may be broadly generalized as a lens alignment method comprising:

(1) configuring a plurality of singular lens retaining members (LRM) to retain exactly one of a plurality of optical lenses (POL);
(2) defining spacing between two or more of the LRM along the COA by mechanical attachment to one or more focal length spacers (FLS) to the plurality of the LRM; and
(3) configuring the LRM to align the POL along a common optical axis (COA);
wherein:
the LRM are each constructed from a thermalized metallic material (TMM) selected to produce a thermally neutral or controlled optical (TNO) variation in focal length of each of the POL;
the FLS are each constructed from a thermalized metallic material (TMM) selected to produce a thermally neutral or controlled optical (TNO) variation in longitudinal distance between each of the LRM along the COA;
the TMM is constructed by deforming a metallic material substantially comprising a first phase by applying tension in a first direction;
the metallic material is subsequently deformed via application of tension from the first phase into a second phase;
the metallic material, subsequent to the deformation, exhibits a negative first thermal expansion characteristic having a negative coefficient of thermal expansion within a predetermined range;
the negative coefficient of thermal expansion is in at least the first direction; and
the metallic material, subsequent to the deformation, exhibits a second thermal expansion characteristic in a second direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Alternate System Summary

An alternate preferred exemplary embodiment of the present invention system may be broadly generalized as a lens alignment system comprising:
(a) a plurality of optical lenses (POL);
(b) a lens retaining tube (LRT) configured to retain each of the POL; and
(c) one or more focal length spacers (FLS);
wherein:
the LRT is configured to align the POL along a common optical axis (COA);
the FLS is configured to define spacing between two or more of the LRT along the COA by mechanical attachment to the two or more of the LRT;
the LRT is constructed from a thermalized metallic material (TMM) selected to produce a thermally neutral or controlled optical (TNO) variation in focal length of each of the POL;
the FLS are each constructed from a thermalized metallic material (TMM) selected to produce a thermally neutral or controlled optical (TNO) variation in longitudinal distance in the LRT along the COA;
the TMM is constructed by deforming a metallic material substantially comprising a first phase by applying tension in a first direction;

the metallic material is subsequently deformed via application of tension from the first phase into a second phase;

the metallic material, subsequent to the deformation, exhibits a negative first thermal expansion characteristic having a negative coefficient of thermal expansion within a predetermined range;

the negative coefficient of thermal expansion is in at least the first direction; and the metallic material, subsequent to the deformation, exhibits a second thermal expansion characteristic in a second direction.

This general system summary may be augmented by the various elements described herein to produce a wide variety of invention embodiments consistent with this overall design description.

Alternate Method Summary

An alternate preferred exemplary embodiment of the present invention method may be broadly generalized as a lens alignment method comprising:

(1) configuring a lens retaining tube (LRT) to retain a plurality of optical lenses (POL);

(2) defining spacing within the LRT along the COA by mechanical placement of one or more focal length spacers (FLS) within the LRT; and (3) configuring the LRT to align the POL along a common optical axis (COA);

wherein:

the LRT is constructed from a thermalized metallic material (TMM) selected to produce a thermally neutral or controlled optical (TNO) variation in focal length of each of the POL;

the FLS are each constructed from a thermalized metallic material (TMM) selected to produce a thermally neutral or controlled optical (TNO) variation in longitudinal distance in the LRT along the COA;

the TMM is constructed by deforming a metallic material substantially comprising a first phase by applying tension in a first direction;

the metallic material is subsequently deformed via application of tension from the first phase into a second phase;

the metallic material, subsequent to the deformation, exhibits a negative first thermal expansion characteristic having a negative coefficient of thermal expansion within a predetermined range;

the negative coefficient of thermal expansion is in at least the first direction; and the metallic material, subsequent to the deformation, exhibits a second thermal expansion characteristic in a second direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

STASOS System Summary

A STASOS preferred exemplary embodiment of the present invention system may be broadly generalized as a system comprising:

(a) optical lens source (OLS);
(b) optical detector target (ODT);
(c) first lens retaining tube (FRT); and
(d) second lens retaining tube (SRT);

wherein:

the OLS comprises a lens reference plane (LRP) perpendicular to an optical axis of the OLS;

the ODT comprises a focal reference plane (FRP) perpendicular to an optical axis of the ODT;

the FRT comprises a material having a negative thermal expansion (NTE) coefficient;

the SRT comprises a material having a positive thermal expansion (PTE) coefficient;

the FRT and the SRT are aligned along a common optical axis (COA);

the FRT and the SRT are configured to align the OLS and ODT along the COA;

the FRT and the SRT are configured to separate the OLS and ODT along the COA and define a predetermined focal distance (PFD) between the LRP and the FRP;

the FRT is constructed from a thermalized metallic material (TMM) selected to produce in combination with the SRT a thermally neutral or controlled optical (TNO) variation in the PFD;

the TMM is constructed by deforming a metallic material substantially comprising a first phase by applying tension in a first direction;

the metallic material is subsequently deformed via application of tension from the first phase into a second phase;

the metallic material, subsequent to the deformation, exhibits a negative first thermal expansion characteristic having a negative coefficient of thermal expansion within a predetermined range;

the negative coefficient of thermal expansion is in at least the first direction; and the metallic material, subsequent to the deformation, exhibits a second thermal expansion characteristic in a second direction.

This general system summary may be augmented by the various elements described herein to produce a wide variety of invention embodiments consistent with this overall design description.

STASOS Method Summary

A STASOS preferred exemplary embodiment of the present invention method may be broadly generalized as a method comprising:

(1) configuring a first lens retaining tube (FRT) and a second lens retaining tube (SRT) in series combination to separate an optical lens source (OLS) and an optical detector target (ODT);

(2) configuring the FRT, the SRT, the OLS, and the ODT along a common optical axis (COA); and (3) configuring the FRT and the SRT to separate the OLS and ODT along the COA and define a predetermined focal distance (PFD) between a lens reference plane (LRP) perpendicular to an optical axis of the OLS and a focal reference plane (FRP) perpendicular to an optical axis of the ODT;

wherein:

the FRT comprises a material having a negative thermal expansion (NTE) coefficient;

the SRT comprises a material having a positive thermal expansion (PTE) coefficient;

the FRT is constructed from a thermalized metallic material (TMM) selected to produce in combination with the SRT a thermally neutral or controlled optical (TNO) variation in the PFD;

the TMM is constructed by deforming a metallic material substantially comprising a first phase by applying tension in a first direction;

the metallic material is subsequently deformed via application of tension from the first phase into a second phase;

the metallic material, subsequent to the deformation, exhibits a negative first thermal expansion characteristic having a negative coefficient of thermal expansion within a predetermined range;

the negative coefficient of thermal expansion is in at least the first direction; and the metallic material, subsequent to the deformation, exhibits a second thermal expansion characteristic in a second direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

PTASOS Negative System Summary

A PTASOS negative thermal expansion preferred exemplary embodiment of the present invention system may be broadly generalized as a system comprising:
(a) optical lens source (OLS);
(b) optical detector target (ODT);
(c) parallel reference surface (PRS);
(d) first lens retaining tube (FRT); and
(e) second lens retaining tube (SRT);
wherein:
the OLS comprises a lens reference plane (LRP) perpendicular to an optical axis of the OLS;
the ODT comprises a focal reference plane (FRP) perpendicular to an optical axis of the ODT;
the PRS comprises a parallel reference plane (PRP) perpendicular to an optical axis of the PRS;
the FRT comprises a material having a negative thermal expansion (NTE) coefficient;
the SRT comprises a material having a positive thermal expansion (PTE) coefficient;
the FRT and the SRT are aligned along a common optical axis (COA);
the FRT and the SRT are configured to align the OLS and ODT along the COA;
the FRT is configured to separate the OLS and the PRS along the COA and define a predetermined separation between the LRP and the PRP;
the SRT comprises a first longitudinal surface (FLS) and a second longitudinal surface (SLS);
the FLS is positioned to contact the PRS at the PRP;
the SLS is positioned to contact the ODT at the FRP;
the SRT is configured to separate the OLS and the PRS along the COA and define a predetermined focal distance (PFD) between the LRP and the FRP;
the FRT is constructed from a thermalized metallic material (TMM) selected to produce in combination with the SRT a thermally neutral or controlled optical (TNO) variation in the PFD;

the TMM is constructed by deforming a metallic material substantially comprising a first phase by applying tension in a first direction;

the metallic material is subsequently deformed via application of tension from the first phase into a second phase;

the metallic material, subsequent to the deformation, exhibits a negative first thermal expansion characteristic having a negative coefficient of thermal expansion within a predetermined range;

the negative coefficient of thermal expansion is in at least the first direction; and the metallic material, subsequent to the deformation, exhibits a second thermal expansion characteristic in a second direction.

This general system summary may be augmented by the various elements described herein to produce a wide variety of invention embodiments consistent with this overall design description.

PTASOS Negative Method Summary

A PTASOS negative thermal expansion preferred exemplary embodiment of the present invention method may be broadly generalized as a method comprising:
(1) configuring a first lens retaining tube (FRT) and a second lens retaining tube (SRT) along a common optical axis (COA) in parallel combination contacting a parallel reference surface (PRS) that defines a parallel reference plane (PRP) perpendicular to the COA;
(1) separating with the FRT by common contact along the COA an optical lens source (OLS) at a lens reference plane (LRP) and the PRS at the PRP;
(2) configuring an optical detector target (ODT) positioned at a focal reference plane (FRP) on the SRT;
(3) configuring the FRT, the SRT, the PRS, the OLS, and the ODT along the COA; and
(4) configuring the SRT to separate the OLS and ODT along the COA to define a predetermined focal distance (PFD) between the LRP and the FRP;
wherein:
the FRT comprises a material having a negative thermal expansion (NTE) coefficient;
the SRT comprises a material having a positive thermal expansion (PTE) coefficient;
the FRT is constructed from a thermalized metallic material (TMM) selected to produce in combination with the SRT a thermally neutral or controlled optical (TNO) variation in the PFD;
the TMM is constructed by deforming a metallic material substantially comprising a first phase by applying tension in a first direction;
the metallic material is subsequently deformed via application of tension from the first phase into a second phase;
the metallic material, subsequent to the deformation, exhibits a negative first thermal expansion characteristic having a negative coefficient of thermal expansion within a predetermined range;
the negative coefficient of thermal expansion is in at least the first direction; and
the metallic material, subsequent to the deformation, exhibits a second thermal expansion characteristic in a second direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

PTASOS Positive System Summary

A PTASOS positive thermal expansion preferred exemplary embodiment of the present invention system may be broadly generalized as a system comprising:
(a) optical lens source (OLS);
(b) optical detector target (ODT);
(c) parallel reference surface (PRS);
(d) first lens retaining tube (FRT); and
(e) second lens retaining tube (SRT);
wherein:
the OLS comprises a lens reference plane (LRP) perpendicular to an optical axis of the OLS;
the ODT comprises a focal reference plane (FRP) perpendicular to an optical axis of the ODT;
the PRS comprises a parallel reference plane (PRP) perpendicular to an optical axis of the PRS;
the FRT comprises a material having a positive thermal expansion (NTE) coefficient;
the SRT comprises a material having a negative thermal expansion (PTE) coefficient;
the FRT and the SRT are aligned along a common optical axis (COA);
the FRT and the SRT are configured to align the OLS and ODT along the COA;
the FRT is configured to separate the OLS and the PRS along the COA and define a predetermined separation between the LRP and the PRP;
the SRT comprises a first longitudinal surface (FLS) and a second longitudinal surface (SLS);
the FLS is positioned to contact the PRS at the PRP;
the SLS is positioned to contact the ODT at the FRP;
the SRT is configured to separate the OLS and the PRS along the COA and define a predetermined focal distance (PFD) between the LRP and the FRP;
the SRT is constructed from a thermalized metallic material (TMM) selected to produce in combination with the FRT a thermally neutral or controlled optical (TNO) variation in the PFD;
the TMM is constructed by deforming a metallic material substantially comprising a first phase by applying tension in a first direction;
the metallic material is subsequently deformed via application of tension from the first phase into a second phase;
the metallic material, subsequent to the deformation, exhibits a negative first thermal expansion characteristic having a negative coefficient of thermal expansion within a predetermined range;
the negative coefficient of thermal expansion is in at least the first direction; and
the metallic material, subsequent to the deformation, exhibits a second thermal expansion characteristic in a second direction.
This general system summary may be augmented by the various elements described herein to produce a wide variety of invention embodiments consistent with this overall design description.

PTASOS Positive Method Summary

A PTASOS positive thermal expansion preferred exemplary embodiment of the present invention method may be broadly generalized as a method comprising:

(1) configuring a first lens retaining tube (FRT) and a second lens retaining tube (SRT) along a common optical axis (COA) in parallel combination contacting a parallel reference surface (PRS) that defines a parallel reference plane (PRP) perpendicular to the COA;
(2) separating with the FRT by common contact along the COA an optical lens source (OLS) at a lens reference plane (LRP) and the PRS at the PRP;
(3) configuring an optical detector target (ODT) positioned at a focal reference plane (FRP) on the SRT;
(4) configuring the FRT, the SRT, the PRS, the OLS, and the ODT along the COA; and
(5) configuring the SRT to separate the OLS and ODT along the COA to define a predetermined focal distance (PFD) between the LRP and the FRP;
wherein:
the FRT comprises a material having a positive thermal expansion (NTE) coefficient;
the SRT comprises a material having a negative thermal expansion (PTE) coefficient;
the SRT is constructed from a thermalized metallic material (TMM) selected to produce in combination with the FRT a thermally neutral or controlled optical (TNO) variation in the PFD;
the TMM is constructed by deforming a metallic material substantially comprising a first phase by applying tension in a first direction;
the metallic material is subsequently deformed via application of tension from the first phase into a second phase;
the metallic material, subsequent to the deformation, exhibits a negative first thermal expansion characteristic having a negative coefficient of thermal expansion within a predetermined range;
the negative coefficient of thermal expansion is in at least the first direction; and
the metallic material, subsequent to the deformation, exhibits a second thermal expansion characteristic in a second direction.
This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:
An embodiment wherein the metallic material comprises a material selected from a group consisting of:
(1) a material characterized by a general formula $Ti_{100-A}X_A$, wherein X is at least one of Ni, Nb, Mo, Ta, Pd, Pt, or combinations thereof, and A is in a range from 0 to 75 atomic percent composition;
(2) a material characterized by a general formula $Ti_{100-A-B}Ni_AX_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;

(3) a material characterized by a general formula $Ti_{100-A-B}Nb_AX_B$, wherein X is at least one of Al, Sn, Ta, Hf, Zr, Al, Au, Pt, Fe, Co, Cr, Mo, V, O, or combinations thereof, and A is in a range from 0 to 55 atomic percent composition, and B is in a range from 0 to 75 atomic percent composition such that A plus B is less than 100;

(4) a material characterized by a general formula $Ti_{100-A-B}Ta_AX_B$, wherein X is at least one of Al, Sn, Nb, Zr, Mo, Al, Au, Pt, Fe, Co, Cr, Hf, V, O, or combinations thereof, and A is in a range from 0 to 55 atomic percent composition, and B is in a range from 0 to 75 atomic percent composition such that A plus B is less than 100;

(5) a material characterized by a general formula $Ni_{100-A-B}Mn_AX_B$, wherein X is at least one of Ga, In, Sn, Al, Sb, Co, or combinations thereof, and A is in a range from 0 to 50 atomic percent composition, and B is in a range from 0 to 50 atomic percent composition such that A plus B is less than 100;

(6) a material characterized by a general formula $Ni_{100-A-B-C}Mn_ACo_BX_C$, wherein X is at least one of Ga, In, Sn, Al, Sb, or combinations thereof, and A is in a range from 0 to 50 atomic percent composition, B is in a range from 0 to 50 atomic percent composition, and C is in a range from 0 to 50 atomic percent composition such that A plus B plus C is less than 100;

(7) a material characterized by a general formula $Ni_{100-A-B}Fe_AGa_B$ wherein A is in a range from 0 to 50 atomic percent composition, and B is in a range from 0 to 50 atomic percent composition such that A plus B is less than 100;

(8) a material characterized by a general formula $Cu_{100-A}X_A$, wherein X is at least one of Zn, Ni, Mn, Al, Be, or combinations thereof, and A is in a range from 0 to 75 atomic percent composition;

(9) a material characterized by a general formula $Cu_{100-A-B}Al_AX_B$, wherein X is at least one of Zn, Ni, Mn, Be, or combinations thereof, and A is in a range from 0 to 50 atomic percent composition, and B is in a range from 0 to 50 atomic percent composition such that A plus B is less than 100;

(10) a material characterized by a general formula $Cu_{100-A-B-C}Mn_AAl_BX_C$, wherein X is at least one of Zn, Ni, Be, or combinations thereof, and A is in a range from 0 to 50 atomic percent composition, B is in a range from 0 to 50 atomic percent composition, and C is in a range from 0 to 50 atomic percent composition such that A plus B plus C is less than 100;

(11) a material characterized by a general formula $Co_{100-A-B}Ni_AX_B$, wherein X is at least one of Al, Ga, Sn, Sb, In, or combinations thereof, and A is in a range from 0 to 50 atomic percent composition, and B is in a range from 0 to 50 atomic percent composition such that A plus B is less than 100;

(12) a material characterized by a general formula $Fe_{100-A-B}Mn_AX_B$, wherein X is at least one of Ga, Ni, Co, Al, Ta, Si, or combinations thereof, and A is in a range from 0 to 50 atomic percent composition, and B is in a range from 0 to 50 atomic percent composition such that A plus B is less than 100;

(13) a material characterized by a general formula $Fe_{100-A-B}Ni_AX_B$, wherein X is at least one of Ga, Mn, Co, Al, Ta, Si, or combinations thereof, and A is in a range from 0 to 50 atomic percent composition, and B is in a range from 0 to 50 atomic percent composition such that A plus B is less than 100;

(14) a material characterized by a general formula $Fe_{100-A-B-C}Ni_ACo_BAl_CX_D$, wherein X is at least one of Ti, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;

(15) a material characterized by a general formula $Fe_{100-A-B-C}Ni_ACo_BTi_CX_D$, wherein X is at least one of Al, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;

An embodiment wherein the deforming is achieved by at least one of:
  (1) hot-rolling;
  (2) cold-rolling;
  (3) wire drawing;
  (4) plain strain compression;
  (5) bi-axial tension;
  (6) conform processing;
  (7) bending;
  (8) drawing;
  (9) wire-drawing;
  (10) swaging;
  (11) conventional extrusion;
  (12) equal channel angular extrusion;
  (13) precipitation heat treatment under stress;
  (14) tempering;
  (15) annealing;
  (16) sintering;
  (17) tension processing;
  (18) compression processing;
  (19) torsion processing;
  (20) cyclic thermal training under stress; and
  (21) combinations thereof.

An embodiment wherein the predetermined range of the coefficient of thermal expansion ranges from $-150 \times 10^{-6}$ K to $+500 \times 10^{-6} K^{-1}$.

An embodiment wherein the deforming of the metallic material further comprises texturing the metallic material in a direction comprising at least one of a [111], a [100], or a [001] direction.

An embodiment wherein the second thermal expansion coefficient is negative.

An embodiment wherein the sum of the first thermal expansion coefficient and the second thermal expansion coefficient is zero.

An embodiment wherein:
  the deforming the metallic material comprises applying tension in at least one direction; and
  the second thermal expansion characteristic subsequent to the deformation is in the at least one direction.

An embodiment wherein:
  the deforming the metallic material comprises applying compression in a first direction;

the second thermal expansion characteristic subsequent to the deformation is in at least one predetermined direction; and the at least one predetermined direction is perpendicular to the first direction.

An embodiment wherein:

the deforming the metallic material comprises applying shear in a first direction;

the second thermal expansion characteristic subsequent to the deformation is in at least one predetermined direction; and the at least one predetermined direction is 450 to the first direction.

One skilled in the art will recognize that other embodiments are possible based on combinations of elements taught within the above invention description.

Product-By-Process

The above described system and method may be applied to produce a product-by-process optical system that has a controlled thermal coefficient of expansion such that the lens system produced is superior to conventional lens systems in which the thermal coefficient of expansion is not controlled or known to be undesirable in certain application contexts. For this reason the present invention encompasses the product-by-process of the disclosed system and method in part because the lens system characteristics of the product-by-process produced by the disclosed system and/or method are significantly superior to (having more tightly controlled inter-lens distances) and different from that of lens systems known in the prior art.

CONCLUSION

A lens alignment system and method has been disclosed. The disclosed system/method integrates one or more lens retaining members/tubes (LRM/LRT) and focal length spacers (FLS) each comprising a metallic material product (MMP) specifically manufactured to have a thermal expansion coefficient (TEC) in a predetermined range via selection of the individual MMP materials and an associated MMP manufacturing process providing for controlled TEC. This controlled LRM/LRT TEC enables a plurality of optical lenses (POL) fixed along a common optical axis (COA) by the LRM/LRT to maintain precise interspatial alignment characteristics that ensure consistent and/or controlled series focal length (SFL) within the POL to generate a thermally neutral optical system (TNOS). Integration of the POL using this LRM/LRT/FLS lens alignment system reduces the overall TNOS implementation cost, reduces the overall TNOS mass, reduces TNOS parts component count, and increases the reliability of the overall optical system.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A parallel tailored athermally stabilized optical system (PTASOS) comprising:
  (a) optical lens source (OLS);
  (b) optical detector target (ODT);
  (c) parallel reference surface (PRS);
  (d) first retaining tube (FRT); and
  (e) second retaining tube (SRT);
  wherein:
  said OLS comprises a lens reference plane (LRP) perpendicular to an optical axis of said OLS;
  said ODT comprises a focal reference plane (FRP) perpendicular to an optical axis of said ODT;
  said PRS comprises a parallel reference plane (PRP) parallel to said LRP and FRP;
  said FRT comprises a material having a positive first thermal expansion (FTE) coefficient;
  said SRT comprises a material having a negative second thermal expansion (STE) coefficient;

said FRT and said SRT are aligned along a common optical axis (COA);

said FRT and said SRT are configured to align said OLS and ODT along said COA;

said FRT is configured to separate said OLS and said PRS along said COA and define a predetermined distance between said LRP and said PRP;

said SRT is configured to separate said PRS and said ODT along said COA and define a predetermined distance between said PRP and said FRP;

said FRT and said SRT and said PRS are configured to separate said OLS and ODT along said COA and define a predetermined focal distance (PFD) between said LRP and said FRP;

said FRT is constructed from a thermalized metallic material (TMM) selected to produce in combination with said SRT a thermally neutral or controlled optical (TNO) variation in said PFD;

said TMM is constructed by deforming a metallic material by applying tension in a first direction;

said TMM, subsequent to said deformation, exhibits a first thermal expansion characteristic having a coefficient of thermal expansion within a predetermined range;

said coefficient of thermal expansion is in at least said first direction;

said TMM, subsequent to said deformation, exhibits a second thermal expansion characteristic in a second direction; and wherein said TMM comprises a material selected from a group consisting of:
 (1) a material characterized by a general formula $Ti_{100-A}X_A$, wherein X is at least one of Ni, Nb, Mo, Ta, Pd, Pt, or combinations thereof, and A is in a range from 0 to 75 atomic percent composition;
 (2) a material characterized by a general formula $Ti_{100-A-B}Ni_AX_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;
 (3) a material characterized by a general formula $Ti_{100-A-B}Nb_AX_B$, wherein X is at least one of Al, Sn, Ta, Hf, Zr, Au, Pt, Fe, Co, Cr, Mo, V, O, or combinations thereof, and A is in a range from 0 to 55 atomic percent composition, and B is in a range from 0 to 75 atomic percent composition such that A plus B is less than 100; and
 (4) a material characterized by a general formula $Ti_{100-A-B}Ta_AX_B$, wherein X is at least one of Al, Sn, Nb, Zr, Mo, Au, Pt, Fe, Co, Cr, Hf, V, O, or combinations thereof, and A is in a range from 0 to 55 atomic percent composition, and B is in a range from 0 to 75 atomic percent composition such that A plus B is less than 100.

2. The system of claim 1 wherein said deformation is achieved by at least one of:
(1) hot-rolling;
(2) cold-rolling;
(3) plain strain compression;
(4) bi-axial tension;
(5) conform processing;
(6) bending;
(7) drawing;
(8) wire-drawing;
(9) swaging;
(10) extrusion;
(11) equal channel angular extrusion;
(12) precipitation heat treatment under stress;
(13) annealing;
(14) sintering;
(15) monotonic tension processing;
(16) monotonic compression processing;
(17) monotonic torsion processing;
(18) cyclic thermal training under stress; and
(19) combinations thereof.

3. The system of claim 1 wherein said predetermined 1 coefficient of thermal expansion ranges from $-150 \times 10^{-6}$ $K^{-1}$ to $+500 \times 10^{-6}$ $K^{-1}$.

4. The system of claim 1 wherein said deforming of said metallic material further comprises texturing said metallic material in a direction comprising at least one of a [111], a [100], or a direction.

5. The system of claim 1 wherein said TMM comprises a material having a negative thermal expansion (NTE) coefficient.

6. The system of claim 1 wherein:
said deforming said TMM comprises applying tension in at least one direction; and
said second thermal expansion characteristic subsequent to said deformation is in said at least one direction.

7. The system of claim 1 wherein:
said deforming said TMM comprises applying compression in first direction;
said second thermal expansion characteristic subsequent to said deformation is in at least one predetermined direction; and
said at least one predetermined direction is perpendicular to said first direction.

8. The system of claim 1 wherein:
said deforming said TMM comprises applying shear in said first direction;
said second thermal expansion characteristic subsequent to deformation is in at least one predetermined direction; and
said at least one predetermined direction is 45° to said first direction.

9. A parallel tailored athermally stabilized optical system (PTASOS) comprising:
(a) optical lens source (OLS);
(b) optical detector target (ODT);
(c) parallel reference surface (PRS);
(d) first retaining tube (FRT); and
(e) second retaining tube (SRT);
wherein:
said OLS comprises a lens reference plane (LRP) perpendicular to an optical axis of said OLS;
said ODT comprises a focal reference plane (FRP) perpendicular to an optical axis of said ODT;
said PRS comprises a parallel reference plane (PRP) parallel to said LRP and FRP;
said FRT comprises a material having a negative first thermal expansion (FTE) coefficient;
said SRT comprises a material having a positive second thermal expansion (STE) coefficient;
said FRT and said SRT are aligned along a common optical axis (COA);
said FRT and said SRT are configured to align said OLS and ODT along said COA;
said FRT is configured to separate said OLS and said PRS along said COA and define a predetermined distance between said LRP and said PRP;

said SRT is configured to separate said PRS and said ODT along said COA and define a predetermined distance between said PRP and said FRP;

said FRT and said SRT and said PRS are configured to separate said OLS and ODT along said COA and define a predetermined focal distance (PFD) between said LRP and said FRP;

said SRT is constructed from a thermalized metallic material (TMM) selected to produce in combination with said FRT a thermally neutral or controlled optical (TNO) variation in said PFD;

said TMM is constructed by deforming a metallic material by applying tension in a first direction;

said TMM, subsequent to said deformation, exhibits a a first thermal expansion characteristic having coefficient of thermal expansion within a predetermined range;

said coefficient of thermal expansion is in at least said first direction;

said TMM, subsequent to said deformation, exhibits a second thermal expansion characteristic in a second direction; and wherein said TMM comprises a material selected from a group consisting of:
  (1) a material characterized by a general formula $Ti_{100-A} X_A$, wherein X is at least one of Ni, Nb, Mo, Ta, Pd, Pt, or combinations thereof, and A is in a range from 0 to 75 atomic percent composition;
  (2) a material characterized by a general formula $Ti_{100-A-B}Ni_A X_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;
  (3) a material characterized by a general formula $Ti_{100-A-B}Nb_A X_B$, wherein X is at least one of Al, Sn, Ta, Hf, Zr, Au, Pt, Fe, Co, Cr, Mo, V, O, or combinations thereof, and A is in a range from 0 to 55 atomic percent composition, and B is in a range from 0 to 75 atomic percent composition such that A plus B is less than 100; and
  (4) a material characterized by a general formula $Ti_{100-A-B}Ta_A X_B$, wherein X is at least one of Al, Sn, Nb, Zr, Mo, Au, Pt, Fe, CO, Cr, Hf, V, O, or combinations thereof, and A is in a range from 0 to 55 atomic percent composition, and B is in a range from 0 to 75 atomic percent composition such that A plus B is less than 100.

10. The system of claim 9 wherein said deformation is achieved by at least one of:
  (1) hot-rolling;
  (2) cold-rolling;
  (3) plain strain compression;
  (4) bi-axial tension;
  (5) conform processing;
  (6) bending;
  (7) drawing;
  (8) wire-drawing;
  (9) swaging;
  (10) extrusion;
  (11) equal channel angular extrusion;
  (12) precipitation heat treatment under stress;
  (13) annealing;
  (14) sintering;
  (15) monotonic tension processing;
  (16) monotonic compression processing;
  (17) monotonic torsion processing;
  (18) cyclic thermal training under stress; and
  (19) combinations thereof.

11. The system of claim 9 wherein said predetermined range of said coefficient of thermal expansion ranges from $-150 \times 10^{-6}$ K$^{-1}$ to $+500 \times 10^{-6}$ K$^{-1}$.

12. The system of claim 9 wherein said deforming of said metallic material further comprises texturing said metallic material in a direction comprising at least one of a [111], a [100], or a direction.

13. The system of claim 9 wherein said TMM comprises a material having a negative thermal expansion (NTE) coefficient.

14. The system of claim 9 wherein:
  said deforming said TMM comprises applying tension in at least one direction; and
  said second thermal expansion characteristic subsequent to said deformation is in said at least one direction.

15. The system of claim 9 wherein:
  said deforming said TMM comprises applying compression in said first direction;
  said second thermal expansion characteristic subsequent to said deformation is in at least one predetermined direction; and
  said at least one predetermined direction is perpendicular to said first direction.

16. The system of claim 9 wherein:
  said deforming said TMM comprises applying shear in said first direction;
  said second thermal expansion characteristic subsequent to deformation is in at least one predetermined direction; and
  said at least one predetermined direction is 45° to said first direction.

17. A parallel tailored athermally stabilized optical method (PTASOM) comprising:
  (1) configuring a first retaining tube (FRT) and a second retaining tube (SRT) in parallel combination using a parallel reference surface (PRS) to separate an optical lens source (OLS) and an optical detector target (ODT);
  (2) configuring said FRT, said SRT, said OLS, and said ODT along a common optical axis (COA); and
  (3) configuring said FRT, said SRT, and said PRS to separate said OLS and ODT along said COA and define a predetermined focal distance (PFD) between a lens reference plane (LRP) perpendicular to an optical axis of said OLS and a focal reference plane (FRP) perpendicular to an optical axis of said ODT;
wherein:
  said FRT comprises a material having a positive first thermal expansion (FTE) coefficient;
  said SRT comprises a material having a negative second thermal expansion (STE) coefficient;
  said FRT is constructed from a thermalized metallic material (TMM) selected to produce in combination with said SRT a thermally neutral or controlled optical (TNO) variation in said PFD;
  said TMM is constructed by deforming a metallic material by applying tension in a first direction;
  said TMM, subsequent to said deformation, exhibits a first thermal expansion characteristic having coefficient of thermal expansion within a predetermined range;
  said coefficient of thermal expansion is in at least said first direction;
  said TMM, subsequent to said deformation, exhibits a second thermal expansion characteristic in a second direction; and wherein said TMM comprises a material selected from a group consisting of:
(1) a material characterized by a general formula $Ti_{100-A} X_A$, wherein X is at least one of Ni, Nb, Mo, Ta, Pd, Pt, or combinations thereof, and A is in a range from 0 to 75 atomic percent composition;
(2) a material characterized by a general formula $Ti_{100-A-B}Ni_A X_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;
(3) a material characterized by a general formula $Ti_{100-A-B}Nb_A X_B$, wherein X is at least one of Al, Sn, Ta, Hf, Zr, Au, Pt, Fe, Co, Cr, Mo, V, O, or combinations thereof, and A is in a range from 0 to 55 atomic percent composition, and B is in a range from 0 to 75 atomic percent composition such that A plus B is less than 100; and
(4) a material characterized by a general formula $Ti_{100-A-B}Ta_A X_B$, wherein X is at least one of Al, Sn, Nb, Zr, Mo, Au, Pt, Fe, Co, Cr, Hf, V, O, or combinations thereof, and A is in a range from 0 to 55 atomic percent composition, and B is in a range from 0 to 75 atomic percent composition such that A plus B is less than 100.

18. The method of claim 17 wherein said deforming is achieved by at least one of:
(1) hot-rolling;
(2) cold-rolling;
(3) plain strain compression;
(4) bi-axial tension;
(5) conform processing;
(6) bending;
(7) drawing;
(8) wire-drawing;
(9) swaging;
(10) extrusion;
(11) equal channel angular extrusion;
(12) precipitation heat treatment under stress;
(13) annealing;
(14) sintering;
(15) monotonic tension processing;
(16) monotonic compression processing;
(17) monotonic torsion processing;
(18) cyclic thermal training under stress; and
(19) combinations thereof.

19. The method of claim 17 wherein said predetermined range of said coefficient of thermal expansion ranges from $-150 \times 10^{-6}$ $K^{-1}$ to $+500 \times 10^{-6}$ $K^{-1}$.

20. The method of claim 17 wherein said deforming of said TMM further comprises texturing said metallic material in a direction comprising at least one of a [111], a [100], or a [001] direction.

21. The method of claim 17 wherein said FRT comprises a material having a negative thermal expansion (NTE) coefficient.

22. The method of claim 17 wherein the sum of said FTE coefficient and said STE coefficient is zero.

23. The method of claim 17 wherein:
said deforming said TMM comprises applying tension in at least one direction; and
said second thermal expansion characteristic subsequent to said deformation is in said at least one direction.

24. The method of claim 17 wherein:
said deforming said TMM comprises applying compression in said first direction;
said second thermal expansion characteristic subsequent to said deformation is in at least one predetermined direction; and
said at least one predetermined direction is perpendicular to said first direction.

25. The method of claim 17 wherein:
said deforming said TMM comprises applying shear in said first direction;
said second thermal expansion characteristic subsequent to deformation is in at least one predetermined direction; and
said at least one predetermined direction is 45° to said first direction.

26. A parallel tailored athermally stabilized optical method (PTASOM) comprising:
(1) configuring a first lens retaining tube (FRT) and a second lens retaining tube (SRT) in parallel combination using a parallel reference surface (PRS) to separate an optical lens source (OLS) and an optical detector target (ODT);
(2) configuring said FRT, said SRT, said OLS, and said ODT along a common optical axis (COA); and
(3) configuring said FRT, said SRT, and said PRS to separate said OLS and ODT along said COA and define a predetermined focal distance (PFD) between a lens reference plane (LRP) perpendicular to an optical axis of said OLS and a focal reference plane (FRP) perpendicular to an optical axis of said ODT;
wherein:
said FRT comprises a material having a negative first thermal expansion (FTE) coefficient;
said SRT comprises a material having a positive second thermal expansion (STE) coefficient;
said SRT is constructed from a thermalized metallic material (TMM) selected to produce in combination with said SRT a thermally neutral or controlled optical (TNO) variation in said PFD;
said TMM is constructed by deforming a metallic material by applying tension in a first direction;
said TMM, subsequent to said deformation, exhibits a first thermal expansion characteristic having coefficient of thermal expansion within a predetermined range;
said coefficient of thermal expansion is in at least said first direction;
said TMM, subsequent to said deformation, exhibits a second thermal expansion characteristic in a second direction; and
wherein said TMM comprises a material selected from a group consisting of:
(1) a material characterized by a general formula $Ti_{100-A} X_A$, wherein X is at least one of Ni, Nb, Mo, Ta, Pd, Pt, or combinations thereof, and A is in a range from 0 to 75 atomic percent composition;
(2) a material characterized a by general formula $Ti_{100-A-B}Ni_A X_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;
(3) a material characterized by a general formula $Ti_{100-A-B}Nb_A X_B$, wherein X is at least one of Al, Fe, Co, Cr, Mo, V, O, or combinations Sn, Ta, Hf, Zr, Au, Pt, thereof, and A is in a range from 0 to 55 atomic percent composition, and B is in a range from 0 to 75 atomic percent composition such that A plus B is less than 100; and (4) a material characterized by a general formula $Ti_{100-A-B}Ta_A X_B$, wherein X is at least one of Al, Sn, Nb, Zr, Mo, Au, Pt, Fe, Co, Cr, Hf, V, O, or combinations thereof, and A is in a range from 0 to 55 atomic percent composition, and B is in a range from 0 to 75 atomic percent composition such that A plus B is less than 100.

27. The method of claim 26 wherein said deforming is achieved by at least one of:
(1) hot-rolling;
(2) cold-rolling;
(3) plain strain compression;
(4) bi-axial tension;
(5) conform processing;
(6) bending;
(7) drawing;
(8) wire-drawing;
(9) swaging;
(10) extrusion;
(11) equal channel angular extrusion;
(12) precipitation heat treatment under stress;
(13) annealing;
(14) sintering;
(15) monotonic tension processing;
(16) monotonic compression processing;
(17) monotonic torsion processing;
(18) cyclic thermal training under stress; and
(19) combinations thereof.

28. The method of claim 26 wherein said predetermined range of said coefficient of thermal expansion ranges from $-150 \times 10^{-6}$ $K^{-1}$ to $+500 \times 10^{-6}$ $K^{-1}$.

29. The method of claim 26 wherein said deforming of said TMM further comprises texturing said metallic material in a direction comprising at least one of a [111], a [100], or a [001] direction.

30. The method of claim 26 wherein said TMM comprises a material having a negative thermal expansion (NTE) coefficient.

31. The method of claim 26 wherein the sum of said FTE coefficient and said STE coefficient is zero.

32. The method of claim 26 wherein:
said deforming said TMM comprises applying tension in at least one direction; and
said second thermal expansion characteristic subsequent to said deformation is in said at least one direction.

33. The method of claim 26 wherein:
said deforming said TMM comprises applying compression in said first direction;
said second thermal expansion characteristic subsequent to said deformation is in at least one predetermined direction; and
said at least one predetermined direction is perpendicular to said first direction.

34. The method of claim 26 wherein:
said deforming said TMM comprises applying shear in said first direction;
said second thermal expansion characteristic subsequent to deformation is in at least one predetermined direction; and
said at least one predetermined direction is 45° to said first direction.

* * * * *